(12) United States Patent
Beveridge et al.

(10) Patent No.: US 11,625,738 B2
(45) Date of Patent: Apr. 11, 2023

(54) METHODS AND SYSTEMS THAT GENERATED RESOURCE-PROVISION BIDS IN AN AUTOMATED RESOURCE-EXCHANGE SYSTEM

(71) Applicant: VMware, Inc., Palo Alto, CA (US)

(72) Inventors: Daniel Beveridge, Apollo Beach, FL (US); Joerg Lew, Rettenberg (DE)

(73) Assignee: VMware, Inc., Palo Alto, CA (US)

( * ) Notice: Subject to any disclaimer, the term of this patent is extended or adjusted under 35 U.S.C. 154(b) by 1616 days.

(21) Appl. No.: 15/637,134

(22) Filed: Jun. 29, 2017

(65) Prior Publication Data

US 2018/0060894 A1    Mar. 1, 2018

Related U.S. Application Data

(63) Continuation-in-part of application No. 15/285,355, filed on Oct. 4, 2016.
(Continued)

(51) Int. Cl.
*G06Q 30/02* (2012.01)
*G06Q 30/08* (2012.01)
(Continued)

(52) U.S. Cl.
CPC ........... *G06Q 30/0206* (2013.01); *G06F 9/50* (2013.01); *G06F 9/5005* (2013.01);
(Continued)

(58) Field of Classification Search
CPC ........ G06Q 30/0206; G06F 9/50; H04L 67/10
See application file for complete search history.

(56) References Cited

U.S. PATENT DOCUMENTS

2005/0257079 A1*  11/2005  Arcangeli ............. G06Q 30/08
                                                              714/4.4
2008/0222025 A1*  9/2008  Fellenstein ........... G06Q 30/08
                                                              705/37
(Continued)

OTHER PUBLICATIONS

Venticinque, Salvatore, et al. "Agent based Cloud provisioning and management." Design and Prototypal Implementation, CLOSER 2011 (2011): 184-191. (Year: 2011).*
(Continued)

*Primary Examiner* — Mohsen Almani

(57) ABSTRACT

The current document is directed a resource-exchange system that facilitates resource exchange and sharing among computing facilities. The currently disclosed methods and systems employ efficient, distributed-search-based auction methods and subsystems within distributed computer systems that include large numbers of geographically distributed data centers to locate resource-provider computing facilities that match the resource needs of resource-consumer computing facilities. In one implementation, resource-provider computing facilities automatically generate hosting fees for hosting computational-resources-consuming entities on behalf of resource-consumer computing facilities that are included in bid-response messages returned by the resource-provider computing facilities in response to receiving bid-request messages. In another implementation, a cloud-exchange system automatically generates hosting fees on behalf of resource-provider computing facilities.

19 Claims, 62 Drawing Sheets

Related U.S. Application Data

(60) Provisional application No. 62/380,450, filed on Aug. 28, 2016.

(51) Int. Cl.
   *G06F 9/50* (2006.01)
   *H04L 67/566* (2022.01)
   *G06Q 30/0201* (2023.01)
   *H04L 67/10* (2022.01)
   *H04L 67/1001* (2022.01)

(52) U.S. Cl.
   CPC .......... *G06F 9/5072* (2013.01); *G06Q 30/08* (2013.01); *H04L 67/10* (2013.01); *H04L 67/1001* (2022.05); *H04L 67/566* (2022.05)

(56) References Cited

U.S. PATENT DOCUMENTS

| | | | |
|---|---|---|---|
| 2010/0274567 A1* | 10/2010 | Carlson | G06Q 30/0225 705/1.1 |
| 2010/0332262 A1* | 12/2010 | Horvitz | G06Q 30/06 705/4 |
| 2011/0238458 A1* | 9/2011 | Purcell | G06F 9/5072 705/7.27 |
| 2012/0131591 A1* | 5/2012 | Moorthi | G06F 9/5061 718/104 |
| 2014/0040343 A1* | 2/2014 | Nickolov | H04L 67/1029 709/201 |
| 2015/0067171 A1 | 3/2015 | Yum et al. | |
| 2015/0326449 A1 | 11/2015 | Melander et al. | |

OTHER PUBLICATIONS

Buyya, Rajkumar, Rajiv Ranjan, and Rodrigo N. Calheiros. "Intercloud: Utility-oriented federation of cloud computing environments for scaling of application services." International Conference on Algorithms and Architectures for Parallel Processing. Springer, Berlin, Heidelberg, 2010. (Year: 2010).*

Google search for "reverse auction model"; 2020 (Year: 2020).*

International Search Report, dated Nov. 29, 2017.

* cited by examiner

1540 — filter     attribute : relational_expression

1542 — policy     filter
                   {filter, filter}
                   {filter, filter, . . . , filter}

1544 — search_evaluation_expression     evaluator
                                           {evaluator, evaluator}
                                           {evaluator, evaluator, . . . , evaluator}

1546 — evaluator     simple_evaluator
                 weight, simple_evaluator

1548 — simple evaluator     minimum-positive_attribute
                         floor, minimum-positive_attribute 1550 — minimum-positive_attribute     numeric or ordered-set attribute with values that map to a set of numerically increasing values ordered in descending order with respect to desirability or fitness 1552 — search     search_evaluation_expression
              search_evaluation_expression, policy
              search_evaluation_expression, {policy, . . . , policy}

METHODS AND SYSTEMS THAT GENERATED RESOURCE-PROVISION BIDS IN AN AUTOMATED RESOURCE-EXCHANGE SYSTEM

CROSS-REFERENCE TO RELATED APPLICATIONS

This application is a continuation-in-part of application Ser. No. 15/285,355, filed Oct. 4, 2016, which claims the benefit of Provisional Application No. 62/380,450, filed Aug. 28, 2016.

TECHNICAL FIELD

The current document is directed to distributed computer systems, distributed-computer-system management subsystems, and, in particular, to an automated resource-exchange system that mediates sharing of computational resources among computing facilities using a distributed-search-implemented auction in which hosting fees for hosting computational-resources-consuming entities are automatically generated.

BACKGROUND

Computer systems and computational technologies have steadily evolved, during the past 70 years, from initial vacuum-tube-based systems that lacked operating systems, compilers, network connectivity, and most other common features of modern computing systems to vast distributed computing systems that include large numbers of multi-processor servers, data-storage appliances, and multiple layers of internal communications networks interconnected by various types of wide-area networks and that provide computational resources to hundreds, thousands, tens of thousands, or more remote users. As operating systems, and virtualization layers have been developed and refined, over the years, in parallel with the advancements in computer hardware and networking, the robust execution environments provided by distributed operating systems and virtualization layers now provide a foundation for development and evolution of many different types of distributed application programs, including distributed database-management systems, distributed client-server applications, and distributed web-based service-provision applications. This has resulted in a geometric increase in the complexity of distributed computer systems, as a result of which owners, administrators, and users of distributed computer systems and consumers of computational resources provided by distributed computing systems increasingly rely on automated and semi-automated management and computational-resource-distribution subsystems to organize the activities of many users and computational-resource consumers and to control access and use of, computational resources within distributed computer systems. In many cases, greater overall computational efficiency can be obtained for a large number of distributed computing facilities when resources can be shared and exchanged among the distributed computing facilities. However, currently, effective resource sharing and exchange among computing facilities of multiple organizations is generally difficult or impossible.

SUMMARY

The current document is directed a resource-exchange system that facilitates resource exchange and sharing among computing facilities. The currently disclosed methods and systems employ efficient, distributed-search-based auction methods and subsystems within distributed computer systems that include large numbers of geographically distributed data centers to locate resource-provider computing facilities that match the resource needs of resource-consumer computing facilities. In one implementation, resource-provider computing facilities automatically generate hosting fees for hosting computational-resources-consuming entities on behalf of resource-consumer computing facilities that are included in bid-response messages returned by the resource-provider computing facilities in response to receiving bid-request messages. In another implementation, a cloud-exchange system automatically generates hosting fees on behalf of resource-provider computing facilities.

BRIEF DESCRIPTION OF THE DRAWINGS

FIGS. 15A-C illustrate certain of the information and data entities used within the currently disclosed distributed-search methods and subsystems.

FIGS. 19A-B illustrate operation of the evaluator queues and master queue within an active search context.

DETAILED DESCRIPTION OF EMBODIMENTS

The current document is directed to a resource exchange that facilitates resource sharing among multiple computing facilities. In a first subsection, below, an overview of the problem domain addressed by the currently disclosed methods and systems is provided in a first subsection. A second subsection provides an overview of computer systems, virtualization layers, and distributed computer systems. A third subsection describes as distributed search engine and a fourth subsection provides a brief description of a distributed resource-exchange system that employs the distributed search engine and that aggregates a large number of physical and virtual data centers to create a distributed, multi-organization computing, resource-exchange, and resource-sharing facility. A fifth subsection discusses the life cycle of a resource exchange as represented by a resource-exchange context. Finally, in a sixth subsection, the currently disclosed methods and subsystems that implement resource-provider pricing of hosting services is described.

The Problem Domain Addressed by the Currently Disclosed Methods and Systems

Figure 1:
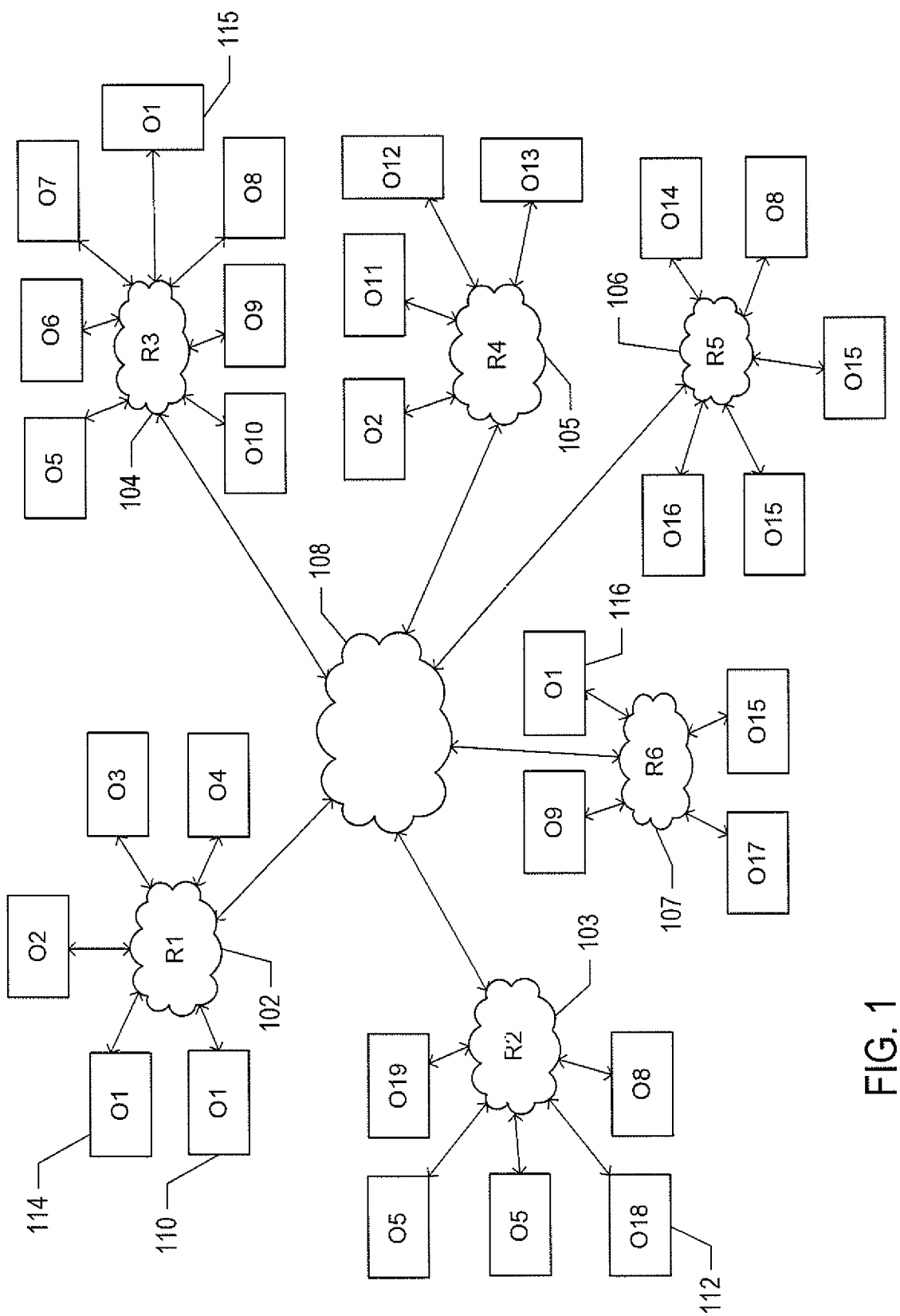
FIGS. 1, 2A-E, and 3 illustrate the problem domain addressed by the methods and systems disclosed in the current document.
Figure 2A:
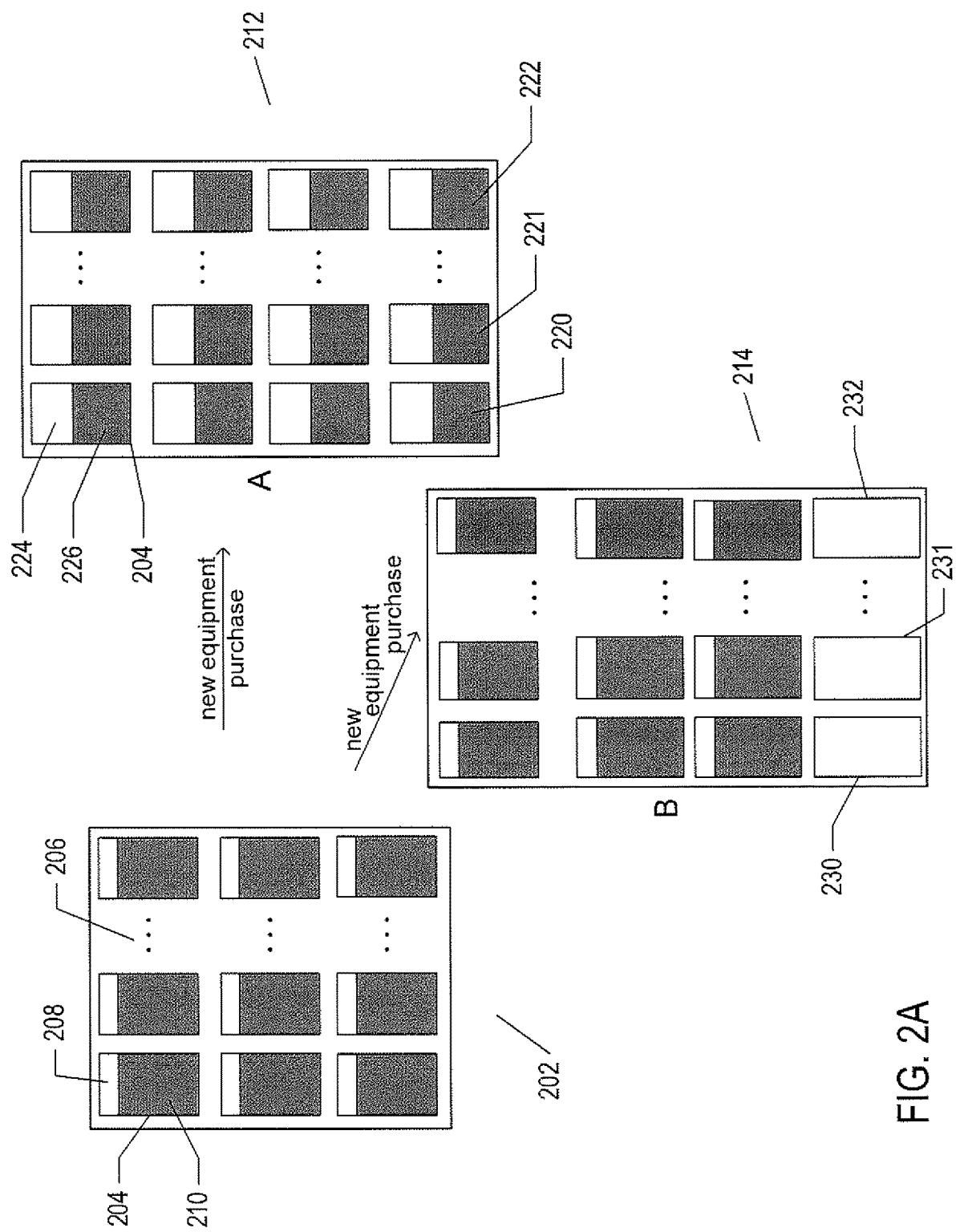
Figure 2B:
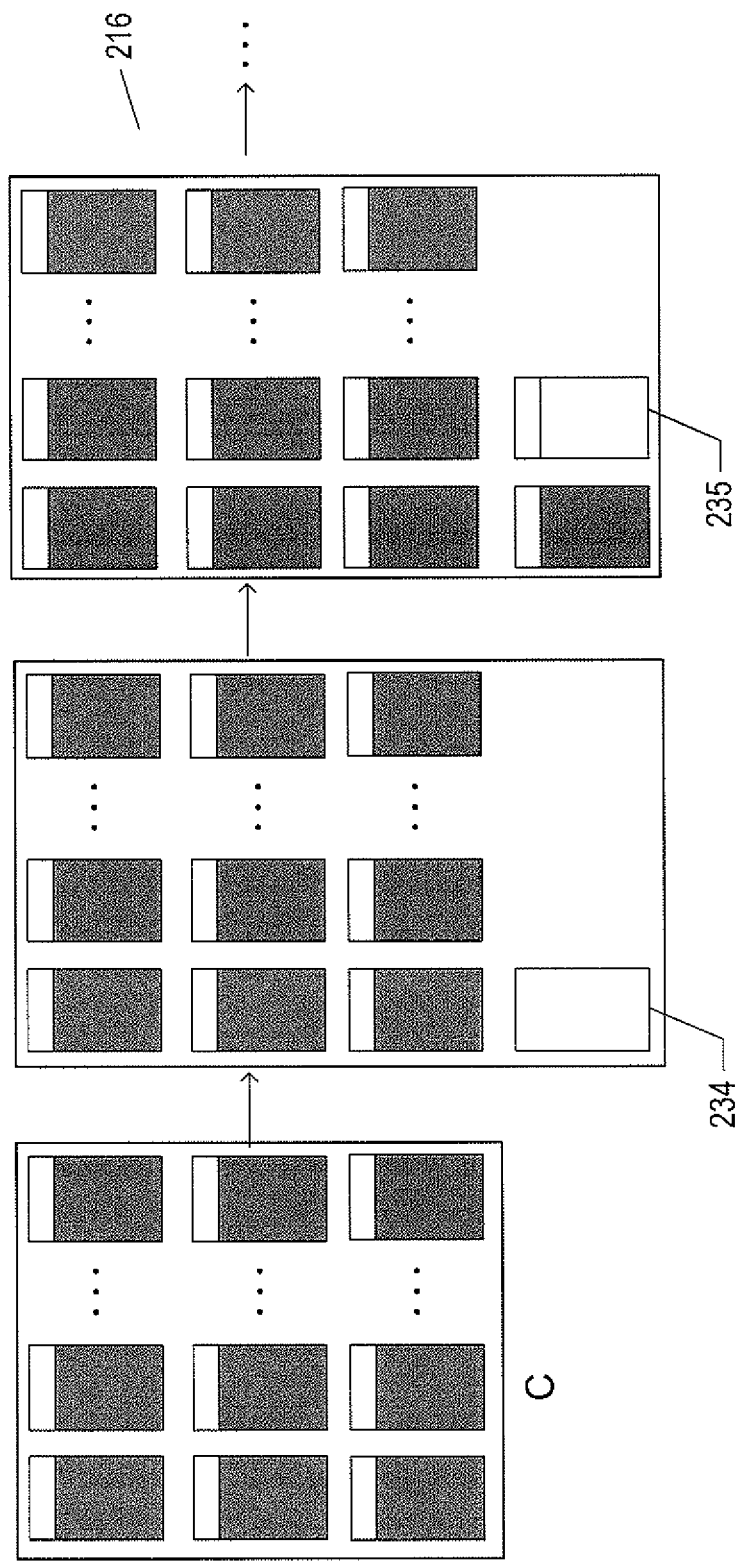
Figure 2C:
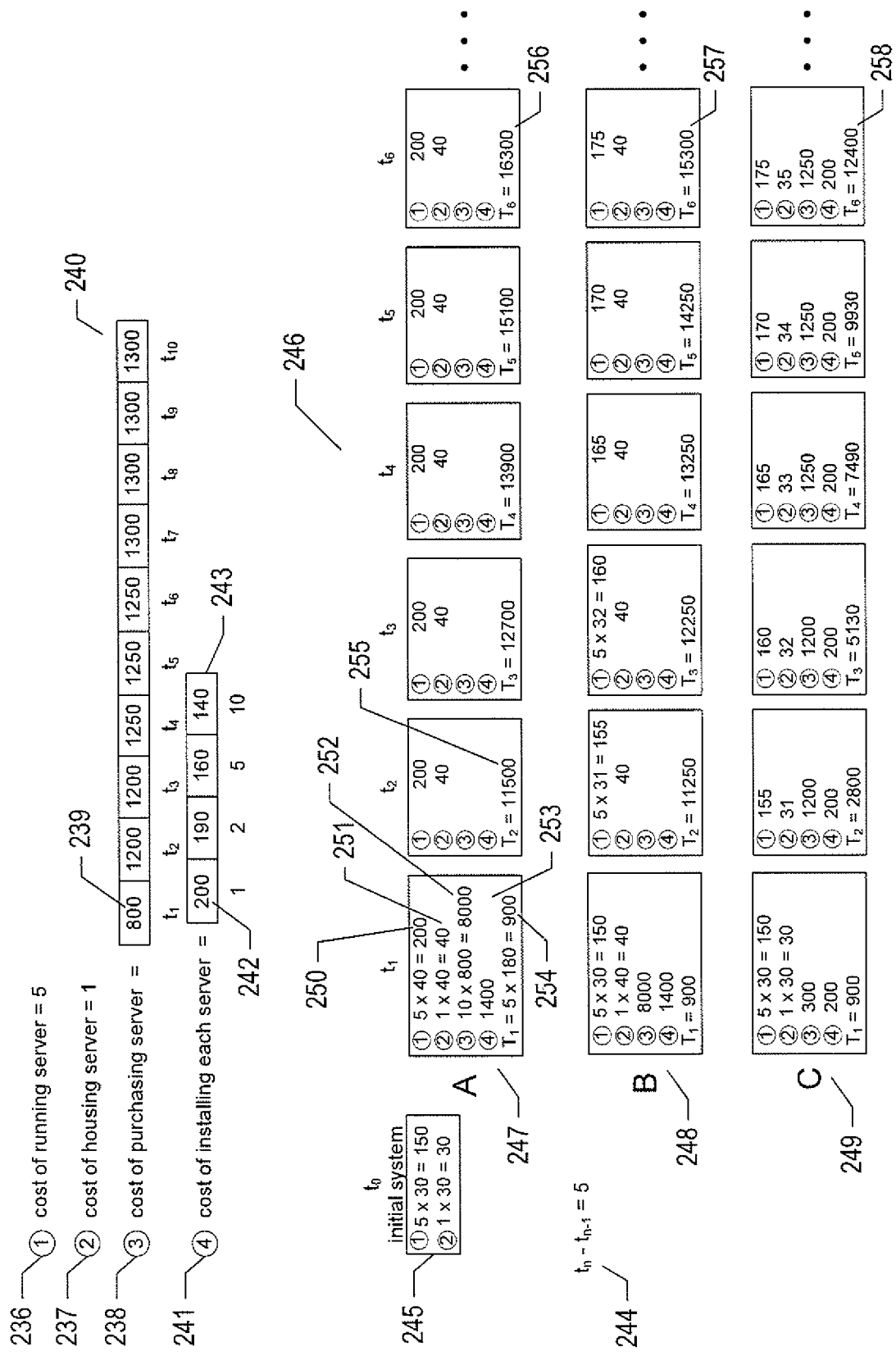
Figure 2D:
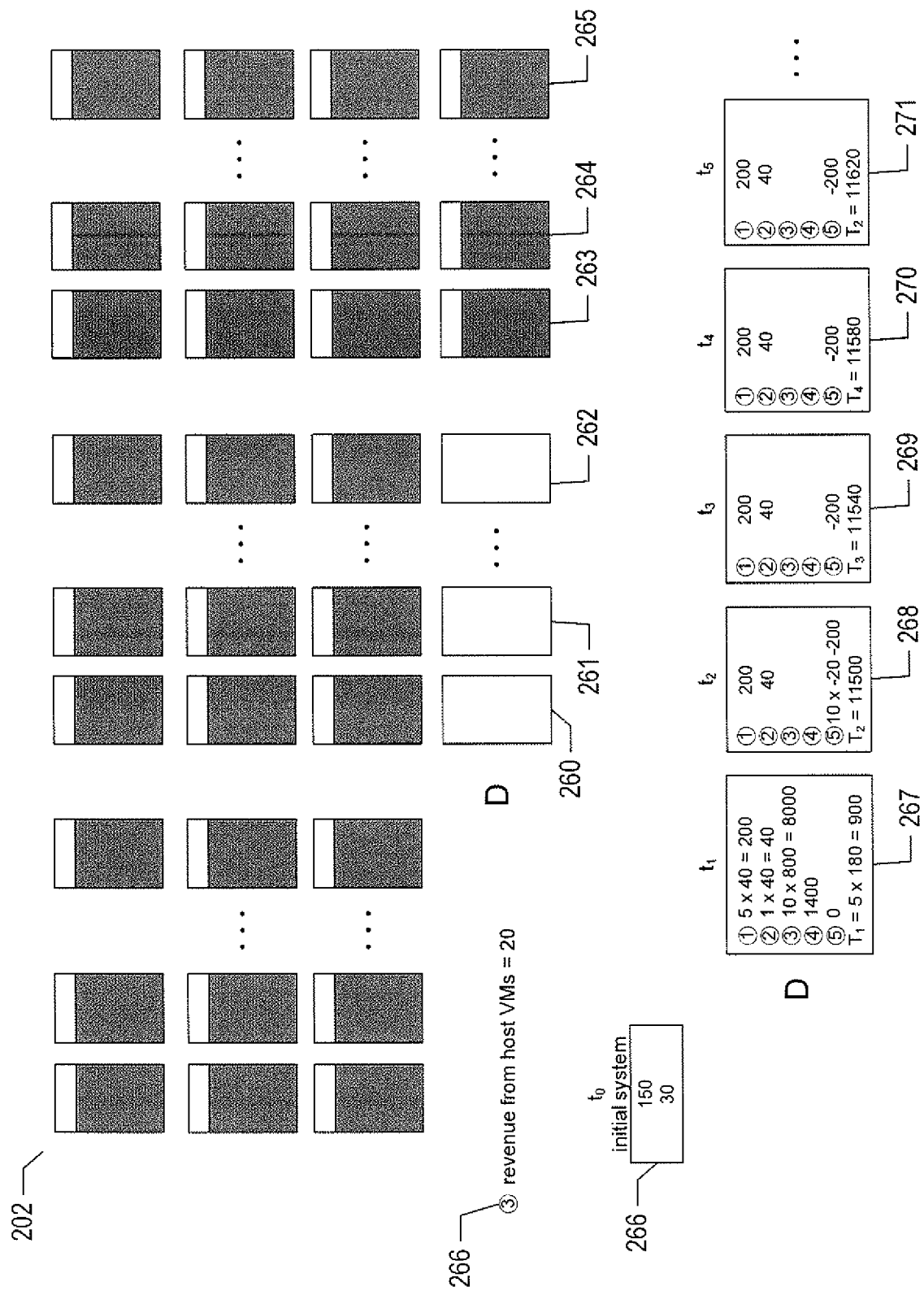
Figure 2E:
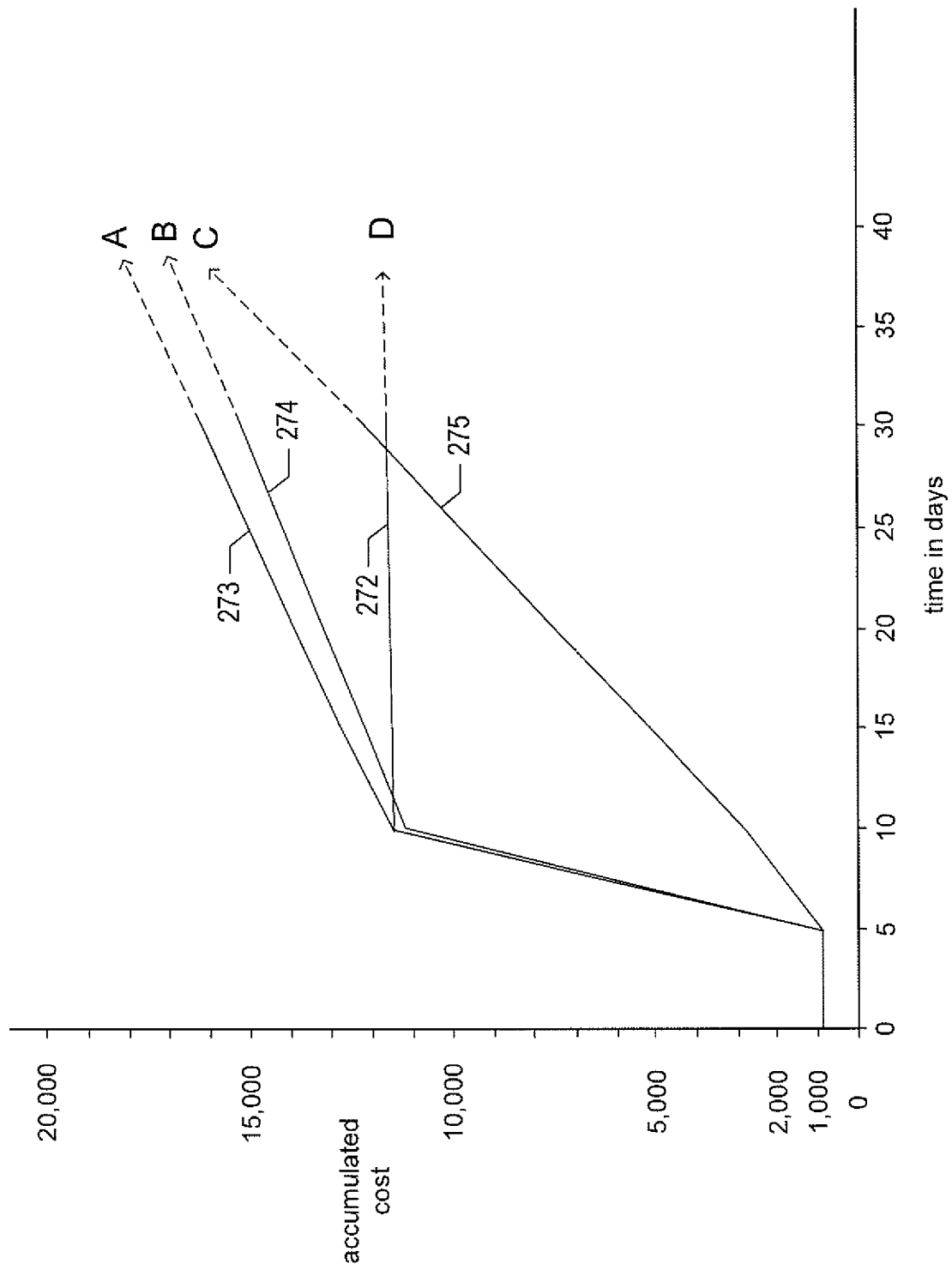
Figure 3:
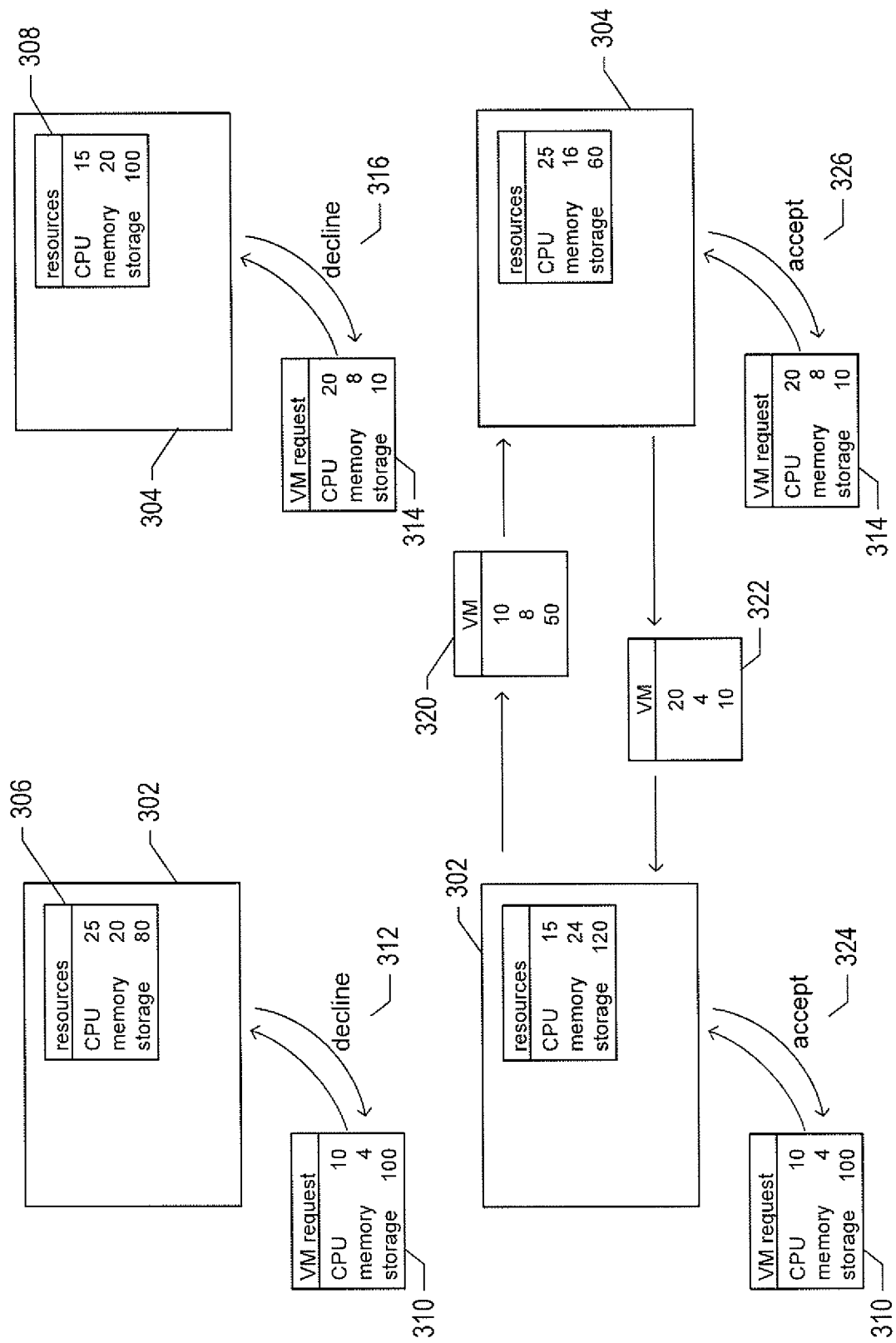

FIGS. 1-3 illustrate the problem domain addressed by the methods and systems disclosed in the current document. FIG. 1 shows a large number of virtual and physical data centers spread throughout a large geographical area. Each virtual/physical data center may include hundreds to thousands of individual computer systems along with internal networking and pooled mass-storage resources. Although only 30 virtual/physical data centers are shown in FIG. 1, hundreds to thousands of virtual/physical data centers may be spread throughout a large geographical area. As shown in FIG. 1, the virtual/physical data centers are connected to regional communications hubs 102-107, which are, in turn, interconnected through wide-area networking 108. Each virtual/physical data center is represented by a rectangle, such as virtual/physical data center 110. Each rectangle representing a virtual/physical data center is additionally labeled with an indication of the organization that owns and maintains the virtual/physical data center, such as the indication "O1" within the rectangle representing virtual/physical data center 110. Certain organizations own and maintain only a single virtual/physical data center, including organization "O18," which owns and maintains virtual/physical data center 112. Other organizations own and maintain multiple virtual/physical data centers, including organization "O1," which owns and maintains virtual/physical data centers 110 and 114-116.

Currently, an organization can supplement the computational resources of the organization's one or more virtual/physical data centers by contracting for computational resources from cloud-computing facilities. An organization can configure virtual machines within a cloud-computing facility to remotely run applications and services on behalf of the organization. Use of computational resources provided by cloud-computing facilities allows an organization to expand and contract computational resources in response to increasing and decreasing demand for the services provided by the organization, without purchasing additional physical computer systems to satisfy increased demand and without powering down physical computer systems to lessen ongoing costs associated with spare capacity. The advent of cloud computing has enabled organizations to make use of flexible and dynamic remote computational resources to obtain needed computational resources without needing to purchase, maintain, and manage additional computational resources on-site. However, third-party cloud-computing facilities do not fully address the computational-resource needs of organizations, fail to address the recurring problem of spare capacity within private virtual/physical data centers, and fail to provide seamless migration of virtual machines back and forth between resource consumers and resource providers as well as seamless extension of a resource-consumer's private virtual-machine execution environment into the cloud-based domain of resource providers.

It should be emphasized that the problem domain addressed by the currently disclosed methods and systems is, in general, one of computational efficiency. As discussed below, the automated resource-exchange system, in which the currently disclosed methods and systems are employed, facilitates sharing and exchange of computational resources among very large numbers of virtual/physical data centers that are owned, maintained, and managed by large numbers of different organizations. The resource-exchange system effectively aggregates portions of the computational resources of the large number of virtual/physical data centers for use by organizations in need of additional computational resources. As a result, the large numbers of virtual/physical data centers, as a whole, can achieve significantly greater computational efficiencies through resource exchange and sharing. In other words, the resource-exchange system provides a means for partially aggregating multiple virtual/physical data centers and for increasing the computational efficiency of the partially aggregated virtual/physical data centers.

In the implementations discussed in the current application, the resource-exchange system partially aggregates multiple virtual/physical data centers by providing a largely automated auction-based marketplace in which computational resources are advertised for lease by resource sellers and leased from resource sellers by resource buyers. In other words, the resource-exchange system achieves computational efficiencies through computational-resource transactions. In the described implementations, these transactions involve financial exchanges between buyers and sellers. However, the financial exchanges are used to simplify the complex problems associated with matching buyers to sellers and sellers to buyers. Similar computational efficiencies can be alternatively obtained using more abstract credit exchanges, rather than financial exchanges or by directly trading different types of computational resources and services. However, since many of the various considerations and constraints associated with leasing computational resources and with other types of resource exchanges are naturally expressed in terms of financial costs and benefits, use of financial exchanges represents a significant computational efficiency for the resource-exchange system. The primary goal for creating and operating the resource-exchange system is, despite the use of financial transactions, to increase the overall efficiencies related to owning, maintaining, and the managing virtual/physical data centers rather than to create a new type of financial market.

FIGS. 2A-E illustrate an example of a cost-efficiency increase for a virtual/physical data center made possible by the resource-exchange system. In FIG. 2A, the virtual/physical data center 202 is represented as a large rectangle containing numerous physical server computers, including server 204. In FIGS. 2A-E, multiple ellipses, such as ellipses 206, are used to indicate that a particular row of servers includes many additional servers not explicitly shown in the figures. In the numerical examples that follow, each of the ellipses represents seven servers that are not shown in the figures. Each server, including server 204, is generally shown as including a first unshaded portion, such as portion 208 of server 204, representing unused server resources and a second shaded portion, such as second portion 210, representing currently used server resources. Server 204 is currently being used at 80% of the server's total capacity. In this example, servers are generally loaded to 80% capacity. In the example of FIGS. 2A-E, the organization managing the virtual/physical data center 202 intends to purchase an additional 10 servers due to an expected low price point for servers. Three different strategies for purchasing the 10 additional servers are shown, in FIGS. 2A-B, as strategies A 212, B 214, and C 216.

According to strategy A, the 10 additional servers 220-222 are immediately purchased and installed in the virtual/physical data center 212. Tasks running within the virtual/physical data center 212 are redistributed among the now 40 servers running within the virtual/physical data center. Redistribution of the tasks lowers the use of each server to 60% of capacity, as can be seen by comparing the size of the unshaded portion 224 and shaded portion 226 of server 204 in the virtual/physical data center illustrating strategy A 212 to the unshaded portion 208 and shaded portion 210 of server 204 in the initial 30-server virtual/physical data center 202.

Purchasing the 10 additional servers according to strategy B involves immediately purchasing the 10 additional servers 230-232 but leaving them powered down until there is additional demand within the virtual/physical data center for additional computational resources. Purchasing the 10 additional servers according to strategy C involves purchasing one additional server 234 and waiting to purchase a second additional server 235 until the first additional server 234 approaches use at 80% of capacity.

FIG. 2C illustrates the costs incurred at successive time points by the organization when additional servers are purchased according to strategies A, B, and C. The cost calculations are approximate and based on a coarse, 5-day granularity, but nonetheless relative accurately illustrate the cost implications of the three different strategies. For this simple example, there are four different types of costs associated with acquiring and running servers: (1) the cost of running a server 236, which includes power and maintenance costs, estimated at five dollars per day; (2) the cost of housing the server within the data center 237, estimated to be 1 dollar per day; (3) the cost of purchasing a new server 238, $800 at time $t_1$ (239 in table 240), with purchase-cost increases at subsequent time intervals shown in table 240; and (4) the cost of installing a server in the data center 241, estimated at $200 for installing a single server 242, but less per server as the number of servers installed at a single time point increases, as shown in table 243. In the current example, each interval between successive time points represents five days 244. The initial system includes 30 servers 245 and thus incurs a cost of $150 per day to run the servers and a cost of $30 per day to house the servers. In the lower portion of FIG. 2C 246, the accumulated costs for the data center at successive intervals $t_1, t_2, \ldots, t_6$ are shown for strategy A 247, strategy B 248, and strategy C 249. These costs assume that the purchase of the 10 additional servers begins at time point $t_1$, 5 days following an initial time point $t_0$. For strategy A, at time point $t_1$, the cost for running the 40 servers 250 is $200 per day, the cost for housing the servers 251 is $40 per day, the cost for purchasing the 10 additional servers 252 is $8000, according to table 240, and the cost of installing the 10 additional servers 253 is $1400, according to table 243. The total cost accumulated since time point $t_0$ 253 is $900, which is the cost of running the initial virtual/physical data center 202 per day, $180, multiplied by 5 days. For strategy A at time point $t_2$, the total cost accumulated since time point $t_0$ 255 is $11,500, which includes the total cost 254 of $900 accumulated up to time point $t_1$ along with the price of purchasing and installing the 10 additional servers and 5 times the daily cost of running the servers, $240×5=$1200. As shown in FIG. 2C, by time point $t_6$, the total accumulated cost 256 of strategy A is $16,300, the total accumulated cost 257 of strategy B is $15,300, and the total accumulated cost 258 of strategy C is $12,400. However, the rate of increase in total-accumulated-cost for strategy C is much steeper than those for strategies A and B.

FIG. 2D illustrates a fourth strategy D for purchasing the 10 additional servers made possible by the resource-exchange system. According to the fourth strategy D, the 10 additional servers 260-262 are immediately purchased and installed. However, rather than redistributing tasks within the virtual/physical data center, as in strategy A, the organization managing virtual/physical data center 202 advertises the availability of computational-resource leases to other organizations participating in the marketplace provided by the resource-exchange system. As a result, within a reasonably short period of time, the new additional servers are operating at 80% of capacity 263-2652 executing virtual machines on behalf of remote computational-resource leasing organizations. Because the organization managing virtual/physical data center 202 is leasing the 10 additional servers, there is a negative cost, or revenue 266, associated with the 10 additional servers. Using the same illustration conventions as used in FIG. 2C, the costs associated with strategy D are shown at successive time points 267-271. By comparing these costs to those for strategies A, B, and C, shown in FIG. 2C, the rate of increase in total-accumulated-cost for strategy D is much flatter than those for strategies A, B, and C.

FIG. 2E shows a plot of the total accumulated cost vs. time for the four strategies A, B, C, and D, discussed above with reference to FIGS. 2A-D. Clearly, after less than 30 days, strategy D, represented by cost curve 272, provides a significantly lower accumulated cost then strategies A, B, and C, represented by cost curves 273-275. The resource-exchange system has provided a way for the organization managing virtual/physical data center 202 to maximize use of the computational resources within the virtual/physical data center and, by doing so, minimize operating costs. In addition, the organizations that lease computational resources provided by the 10 additional servers also achieve access to greater computational bandwidth for far less cost than would be incurred by purchasing and installing new physical servers. Considering the data centers participating in the market provided by the resource-exchange system as a large computing-facility aggregation, the aggregate computational efficiency is much higher, when leasing transactions are automatically facilitated by the resource-exchange system, than when no resource exchanges are possible. In the example discussed above with reference to FIGS. 2A-E, a larger fraction of the aggregate computational resources of the data centers are used because additional tasks are being executed by the 10 additional servers. Eventually, the 10 additional servers in data center 202 may be used for executing tasks on behalf of the organization that manages virtual/physical data center 202, once the leases have terminated. But, by initially purchasing the 10 additional servers at time point $t_1$, the organization managing data center 202 has taken advantage of a favorable purchase price for the 10 additional servers at time point $t_1$ without bearing the cost of the spare capacity represented by the 10 additional servers until internal tasks become available.

FIG. 3 illustrates another example of how the resource-exchange system can increase the computational efficiency of an aggregation of virtual/physical data centers. At the top of FIG. 3, two virtual/physical data centers 302 and 304 are shown as large rectangles. Indications 306 and 308 of the currently available computational resources within the virtual/physical data centers 302 and 304 are shown within the rectangles representing virtual/physical data centers 302 and 304. These resources include CPU bandwidth, available memory, and available mass-storage, in appropriate units. The first virtual/physical data center 302 is shown receiving a request 310 to execute an additional task, implemented as a virtual machine, that requires 10 units of CPU bandwidth, 4 units of memory, and 100 units of mass storage. The first virtual/physical data center declines 312 the request because the first virtual/physical data center has insufficient storage resources for executing the virtual machine. Similarly, the second virtual/physical data center 304 receives a request 314 to execute a new virtual machine, but declines 316 the request because the second data lacks sufficient CPU bandwidth to execute the new virtual machine.

The same two virtual/physical data centers 302 and 304 and the same two virtual-machine-execution requests 310 and 314 are again shown in the lower portion of FIG. 3. However, in the example shown in the lower portion cf FIG. 3, the two data centers have exchanged two already executing virtual machines 320 and 322 via the marketplace provided by the resource-exchange system. The virtual/physical first data center 302 has leased computational resources from the second virtual/physical data center 304 to execute a storage-intensive virtual machine 320. Because the second virtual/physical data center has an excess of mass-storage resources, the second virtual/physical data center can host virtual machine 320 less expensively than the virtual machine can be executed within the first virtual/physical data center 302. Similarly, the second data center has leased computational resources from the first virtual/physical data center to execute the CPU-bandwidth-intensive virtual machine 322. The result of exchanging virtual machines 320 and 322 is a decrease in the operational costs for both data centers and more balanced ratios of different types of available computational resources within each virtual/physical data center. As a result, the first virtual/physical data center 302 can now accept 324 the virtual-machine-execution request 310 and the second virtual/physical data center 304 can now except 326 the virtual-machine-execution request 314. Thus, due to ongoing computational-resource exchanges made possible by the resource-exchange system, the partial aggregation of the two data centers can run more tasks, with greater overall capacity usage, than in the case that resource exchanges are not possible. The partial aggregation of the two virtual/physical data centers is significantly more computationally efficient because of their use of the marketplace provided by the resource-exchange system.

Thus, although the resource-exchange system is discussed in terms of providing a computational-resource-leasing marketplace, the resource-exchange system is an effective tool for increasing the computational efficiency of a partial aggregation of multiple data centers or multiple clusters within a datacenter. The resource-exchange system functions to increase the fraction of resource-capacity usage in the partial aggregation of multiple data centers as well as to redistribute load in order to balance the ratios of different available computational resources used within each data center to facilitate execution of additional task load.

Overview of Computer Systems and Computer Architecture

Figure 4:
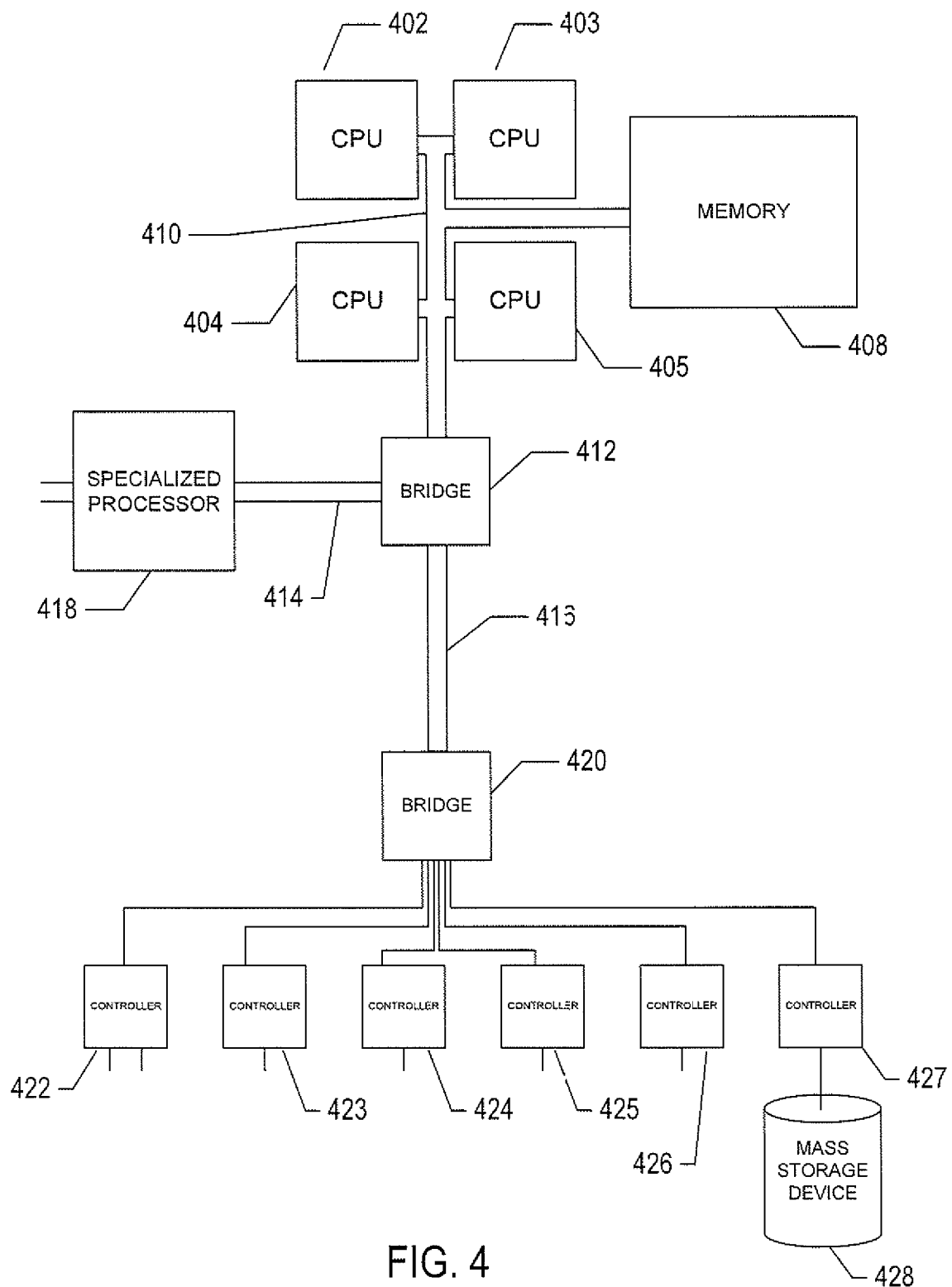
FIG. 4 provides a general architectural diagram for various types of computers.

FIG. 4 provides a general architectural diagram for various types of computers. The computer system contains one or multiple central processing units ("CPUs") 402-405, one or more electronic memories 408 interconnected with the CPUs by a CPU/memory-subsystem bus 410 or multiple busses, a first bridge 412 that interconnects the CPU/memory-subsystem bus 410 with additional busses 414 and 416, or other types of high-speed interconnection media, including multiple, high-speed serial interconnects. These busses or serial interconnections, in turn, connect the CPUs and memory with specialized processors, such as a graphics processor 418, and with one or more additional bridges 420, which are interconnected with high-speed serial links or with multiple controllers 422-427, such as controller 427, that provide access to various different mass-storage devices 428, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 5:
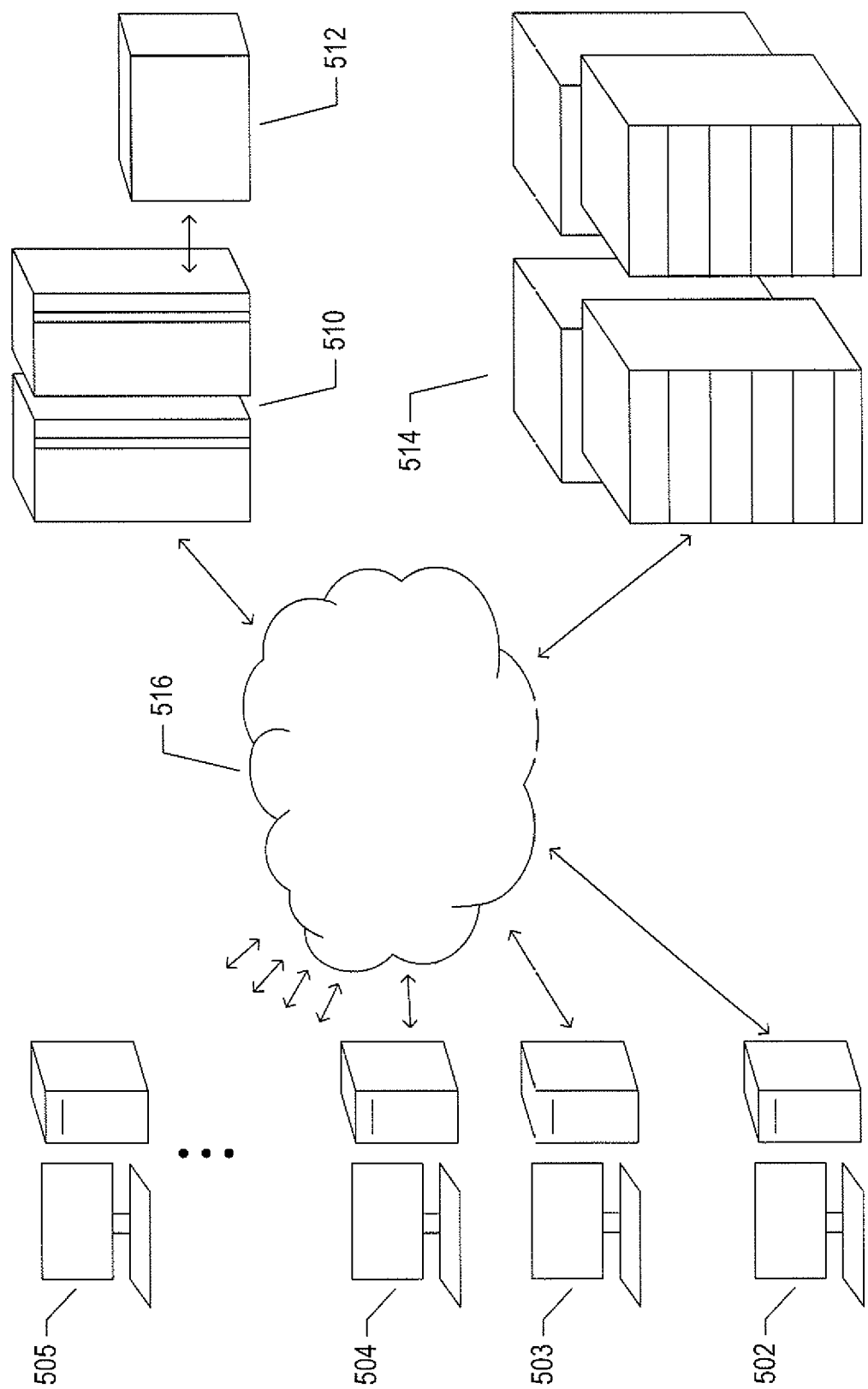
FIG. 5 illustrates an Internet-connected distributed computer system.

FIG. 5 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 5 shows a typical distributed system in which a large number of PCs 502-505, a high-end distributed mainframe system 510 with a large data-storage system 512, and a large computer center 514 with large numbers of rack-mounted servers or blade servers all interconnected through various communications and networking systems that together comprise the Internet 516. Such distributed computer systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 6:
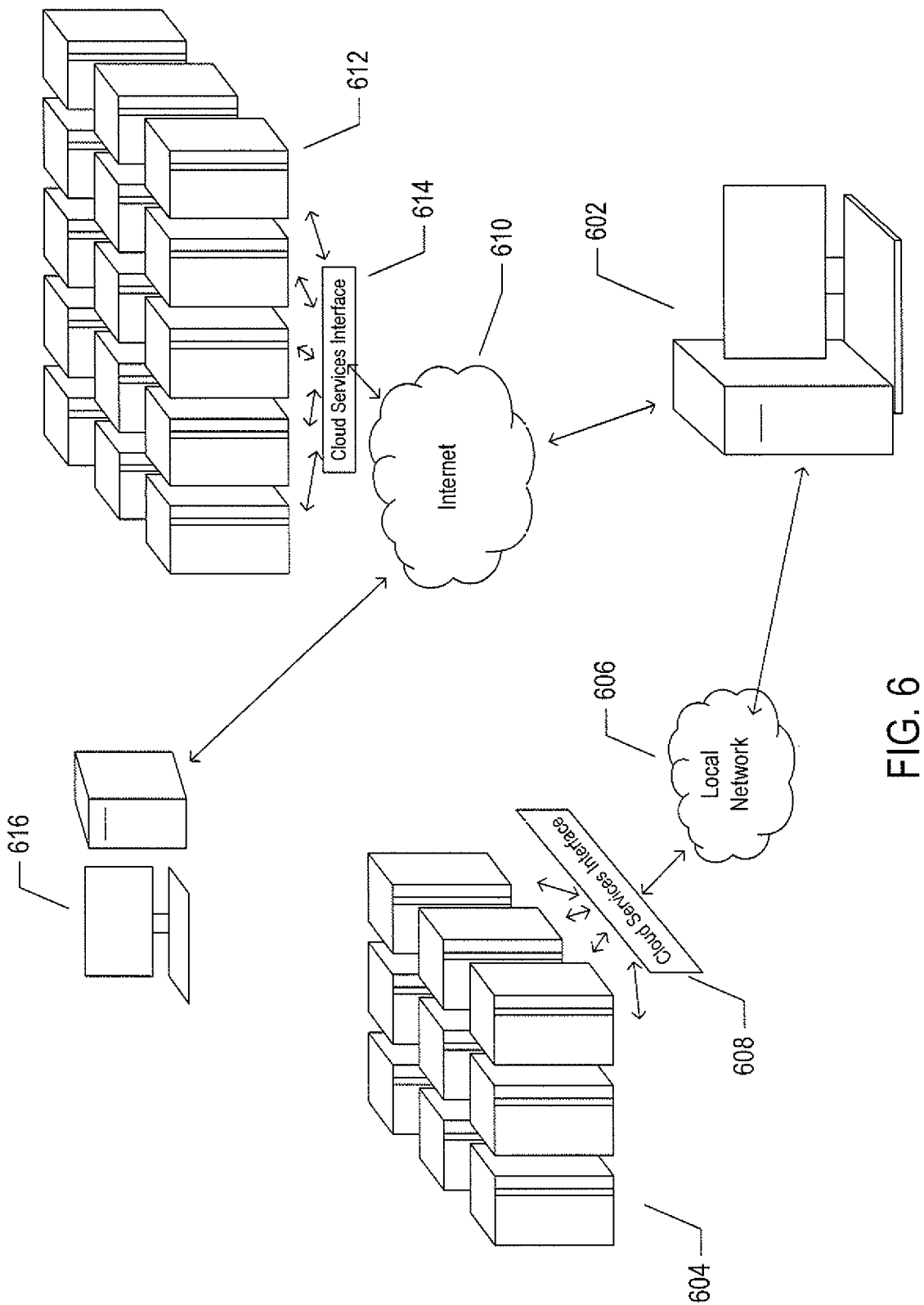
FIG. 6 illustrates cloud computing.

FIG. 6 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 6, a system administrator for an organization, using a PC 602, accesses the organization's private cloud 604 through a local network 606 and private-cloud interface 608 and also accesses, through the Internet 610, a public cloud 612 through a public-cloud services interface 614. The administrator can, in either the case of the private cloud 604 or public cloud 612, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 616.

Figure 7:
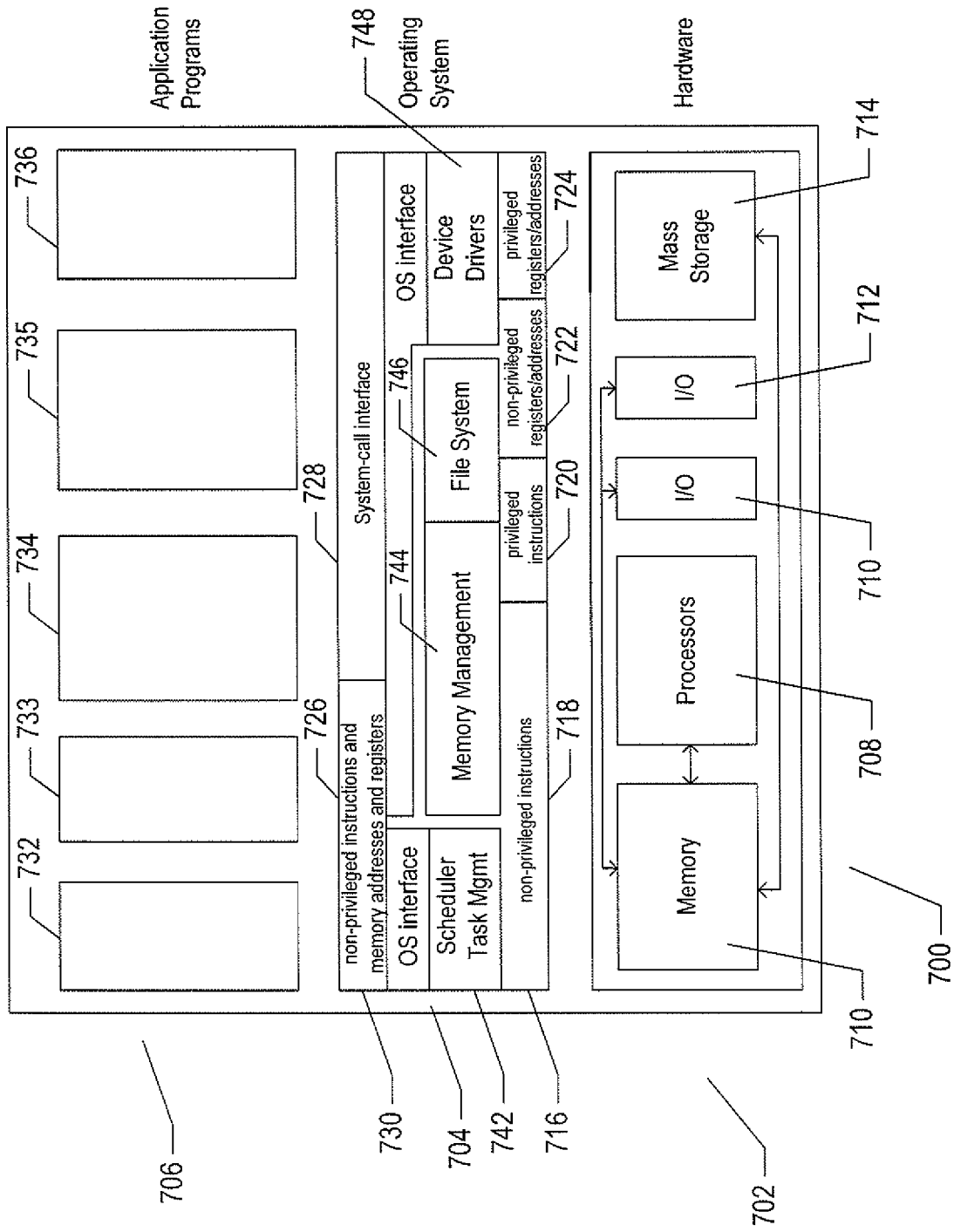
FIG. 7 illustrates generalized hardware and software components of a general-purpose computer system, such as a general-purpose computer system having an architecture similar to that shown in FIG. 1.

FIG. 7 illustrates generalized hardware and software components of a general-purpose computer system, such as a general-purpose computer system having an architecture similar to that shown in FIG. 4. The computer system 700 is often considered to include three fundamental layers: (1) a hardware layer or level 702; (2) an operating-system layer or level 704; and (3) an application-program layer or level 706. The hardware layer 702 includes one or more processors 708, system memory 710, various input-output ("I/O") devices 710 and 712, and mass-storage devices 714. Of course, the hardware level also includes many other components, including power supplies, internal communications links and busses, specialized integrated circuits, many different types of processor-controlled or microprocessor-controlled peripheral devices and controllers, and many other components. The operating system 704 interfaces to the hardware level 702 through a low-level operating system and hardware interface 716 generally comprising a set of non-privileged computer instructions 718, a set of privileged computer instructions 720, a set of non-privileged registers and memory addresses 722, and a set of privileged registers and memory addresses 724. In general, the operating system exposes non-privileged instructions, non-privileged registers, and non-privileged memory addresses 726 and a system-call interface 728 as an operating-system interface 730 to application programs 732-736 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 742, memory management 744, a file system 746, device drivers 748, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 746 facilitates abstraction of mass-storage-device and memory resources as a high-level, easy-to-access, file-system interface.

In many modern operating systems, the operating system provides an execution environment for concurrent execution of a large number of processes, each corresponding to an executing application program, on one or a relatively small number of hardware processors by temporal multiplexing of process execution. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 8A:
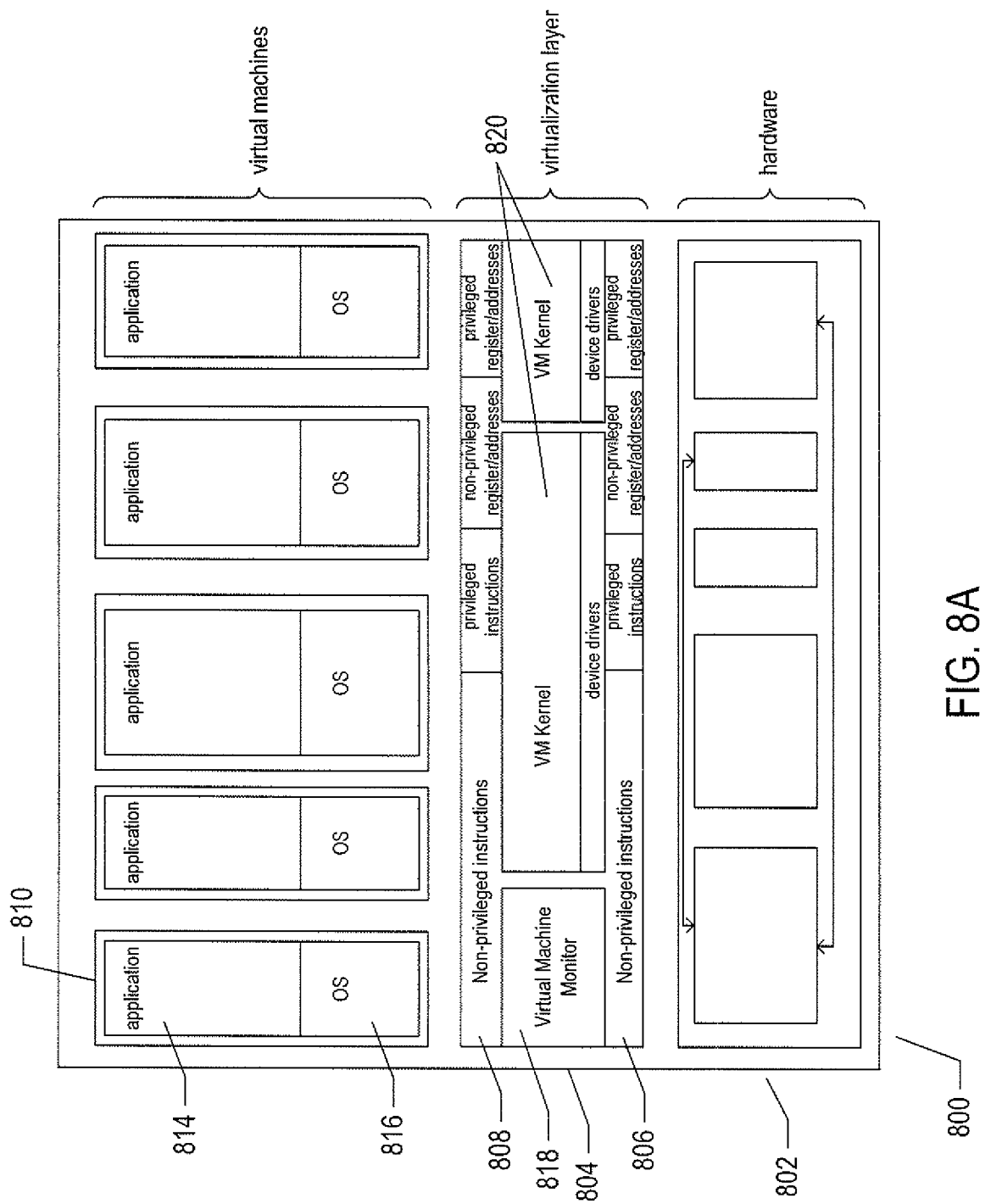
FIGS. 8A-D illustrate several types of virtual machine and virtual-machine execution environments.
Figure 8B:
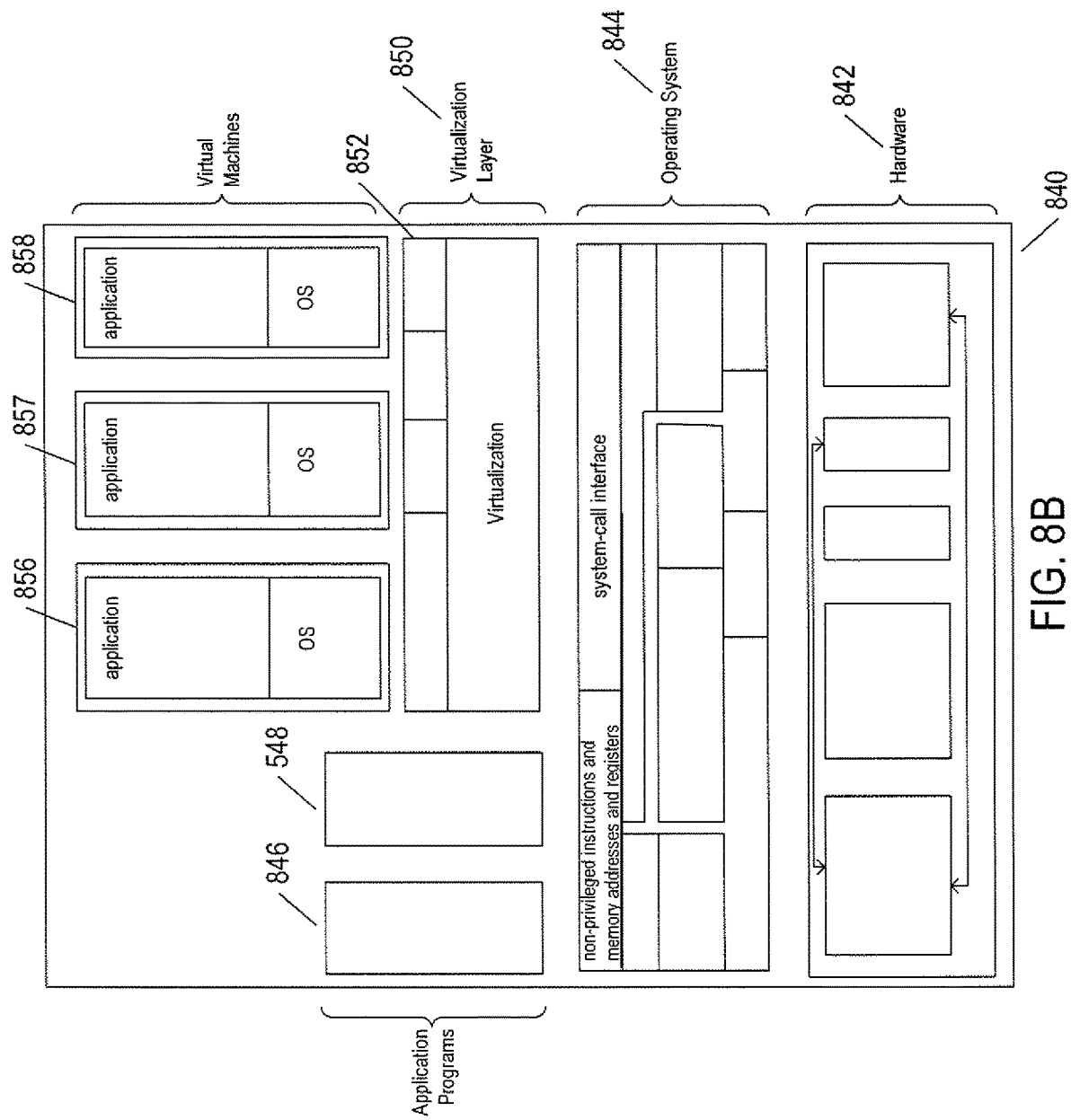

For these reasons, a higher level of abstraction, referred to as the "virtual machine," has been developed and evolved to further abstract computer hardware in order to address many difficulties and challenges associated with traditional computing systems, including the compatibility issues discussed above. FIGS. 8A-B illustrate two types of virtual machine and virtual-machine execution environments. FIGS. 8A-B use the same illustration conventions as used in FIG. 7. FIG. 8A shows a first type of virtualization. The computer system 800 in FIG. 8A includes the same hardware layer 802 as the hardware layer 702 shown in FIG. 7. However, rather than providing an operating system layer directly above the hardware layer, as in FIG. 7, the virtualized computing environment illustrated in FIG. 8A features a virtualization layer 804 that interfaces through a virtualization-layer/hardware-layer interface 806, equivalent to interface 716 in FIG. 7, to the hardware. The virtualization layer provides a hardware-like interface 808 to a number of virtual machines, such as virtual machine 810, executing above the virtualization layer in a virtual-machine layer 812. Each virtual machine includes one or more application programs or other higher-level computational entities packaged together with an operating system, referred to as a "guest operating system," such as application 814 and guest operating system 816 packaged together within virtual machine 810. Each virtual machine is thus equivalent to the operating-system layer 704 and application-program layer 706 in the general-purpose computer system shown in FIG. 7. Each guest operating system within a virtual machine interfaces to the virtualization-layer interface 808 rather than to the actual hardware interface 806. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 808 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 818 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 808, the accesses result in execution of virtualization-layer code to simulate or emulate the privileged resources. The virtualization layer additionally includes a kernel module 820 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 8B illustrates a second type of virtualization. In FIG. 8B, the computer system 840 includes the same hardware layer 842 and software layer 844 as the hardware layer 702 shown in FIG. 7. Several application programs 846 and 848 are shown running in the execution environment provided by the operating system. In addition, a virtualization layer 850 is also provided, in computer 840, but, unlike the virtualization layer 804 discussed with reference to FIG. 8A, virtualization layer 850 is layered above the operating system 844, referred to as the "host OS," and uses the operating system interface to access operating-system-provided functionality as well as the hardware. The virtualization layer 850 comprises primarily a VMM and a hardware-like interface 852, similar to hardware-like interface 808 in FIG. 8A. The virtualization-layer/hardware-layer interface 852, similar to interface 716 in FIG. 7, provides an execution environment for a number of virtual machines 856-858, each including one or more application programs or other higher-level computational entities packaged together with a guest operating system.

In FIGS. 8A-B, the layers are somewhat simplified for clarity of illustration. For example, portions of the virtualization layer 850 may reside within the host-operating-system kernel, such as a specialized driver incorporated into the host operating system to facilitate hardware access by the virtualization layer.

Figure 8C:
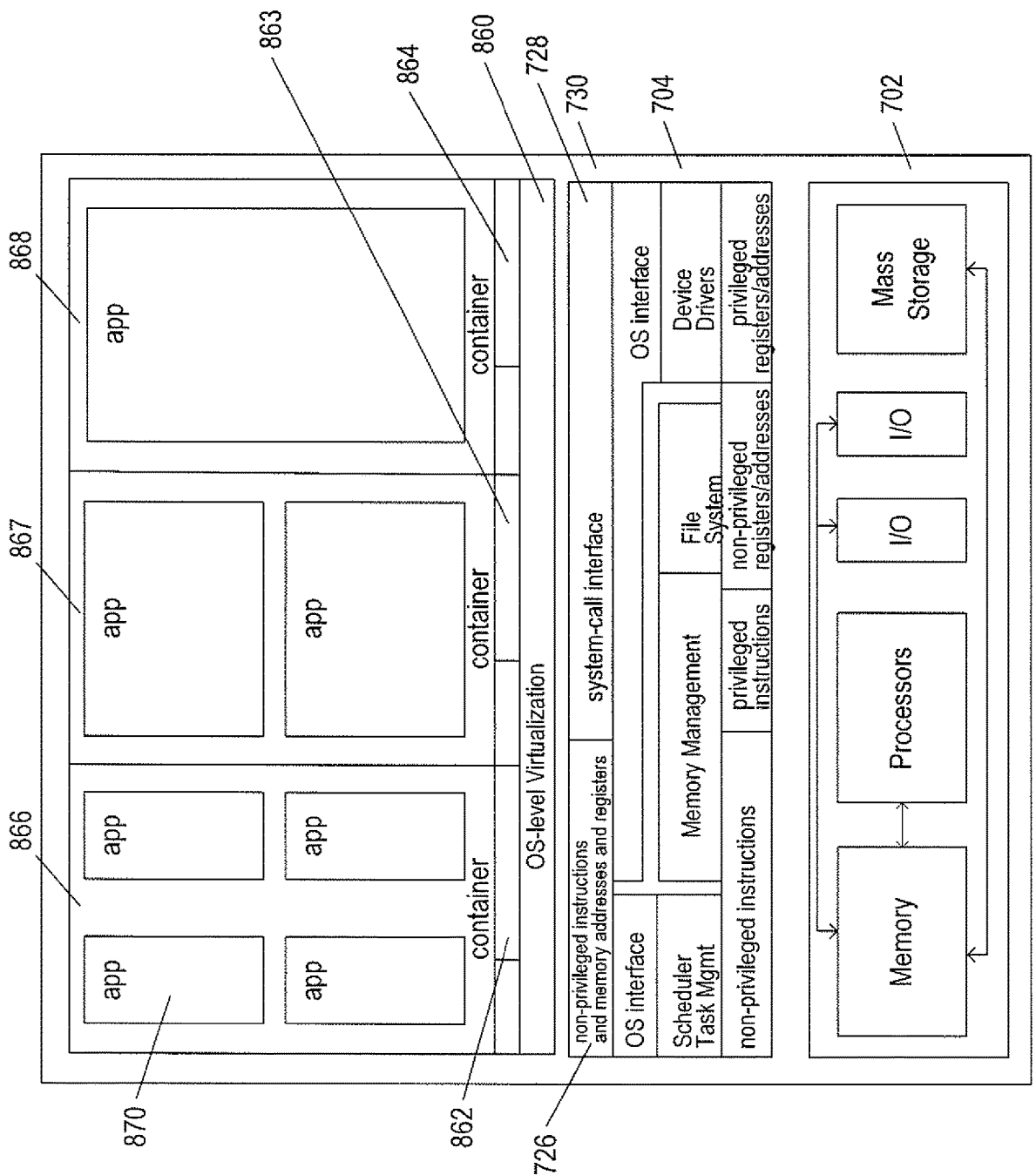

While the traditional virtual-machine-based virtualization layers, described with reference to FIGS. 8A-B, have enjoyed widespread adoption and use in a variety of different environments, from personal computers to enormous distributed computing systems, traditional virtualization technologies are associated with computational overheads. While these computational overheads have been steadily decreased, over the years, and often represent ten percent or less of the total computational bandwidth consumed by an application running in a virtualized environment, traditional virtualization technologies nonetheless involve computational costs in return for the power and flexibility that they provide. Another approach to virtualization is referred to as operating-system-level virtualization ("OSL virtualization"). FIG. 8C illustrates the OSL-virtualization approach. In FIG. 8C, as in previously discussed FIG. 7, an operating system 704 runs above the hardware 702 of a host computer. The operating system provides an interface for higher-level computational entities, the interface including a system-call interface 728 and exposure to the non-privileged instructions and memory addresses and registers 726 of the hardware layer 702. However, unlike in FIG. 8A, rather than applications running directly above the operating system, OSL virtualization involves an OS-level virtualization layer 860 that provides an operating-system interface 862-864 to each of one or more containers 866-868. The containers, in turn, provide an execution environment for one or more applications, such as application 870 running within the execution environment provided by container 866. The container can be thought of as a partition of the resources generally available to higher-level computational entities through the operating system interface 730. While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system. In essence, OSL virtualization uses operating-system features, such as name space support, to isolate each container from the remaining containers so that the applications executing within the execution environment provided by a container are isolated from applications executing within the execution environments provided by all other containers. As a result, a container can be booted up much faster than a virtual machine, since the container uses operating-system-kernel features that are already available within the host computer. Furthermore, the containers share computational bandwidth, memory, network bandwidth, and other computational resources provided by the operating system, without resource overhead allocated to virtual machines and virtualization layers. Again, however, OSL virtualization does not provide many desirable features of traditional virtualization. As mentioned above, OSL virtualization does not provide a way to run different types of operating systems for different groups of containers within the same host system, nor does OSL-virtualization provide for live migration of containers between host computers, as does traditional virtualization technologies.

Figure 8D:
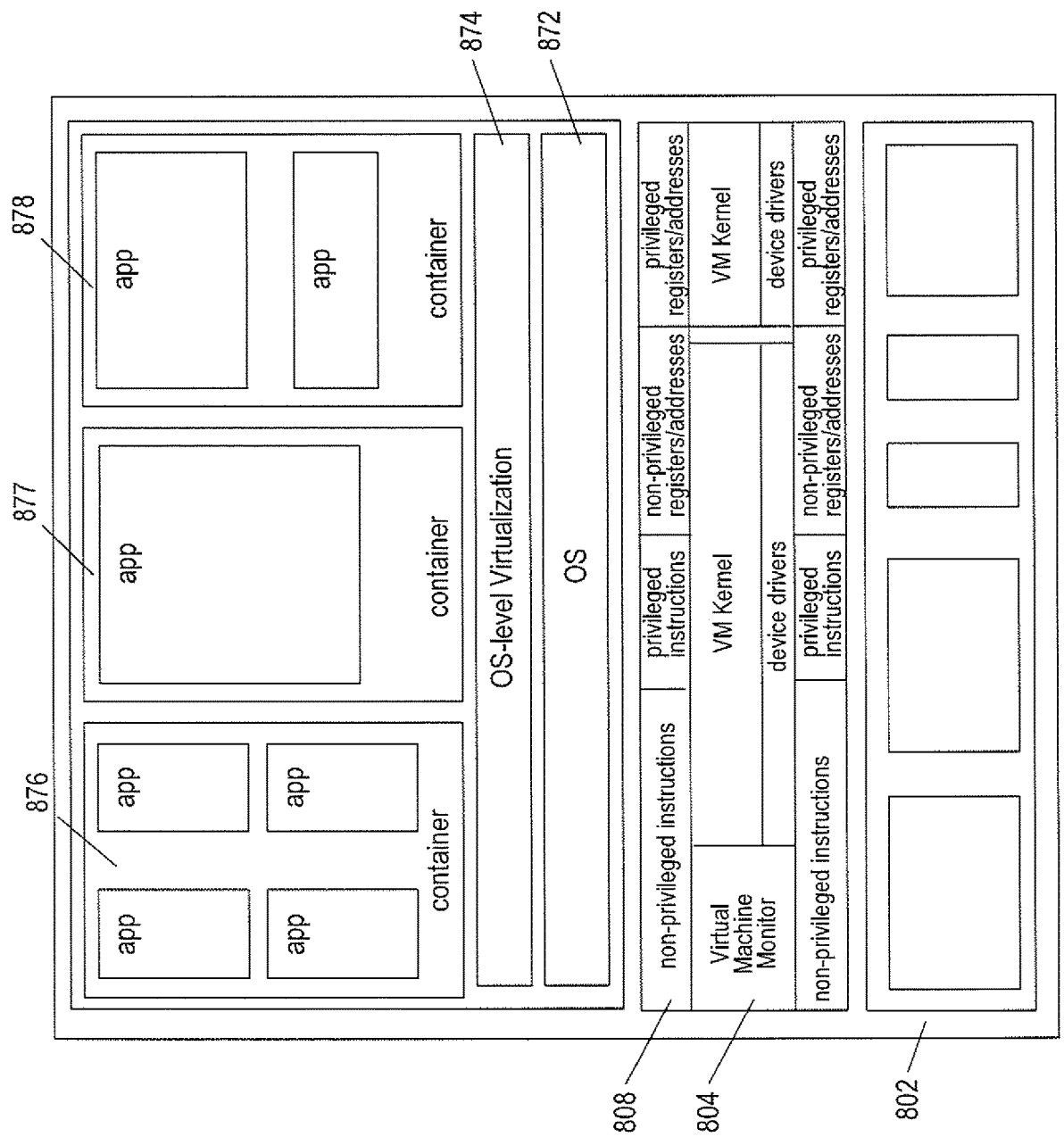

FIG. 8D illustrates an approach to combining the power and flexibility of traditional virtualization with the advantages of OSL virtualization. FIG. 8D shows a host computer similar to that shown in FIG. 8A, discussed above. The host computer includes a hardware layer 802 and a virtualization layer 804 that provides a simulated hardware interface 808 to an operating system 872. Unlike in FIG. 8A, the operating system interfaces to an OSL-virtualization layer 874 that provides container execution environments 876-878 to multiple application programs. Running containers above a guest operating system within a virtualized host computer provides many of the advantages of traditional virtualization and OSL virtualization. Containers can be quickly booted in order to provide additional execution environments and associated resources to new applications. The resources available to the guest operating system are efficiently partitioned among the containers provided by the OSL-virtualization layer 874. Many of the powerful and flexible features of the traditional virtualization technology can be applied to containers running above guest operating systems including live migration from one host computer to another, various types of high-availability and distributed resource sharing, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides flexible and easy scaling and a simple approach to operating-system upgrades and patches. Thus, the use of OSL virtualization above traditional virtualization, as illustrated in FIG. 8D, provides much of the advantages of both a traditional virtualization layer and the advantages of OSL virtualization. Note that, although only a single guest operating system and OSL virtualization layer as shown in FIG. 8D, a single virtualized host system can run multiple different guest operating systems within multiple virtual machines, each of which supports one or more containers.

In FIGS. 8A-D, the layers are somewhat simplified for clarity of illustration. For example, portions of the virtualization layer 850 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 9:
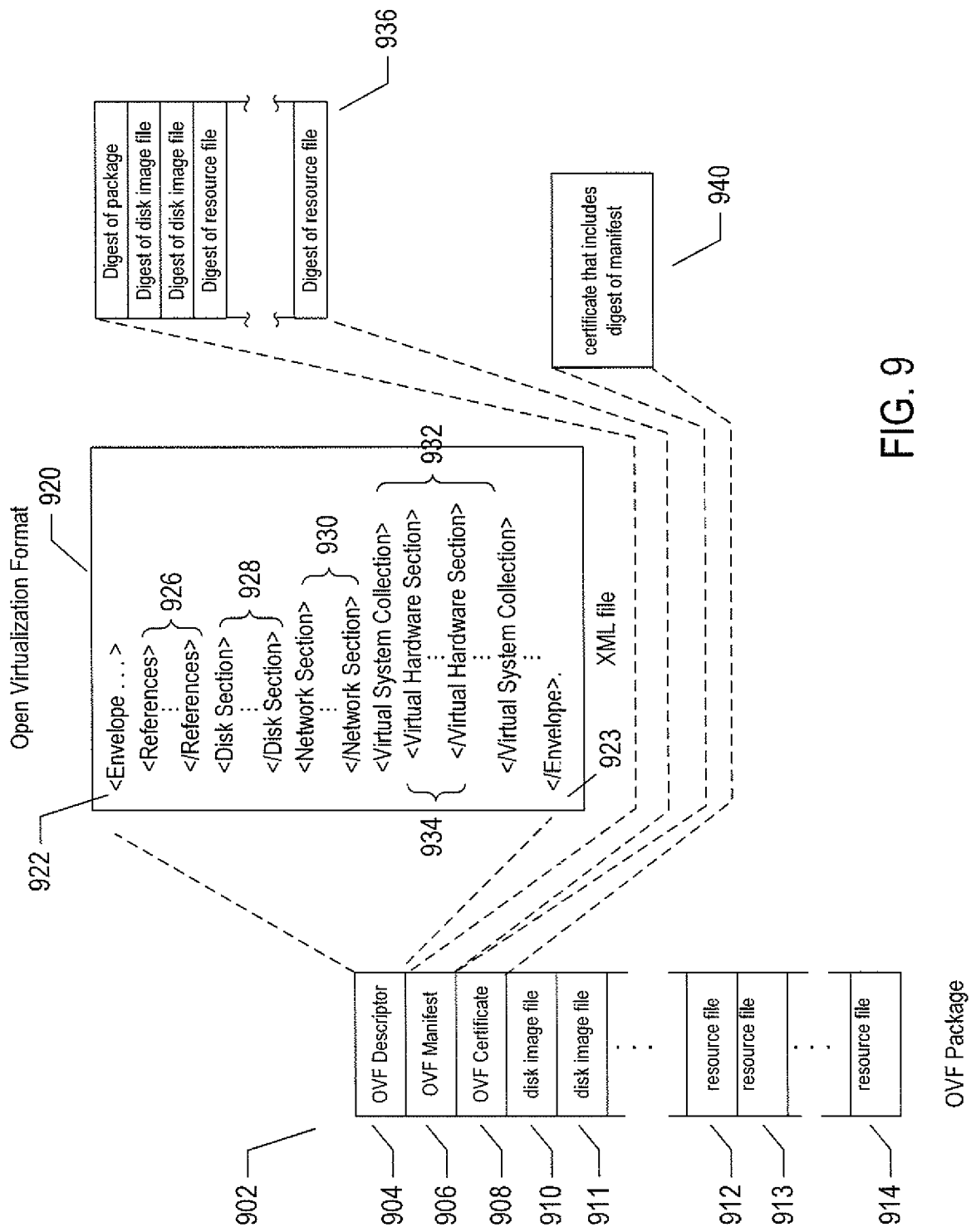
FIG. 9 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 9 illustrates an OVF package. An OVF package 902 includes an OVF descriptor 904, an OVF manifest 906, an OVF certificate 908, one or more disk-image files 910-911, and one or more resource files 912-914. The OVF package can be encoded and stored as a single file or as a set of files. The OVF descriptor 904 is an XML document 920 that includes a hierarchical set of elements, each demarcated by a beginning tag and an ending tag. The outermost, or highest-level, element is the envelope element, demarcated by tags 922 and 923. The next-level element includes a reference element 926 that includes references to all files that are part of the OVF package, a disk section 928 that contains meta information about the virtual disks included in the OVF package, a networks section 930 that includes meta information about the logical networks included in the OVF package, and a collection of virtual-machine configurations 932 which further includes hardware descriptions of each virtual machine 934. There are many additional hierarchical levels and elements within a typical OVF descriptor. The OVF descriptor is thus a self-describing XML file that describes the contents of an OVF package. The OVF manifest 906 is a list of cryptographic-hash-function-generated digests 936 of the entire OVF package and of the various components of the OVF package. The OVF certificate 908 is an authentication certificate 940 that includes a digest of the manifest and that is cryptographically signed. Disk image files, such as disk image file 910, are digital encodings of the contents of virtual disks and resource files 912 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 10:
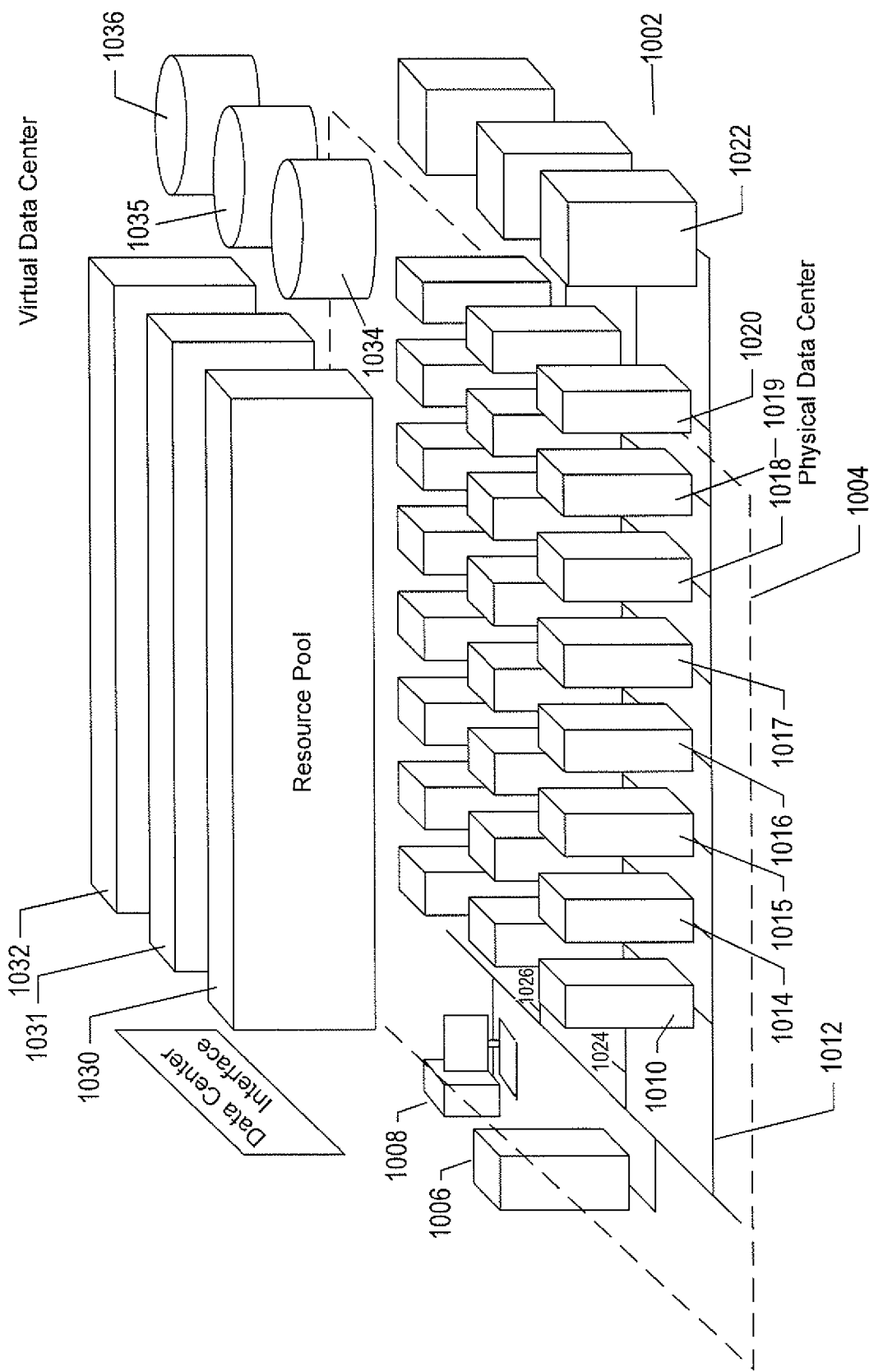
FIG. 10 illustrates virtual data centers provided as an abstraction of underlying physical-data-center hardware components.

FIG. 10 illustrates virtual data centers provided as an abstraction of underlying physical-data-center hardware components. In FIG. 10, a physical data center 1002 is shown below a virtual-interface plane 1004. The physical data center consists of a virtual-infrastructure management server ("VI-management-server") 1006 and any of various different computers, such as PCs 1008, on which a virtual-data-center management interface may be displayed to system administrators and other users. The physical data center additionally includes generally large numbers of server computers, such as server computer 1010, that are coupled together by local area networks, such as local area network 1012 that directly interconnects server computer 1010 and 1014-1020 and a mass-storage array 1022. The physical data center shown in FIG. 10 includes three local area networks 1012, 1024, and 1026 that each directly interconnects a bank of eight servers and a mass-storage array. The individual server computers, such as server computer 1010, each includes a virtualization layer and runs multiple virtual machines. Different physical data centers may include many different types of computers, networks, data-storage systems and devices connected according to many different types of connection topologies. The virtual-data-center abstraction layer 1004, a logical abstraction layer shown by a plane in FIG. 10, abstracts the physical data center to a virtual data center comprising one or more resource pools, such as resource pools 1030-1032, one or more virtual data stores, such as virtual data stores 1034-1036, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 11:
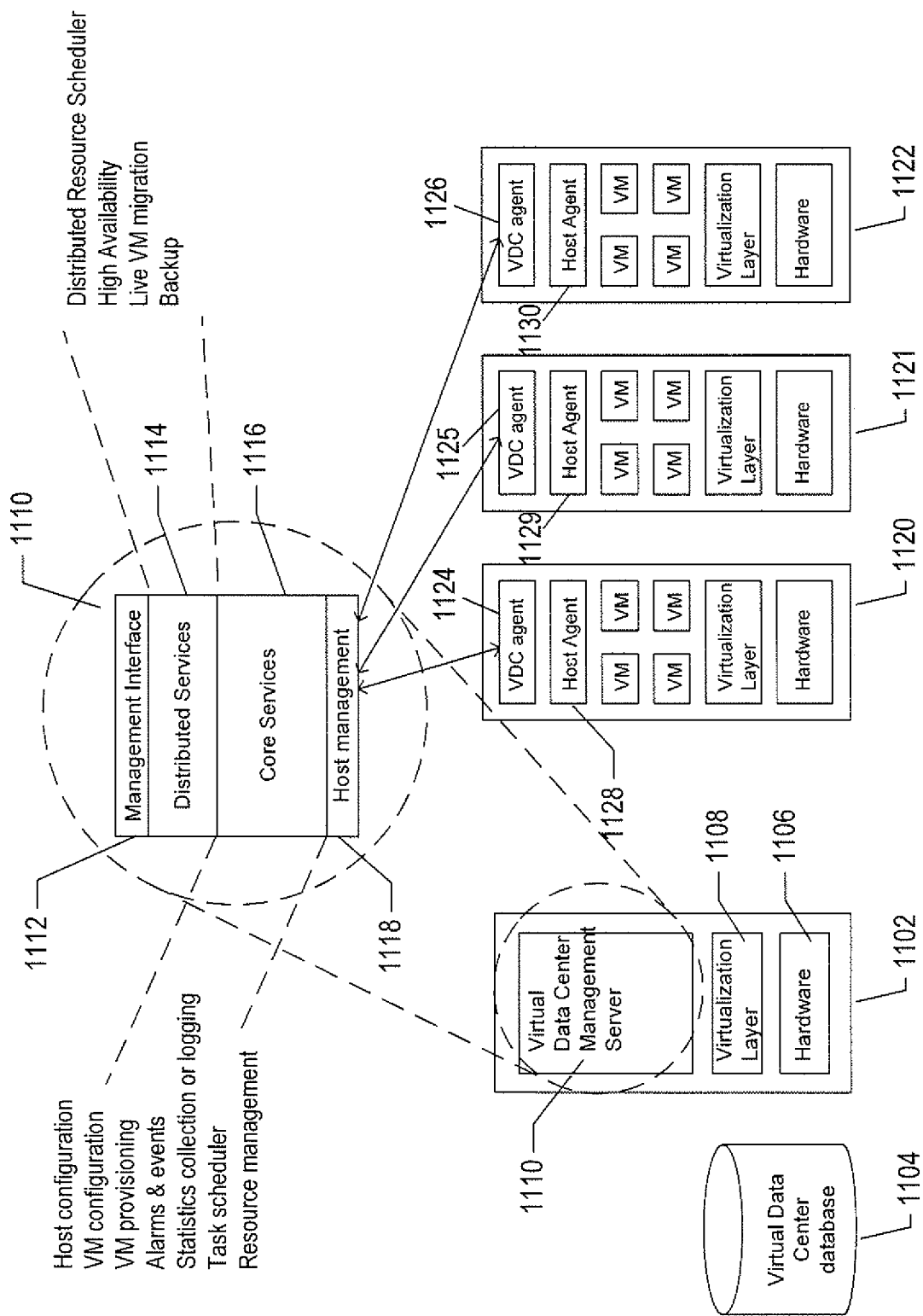
FIG. 11 illustrates virtual-machine components of a VI-management-server and physical servers of a physical data center above which a virtual-data-center interface is provided by the VI-management-server.

FIG. 11 illustrates virtual-machine components of a VI-management-server and physical servers of a physical data center above which a virtual-data-center interface is provided by the VI-management-server. The VI-management-server 1102 and a virtual-data-center database 1104 comprise the physical components of the management component of the virtual data center. The VI-management-server 1102 includes a hardware layer 1106 and virtualization layer 1108, and runs a virtual-data-center management-server virtual machine 1110 above the virtualization layer. Although shown as a single server in FIG. 11, the VI-management-server ("VI management server") may include two or more physical server computers that support multiple VI-management-server virtual appliances. The virtual machine 1110 includes a management-interface component 1112, distributed services 1114, core services 1116, and a host-management interface 1118. The management interface is accessed from any of various computers, such as the PC 1008 shown in FIG. 10. The management interface allows the virtual-data-center administrator to configure a virtual data center, provision virtual machines, collect statistics and view log files for the virtual data center, and to carry out other, similar management tasks. The host-management interface 1118 interfaces to virtual-data-center agents 1124, 1125, and 1126 that execute as virtual machines within each of the physical servers of the physical data center that is abstracted to a virtual data center by the VI management server.

The distributed services 1114 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VI management server include host configuration, virtual-machine configuration, virtual-machine provisioning, generation of virtual-data-center alarms and events, ongoing event logging and statistics collection, a task scheduler, and a resource-management module. Each physical server 1120-1122 also includes a host-agent virtual machine 1128-1130 through which the virtualization layer can be accessed via a virtual-infrastructure application programming interface ("API"). This interface allows a remote administrator or user to manage an individual server through the infrastructure API. The virtual-data-center agents 1124-1126 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VI management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions virtual data centers ("VDCs") into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 12:
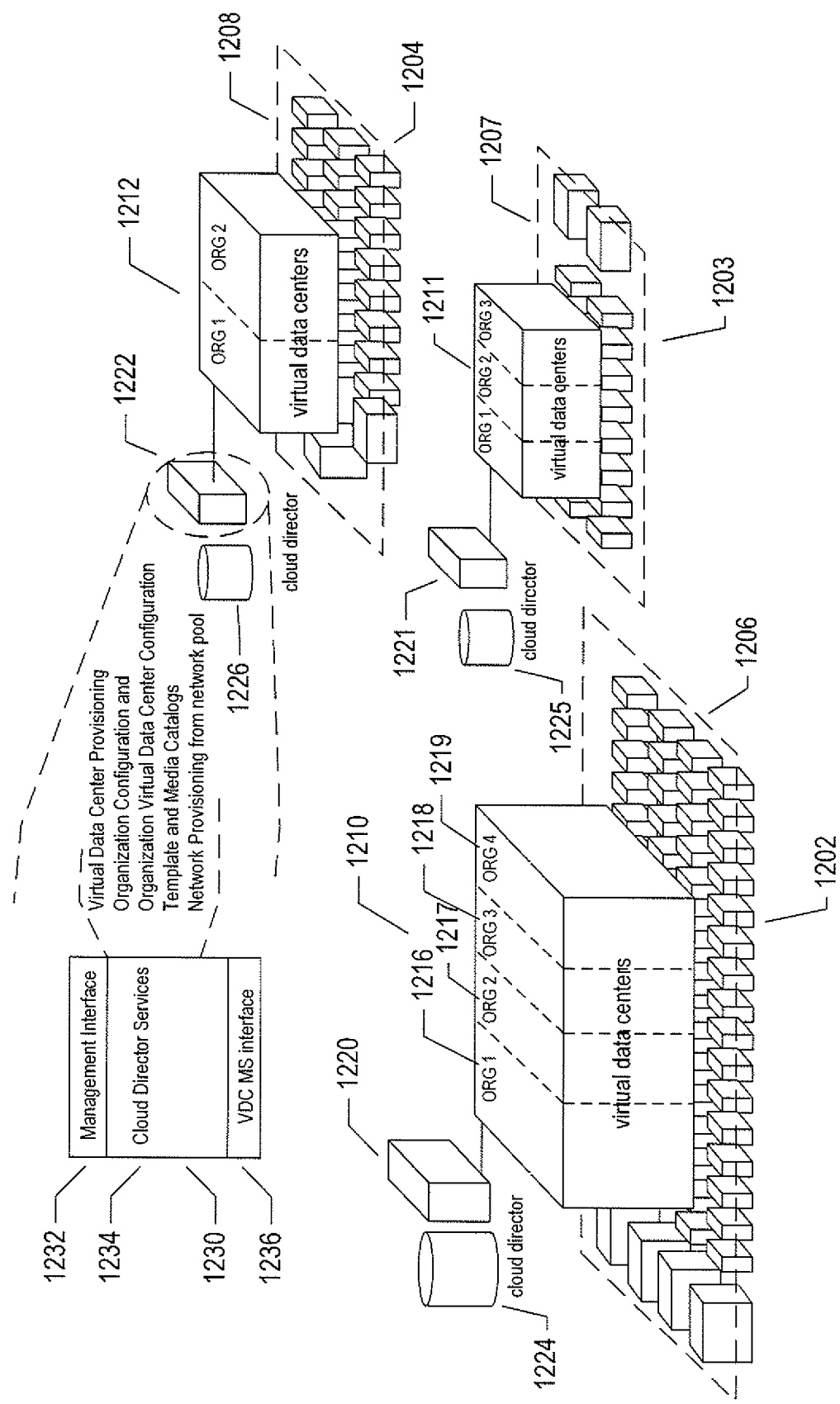
FIG. 12 illustrates a cloud-director level of abstraction.

FIG. 12 illustrates a cloud-director level of abstraction. In FIG. 12, three different physical data centers 1202-1204 are shown below planes representing the cloud-director layer of abstraction 1206-1208. Above the planes representing the cloud-director level of abstraction, multi-tenant virtual data centers 1210-1212 are shown. The resources of these multi-tenant virtual data centers are securely partitioned in order to provide secure virtual data centers to multiple tenants, or cloud-services-accessing organizations. For example, a cloud-services-provider virtual data center 1210 is partitioned into four different tenant-associated virtual-data centers within a multi-tenant virtual data center for four different tenants 1216-1219. Each multi-tenant virtual data center is managed by a cloud director comprising one or more cloud-director servers 1220-1222 and associated cloud-director databases 1224-1226. Each cloud-director server or servers runs a cloud-director virtual appliance 1230 that includes a cloud-director management interface 1232, a set of cloud-director services 1234, and a virtual-data-center management-server interface 1236. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 10 and 12, the VI management server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 13:
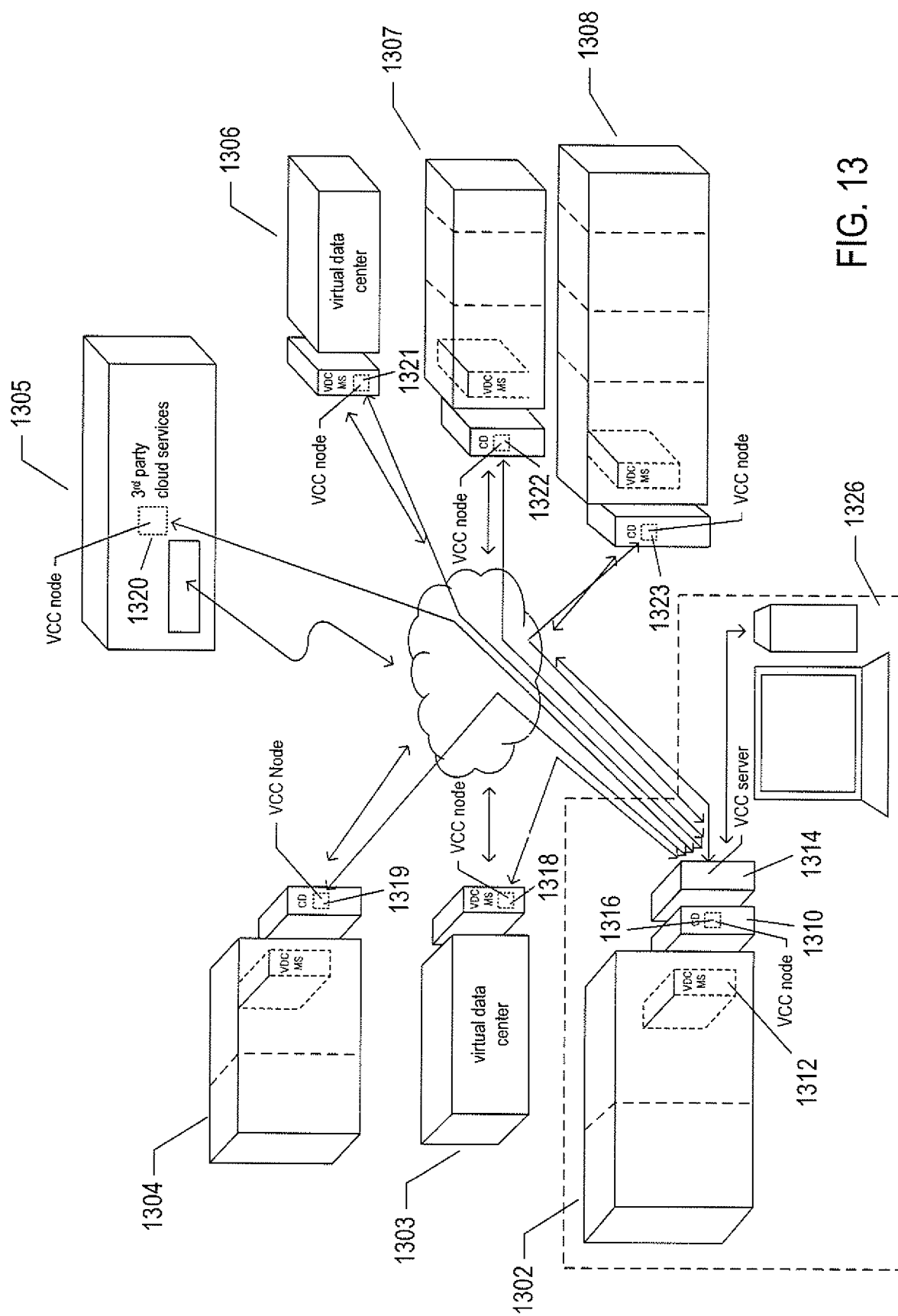
FIG. 13 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 13 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 13, seven different cloud-computing facilities are illustrated 1302-1308. Cloud-computing facility 1302 is a private multi-tenant cloud with a cloud director 1310 that interfaces to a VI management server 1312 to provide a multi-tenant private cloud comprising multiple tenant-associated virtual data centers. The remaining cloud-computing facilities 1303-1308 may be either public or private cloud-computing facilities and may be single-tenant virtual data centers, such as virtual data centers 1303 and 1306, multi-tenant virtual data centers, such as multi-tenant virtual data centers 1304 and 1307-1308, or any of various different kinds of third-party cloud-services facilities, such as third-party cloud-services facility 1305. An additional component, the VCC server 1314, acting as a controller is included in the private cloud-computing facility 1302 and interfaces to a VCC node 1316 that runs as a virtual appliance within the cloud director 1310. A VCC server may also run as a virtual appliance within a VI management server that manages a single-tenant private cloud. The VCC server 1314 additionally interfaces, through the Internet, to VCC node virtual appliances executing within remote VI management servers, remote cloud directors, or within the third-party cloud services 1318-1323. The VCC server provides a VCC server interface that can be displayed on a local or remote terminal, PC, or other computer system 1326 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Distributed-Search Engine

The current document is directed to a distributed resource-exchange system that employs a distributed-search subsystem to identify potential resource exchanges and select, from the identified potential resource exchanges, resource exchanges that best meet specified requirements and constraints. The distributed-search subsystem provides an auction-based method for matching of resource providers to resource users within a very large, distributed aggregation of virtual and physical data centers owned and managed by a large number of different organization. The distributed-search subsystem, however, is a general searching subsystem that can be used for many additional distributed-search operations.

Distributed searches are initiated by distributed-search participants, which may be any type of processor-controlled device that supports access to a distributed-search application programming interface ("APP") or graphical user interface ("UI"). In a described implementation, the distributed-search subsystem comprises one or more local instances and one or more distributed-search engines. In the described implementation, local instances execute as web-application plug-ins within one or more virtual machines of a management subsystem. However, many alternative implementations are possible, including standalone applications and even hardware appliances. The local instances support the distributed-search API and/or UI, store local-instance data to support the distributed-search API and/or UI, and exchange request messages and response messages with the one or more distributed-search engines to initiate distributed searches, add attributes to a set of centrally stored attributes, and manage operation of the distributed-search subsystem. The one or more distributed-search engines communicate with local instances, centrally store various types of distributed-search-subsystem data, and carry out distributed searches on behalf of requesting local instances, maintaining an active search context for each search.

Entities for which searches are carried out can be of many different types, from information and data to hardware components and subsystems, automated services, products, remote computer systems connected to the distributed computer system, human users of those systems, and various types of computers, information, devices, and information accessible to the remote computer systems. The entities are characterized by attribute/value pairs. For example, a computational resource might be characterized by the attribute/value pairs: memory/2 GB; processor_bandwidth/1.2 GHz; network_bandwidth/100 MB\sec. Search results may include the values for one or more attributes as well as identifying information for providers, network addresses, and additional information.

Searches are parameterized by attribute/value pairs. These parameters may specify a scope for the search, minimum requirements for successful responses, search termination conditions, and many other operational parameters that allow searches to accurately tailored to user and participant needs. Participants may also be characterized by attribute/value pairs. For example, participants may be characterized by ratings that reflect past performance in supplying requested products and services.

Figure 14A:
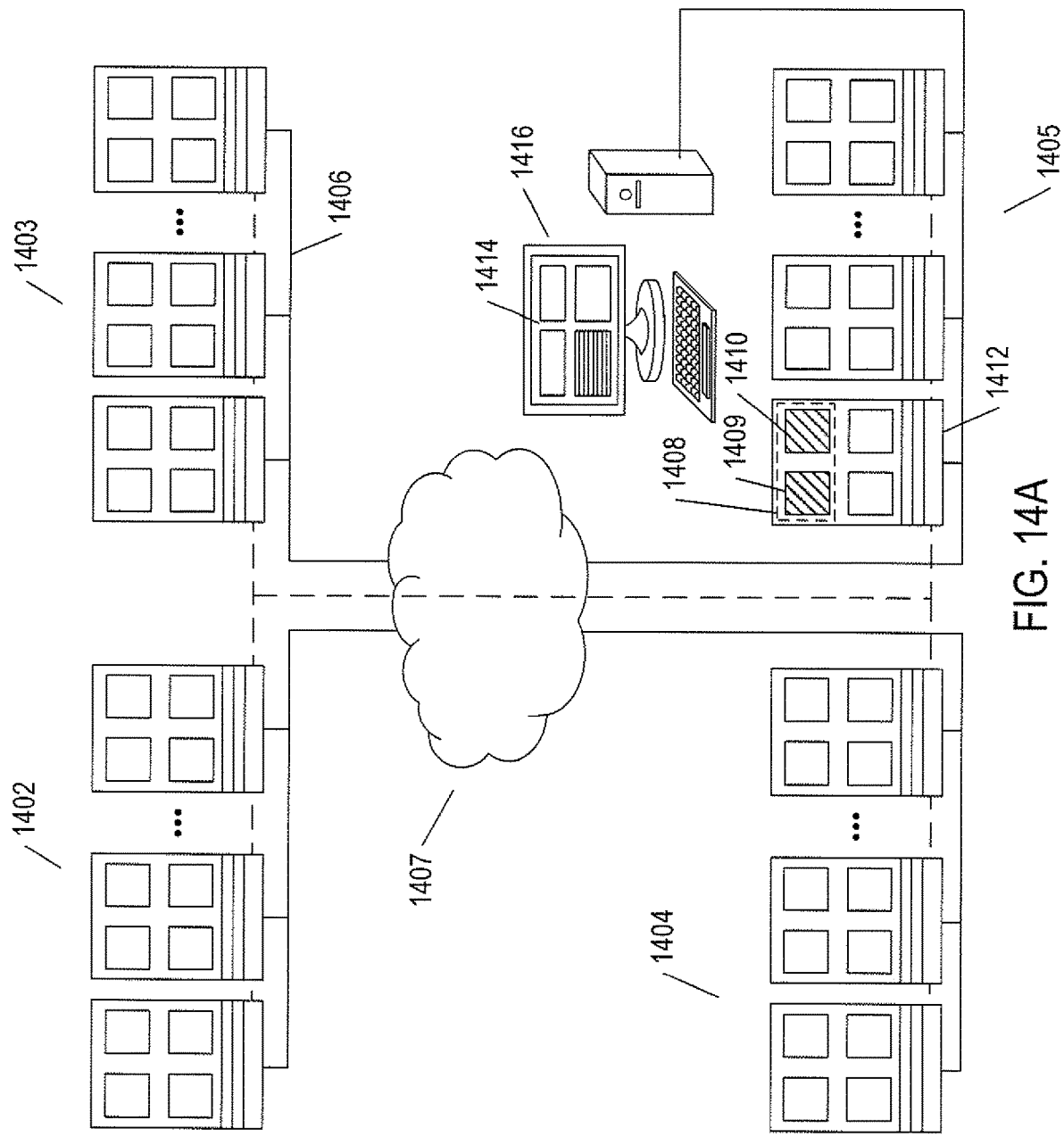
FIGS. 14A-C illustrate components and general operation of the distributed-search methods and subsystems.
Figure 14B:
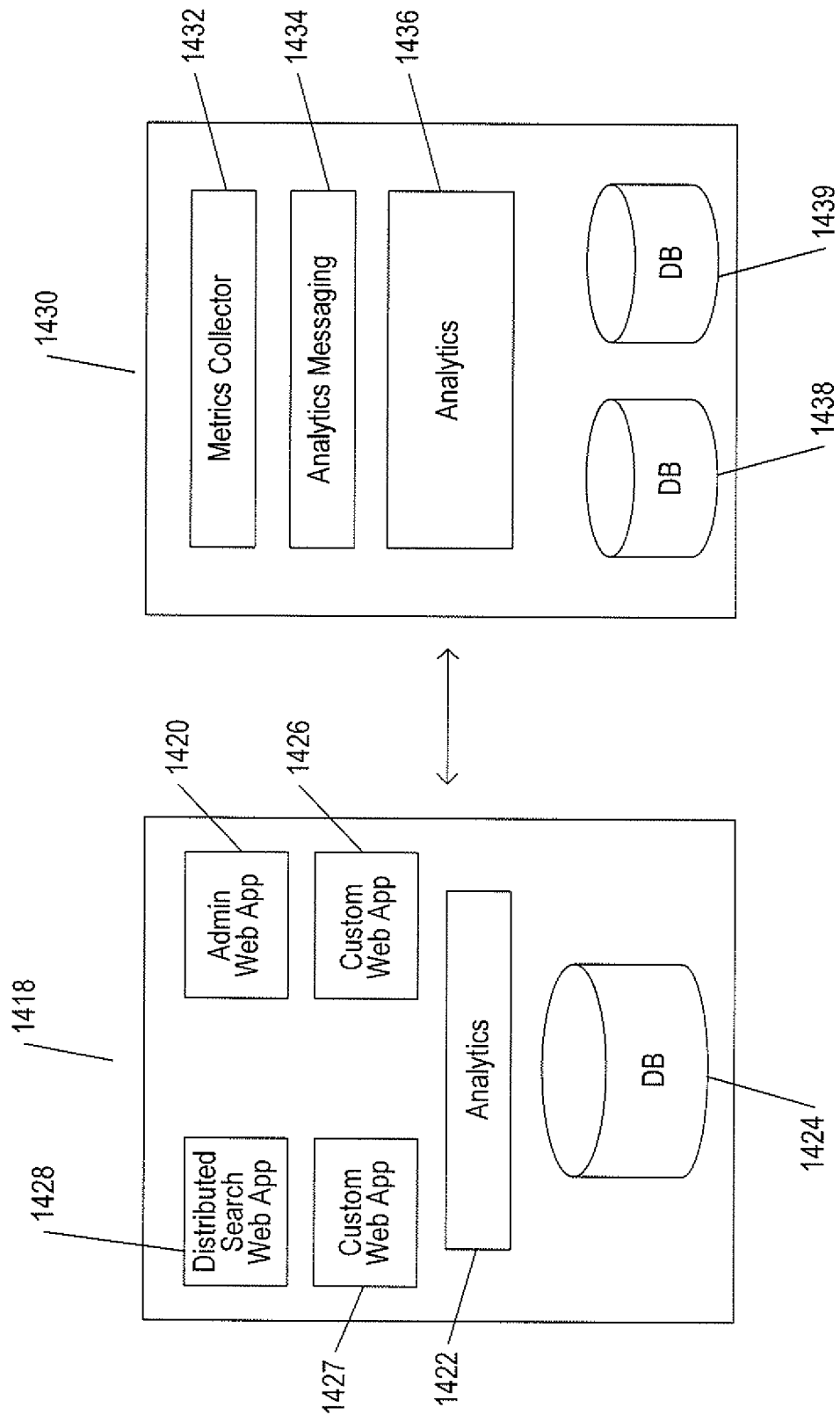
Figure 14C:
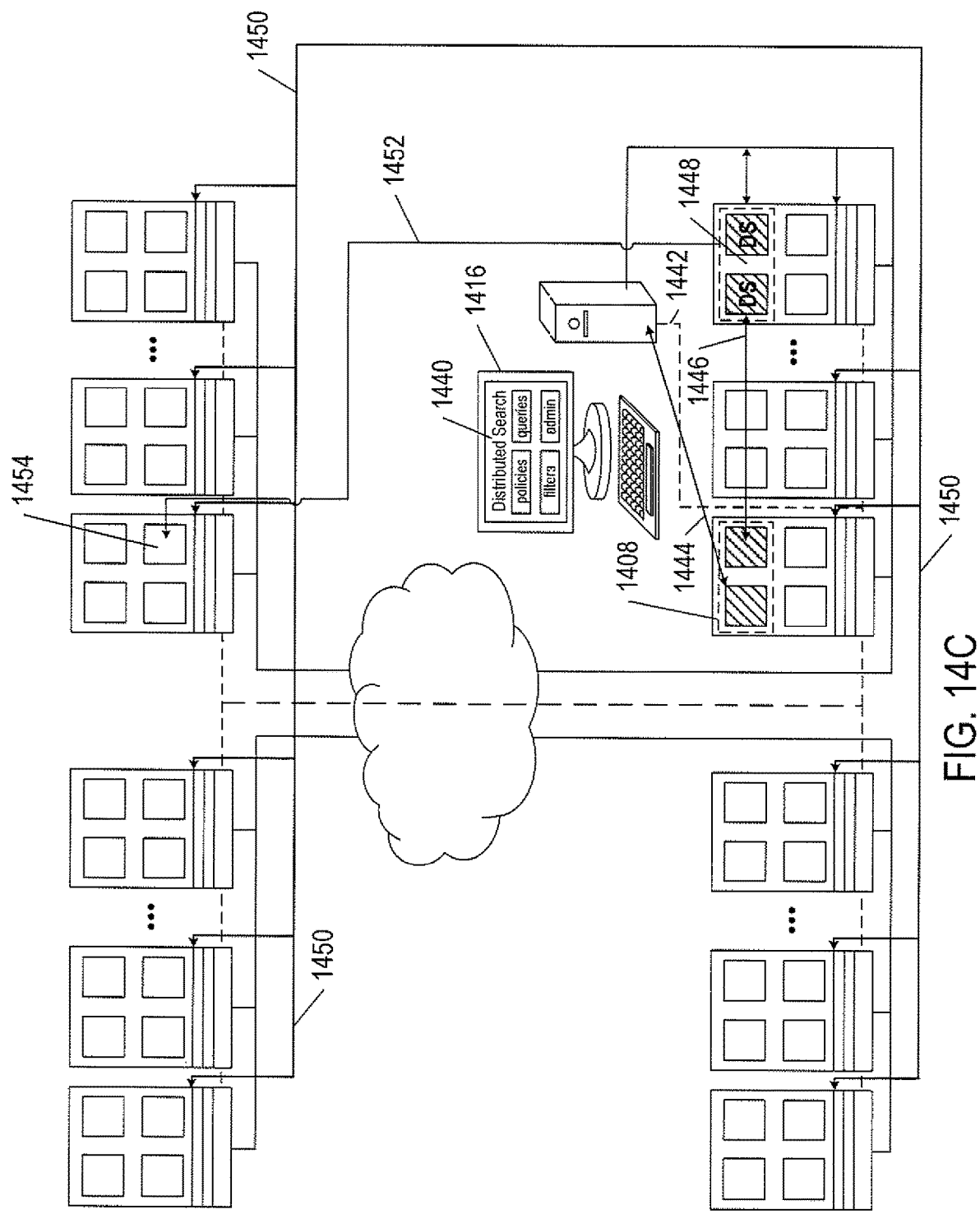

FIGS. 14A-C illustrate components and general operation of the distributed-search methods and subsystems. FIG. 14A uses illustration conventions, which are next described, that are subsequently used in FIG. 14C. A large distributed computer system is represented, in FIGS. 14A and 14C, by four sets 1402-1405 of computers, each set representing a virtualized-server cluster, virtual data center, or group of virtual data centers. In large distributed computer systems, there may be tens, hundreds, or more server clusters and virtual data centers linked together by many layers of internal and external communications systems. In FIGS. 14A and 11C, local internal communications are represented by interconnecting lines or channels, such as local network 1406 within server cluster or virtual data center 1403, and one or more wide-area networks or other external communications systems are represented by cloud 1407. The distributed-computer-system representation used in FIGS. 14A-C is abstracted to provide for concise and simple illustration of the currently disclosed distributed-search methods and subsystems.

In the example distributed computer system shown in FIGS. 14A and 14C, a management subsystem is implemented as a multi-tiered application 1408 including two or more virtual machines 1409-1410 within a management server 1412 of a server cluster or virtual data center 1405. The management subsystem displays a management user interface 1414 on one or more management consoles 1416 used by system managers or administrators to manage operation of a server cluster or virtual data center. Each server cluster or virtual data center, such as server clusters or virtual data centers 1402-1404, may also include a management subsystem, such as the management subsystem 1408-1410 within server cluster or virtual data center 1405. In certain implementations, a management subsystem may span two or more server clusters or virtual data centers.

The management subsystem provides a comprehensive server cluster or virtual data center management interface to system administrators. Through the management user interface, system administrators specify operational parameters that control facilities that store, manage, and deploy multi-tiered application and VM templates, facilities that provide for high-availability virtual-machine execution, tools for migrating executing VMs among servers and execution environments, VM replication, and data backup and recovery services.

FIG. 14B illustrates one implementation of a high-level architecture of the management subsystem 1408-1410 discussed above with reference to FIG. 14A. In the management subsystem, a first virtual machine 1418 is responsible for providing the management user interface via an administrator web application 1420, as well as compiling and processing certain types of analytical data 1422 that are stored in a local database 1424. In addition, the first virtual machine runs numerous custom web applications 1426-1427 that provide additional functionalities accessible through the management user interface. The first virtual machine also provides an execution environment for a distributed-search web application 1428 that represents a local instance of the distributed-search subsystem within a server cluster, virtual data center, or some other set of computational resources within the distributed computer system. A second virtual machine 1430 is primarily concerned with collecting metrics 1432 from various types of components, subcomponents, servers, network-storage appliances, and other components of the distributed computing system via analytics messaging 1434 and then analyzing the collected metrics 1436 to provide continuous representations of the status and state of the distributed computer system, to automatically identify various types of events and problems that are addressed automatically, semi-automatically, or manually by system administrators, and to provide additional types of monitoring and analysis, the results of which are stored in several local databases 1438-1439.

As shown in FIG. 14C, the local instance of the distributed-search subsystem (1428 in FIG. 14B) is invoked, in one implementation, through the management user interface to provide a distributed-search user interface 1440 to a system administrator or, in other cases, to provide a distributed-search application programming interface ("API") to various automated management and computational-resource-distribution subsystems within the distributed computer system. Communication between the management subsystem 1408 and the system console 1416 is provided, in one implementation, over a secure virtual management network within the distributed computer system, represented in FIGS. 14A and 14C by dashed lines, such as dashed line 1442. The distributed-search user interface 1440 provides facilities for the creation and storage of search policies, filters, and search queries, further discussed below. The distributed-search user interface also provides various types of administration operations and functionalities. A user launches searches through the distributed-search user interface and automated subsystems launches searches through a distributed-search API, both provided by a local instance of the distributed-search subsystem. A search initiated by specifying filters, policies, and search-result evaluation criteria previously created and stored through the distributed-search user interface or distributed-search API.

A search is initiated by the transmission of a search-initiation request, from the distributed-search user interface or through a remote call to the distributed-search API 1444, to a local instance of the distributed-search subsystem within the management subsystem 1408. The local instance of the distributed-search subsystem then prepares a search-request message that is transmitted 1446 to a distributed-search engine 1448, in one implementation implemented as a multi-tiered application containing one or more distributed-search-engine virtual machines that runs within a server or other computer system within the distributed computer system. The distributed-search engine transmits dynamic-attribute-value requests to each of a set of target participants within the distributed computing system, as represented by arrows emanating from the distributed-search engine 1448 and directed to each of a particular component or layer within the computer systems of the distributed computer system. The transmission may occur over a period of time in which batches of dynamic-attribute-value requests are transmitted at intervals, to avoid overloading communications subsystems. The set of target participants is obtained by using filters included within the search request to evaluate centrally stored static attribute values for entities within the distributed computer system, as discussed, in detail, below. Initial filtering avoids transmission of messages to entities incapable of satisfying search-request criteria. Note that the target participants may be any type or class of distributed-computing-system component or subsystem that can support execution of functionality that receives dynamic-attribute-value-request messages from a distributed-search engine. In certain cases, the target participants are components of management subsystems, such as local instances of the distributed-search subsystem (1428 in FIG. 14B). However, target participants may also be virtualization layers, operating systems, virtual machines, applications, or even various types of hardware components that are implemented to include an ability to receive attribute-value-request messages and respond to the received messages. Finally, the distributed-search engine 1448 receives responses from the target participants within the distributed computer system and continuously evaluates the responses to maintain a small set of best responses. In many cases, there may be significant periods of time between reception of a dynamic-attribute-value request by a target participant and sending of a response by the target participant. When termination criteria for the search are satisfied, and the search is therefore terminated, the set of best responses to the transmitted dynamic-attribute-value-request messages are first verified, by a message exchange with each target participant that furnished the response message, and are then transmitted 1452 from the distributed-search engine to one or more search-result recipients 1454 specified in the initial search request. A search-result recipient may be the local instance of the distributed-search subsystem that initiated the distributed search, but may alternatively be any other component or entity or set of components or entities of the distributed computer system that supports reception of a distributed search-results message.

Figure 15A:
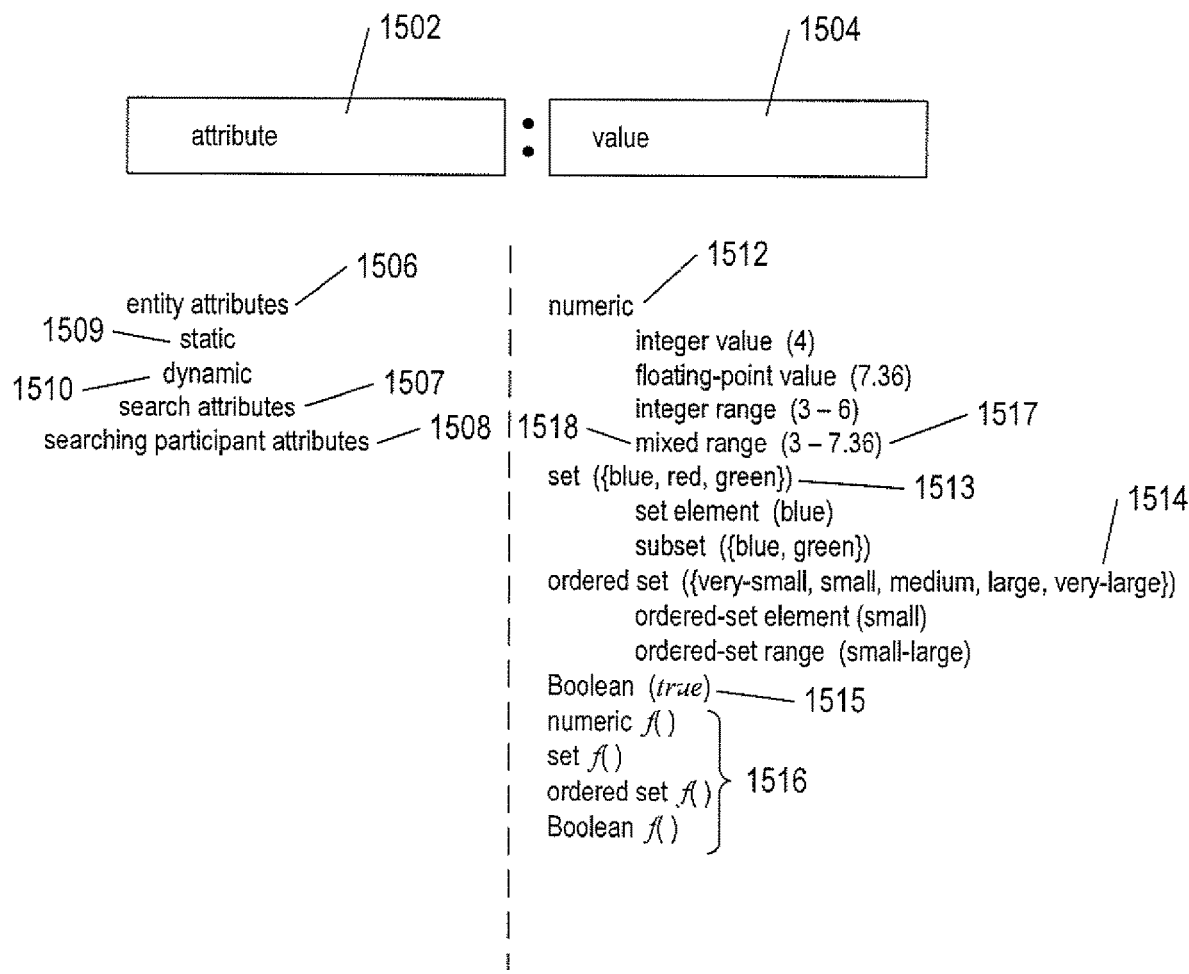
Figure 15B:
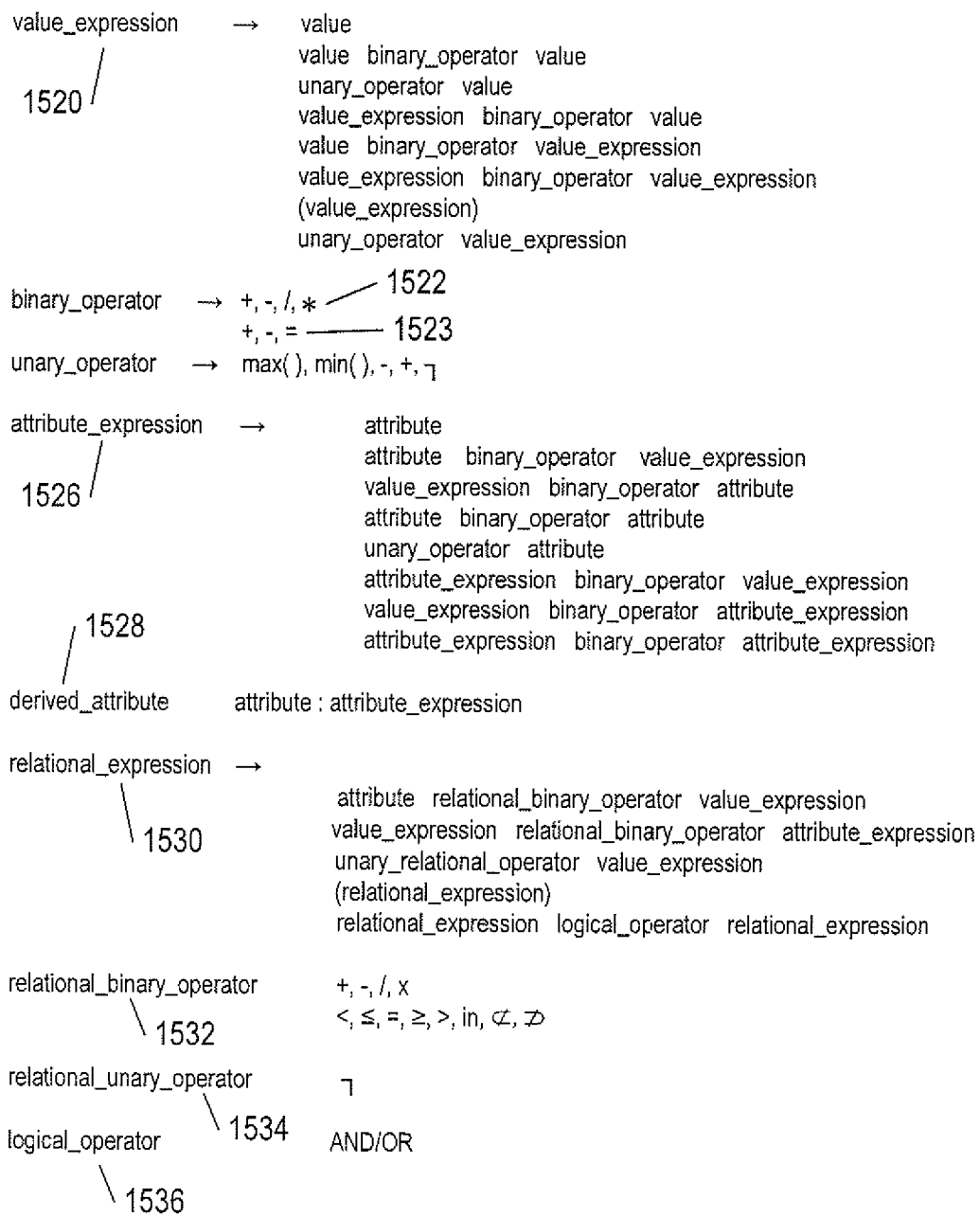

FIGS. 15A-C illustrate certain of the information and data entities used within the currently disclosed distributed-search methods and subsystems. The distributed search is used to identify entities managed by, contained within, or accessible to distributed-search participants. These entities are characterized by attribute/value pairs. An entity may be a participant, a service, information, distributed-computer-system components, remote computers connected through communications media with the distributed computer system, remote-computer users, or any of many other types of entities that can be characterized by attribute values and that are desired to be identified through distributed searches.

FIG. 15A illustrates an attribute/value pair. The attribute 1502 is an alphanumeric string that identifies a particular attribute within a universal set of attributes used by the distributed-search methods and subsystems. Attributes are, in many implementations, centrally stored and managed by one or more distributed-search engines. An attribute is instantiated by being associated with one or more any of the above-mentioned types of entities. Instantiated attributes are associated with values. In this respect, an attribute is similar to a variable used in programming-language statements. The variable has a name, is instantiated within a particular scope comprising the routines from which it is visible, and an instantiated variable can store any of various different values within the value domain of the variable.

In the currently disclosed distributed-search methods and subsystems, three types of attributes are generally encountered: (1) entity attributes 1506, which are associated with entities that are identified by searches; (2) search attributes 1507, which identify particular parameters for a given distributed search; and (3) search-participant attributes 1508, which characterize a participant, generally a participant initiating a distributed search. Entity attributes 1506 fall into two classes: (1) static entity attributes 1509, which are entity attributes that, when instantiated, have either constant values or have values that are only infrequently changed and can therefore be pre-fetched and stored by the distributed-search engine in advance of being used during the initiation of distributed searches; and (2) dynamic entity attributes 1510, which are frequently modified and are therefore retrieved, at search time, by transmitting dynamic-attribute-value-request messages to target participants. The value 1504 currently associated with an instantiated attribute 1502 in an attribute/value pair is generally represented by an alphanumeric string. Attribute values can be numeric 1512, elements of a set 1513, elements of an ordered set 1514, Boolean values 1515, or generalized calls to functions or procedures that return numeric, set, ordered-set, or Boolean values 1526. A value may be one of a single element of a set, a subset of a set, single numeric values, or numeric-value ranges. In FIG. 15A, examples of the various different types of values are given in parentheses, such as the example range "[3-7.36]" 1517 provided for the mixed-range subtype 1518 of the numeric 1512 value type.

FIG. 15B shows certain derived types of information and data used by the distributed-search methods and subsystems to which the current application is directed. Values may be combined in value expressions 1520. These are familiar arithmetic and set expressions that include binary arithmetic operators 1522 and binary set operators 1523 as well as various types of arithmetic and set unary operators 1524. Value expressions can be considered to be expressions equivalent to constant values. Similarly, attributes may be combined in attribute expressions 1526 which are equivalent to expressions in programming languages that include variables. When the attributes in an attribute expression are replaced by specific values with which they are associated, the attribute expression is equivalent to a constant value. A derived attribute 1528 is an attribute defined in terms of other attributes. Value expressions can be combined by common relational operators to produce relational value expressions 1530 using relational binary operators 1532, relational unary operators 1534, and logical operators 1536.

FIG. 15C illustrates additional data and information types used in the distributed-search methods and subsystems to which the current application is directed. A filter 1540 is a relational expression that specifies a value or range of values for an attribute. A policy 1542 comprises one or more filters. A search-evaluation expression 1544 is used to evaluate returned dynamic-attribute values from participant search-request responders in order to compute a score for a response, as discussed, in detail, below. A search-evaluation expression comprises one or more evaluators. An evaluator 1546 is either a simple evaluator or a weight/simple-evaluator pair. A simple evaluator 1548 is a minimum-positive attribute or a floor/minimum-positive-attribute pair. A minimum-positive attribute is an attribute having values selected from a numeric or ordered-set value domain that map to a set of numerically increasing values, generally beginning with the value "0." As the value increases, the desirability or fitness of the attribute and its associated value decreases. For example, an attribute "price" may have values in the range [0, maximum_price], with lower prices more desirable than higher prices and the price value 0, otherwise referred to as "free," being most desirable. In general, an attribute that is not a minimally positive can be easily transformed into a derived, minimum-positive-attribute. For example, the attribute "expected lifetime" can be transformed into the derived attribute "early expiration" by: early_expiration: MAXIMUM_LIFETIME-expected_lifetime. A weight is a numeric multiplier and a floor is a numeric or ordered-set value. Weights are used to adjust the relative importance of attributes in search-evaluation expression and a floor is used to set a lowest-meaningful value of an attribute to a value greater than 0, for numeric attributes, or to an ordered-set value greater than the minimum value in the ordered set. A search 1552 is either a search-evaluation expression or a search-evaluation expression and one or more policies.

Figure 16A:
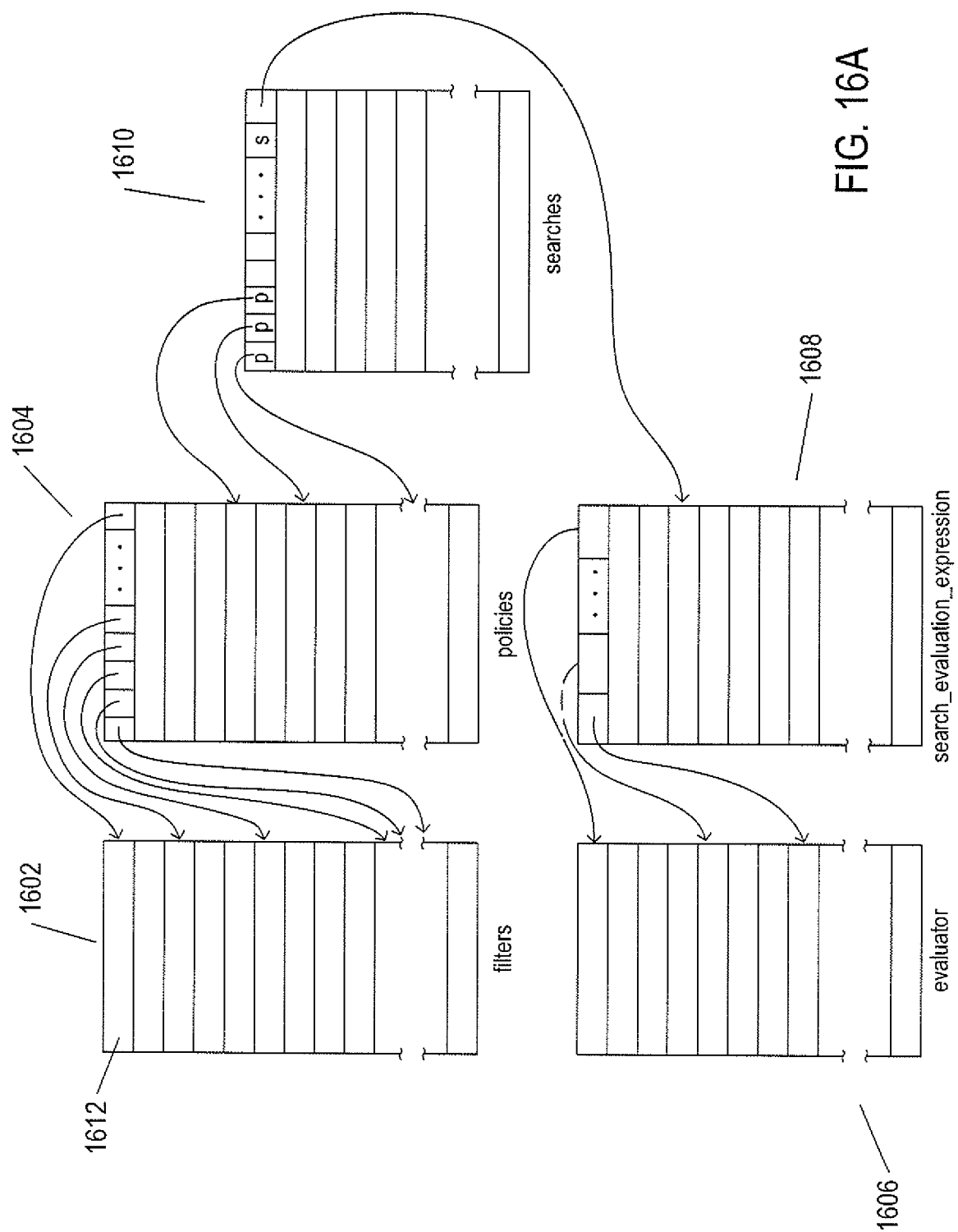
FIGS. 16A-B illustrate certain types of data maintained and used within local instances of the distributed-search subsystem and within a distributed-search engine.
Figure 16B:
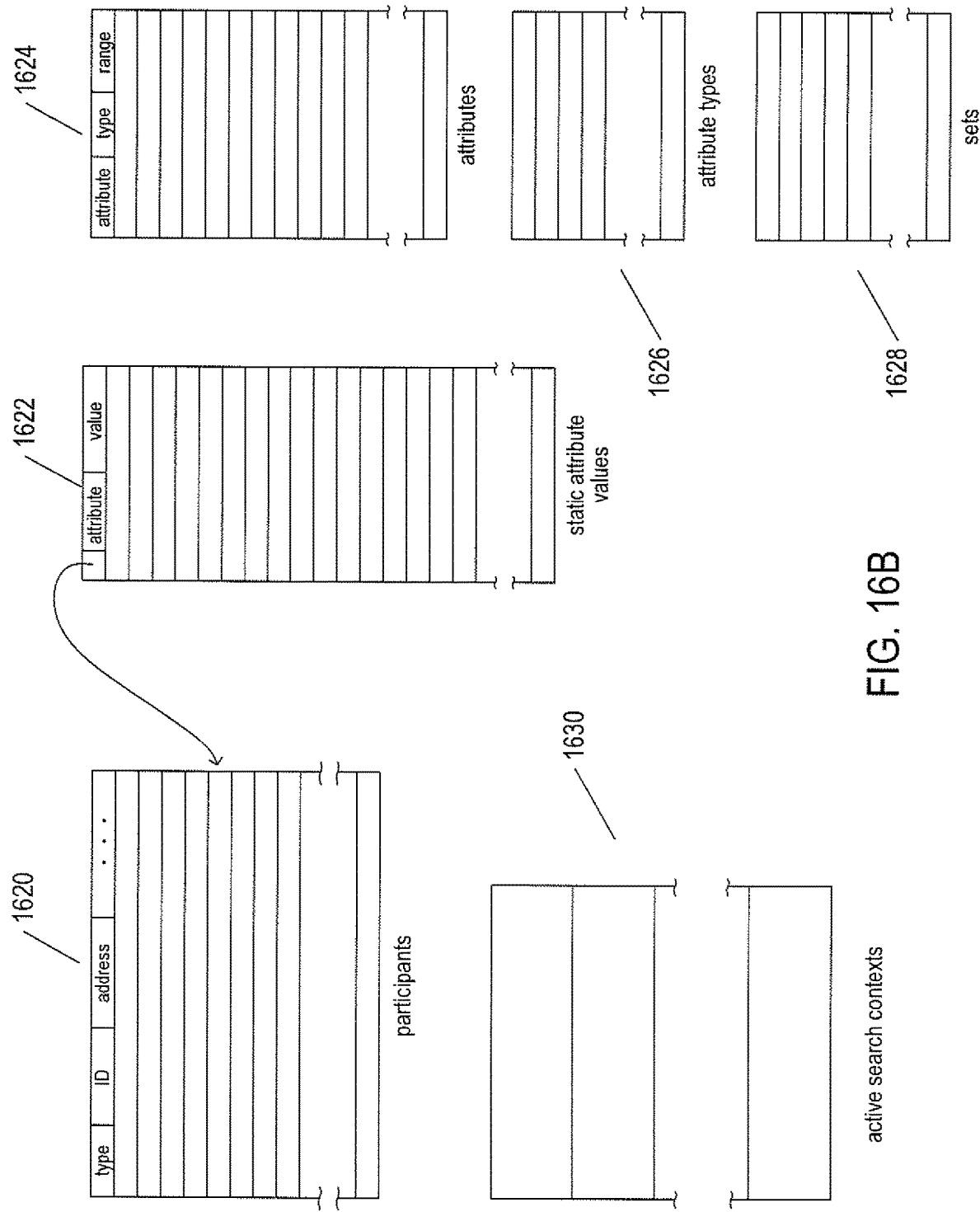

FIGS. 16A-B illustrate certain types of data maintained and used within local instances of the distributed-search subsystem and within a distributed-search engine. As shown in FIG. 16A, a local instance of the distributed-search subsystem stores one or more filters 1602, one or more policies 1604, each policy comprising one or more filters, one or more evaluators 1606, one or more search-evaluation expressions 1608, each search-evaluation expression comprising one or more evaluators, and one or more searches 1610, each search comprising a search-evaluation expression and zero, one, or more policies. In FIG. 16A, each row, such as row 1612, within a set of information entities, such as the set of filters 1602, represents a single information entity of the type of the entity set. The various types of information entities may be stored in relational database tables, including singly or multiply indexed relational database tables, or in any of many other different types of data-storage objects and systems.

Using similar illustration conventions as used in FIG. 16A, FIG. 16B shows the types of information entities stored within the distributed-search engine. The information-entity sets include a set of participants 1620, a set of continuously collected static-attribute/value pairs associated with participants 1622, a set of attributes 1624 and a set of attribute types 1626 which define the attributes that can be used in filters and profiles, a set of sets 1628 from which set values and subsets are selected for set-valued attributes, and a set of active search contexts 1630, each active search context representing a distributed search currently being executed by the distributed-search subsystem.

Figure 17:
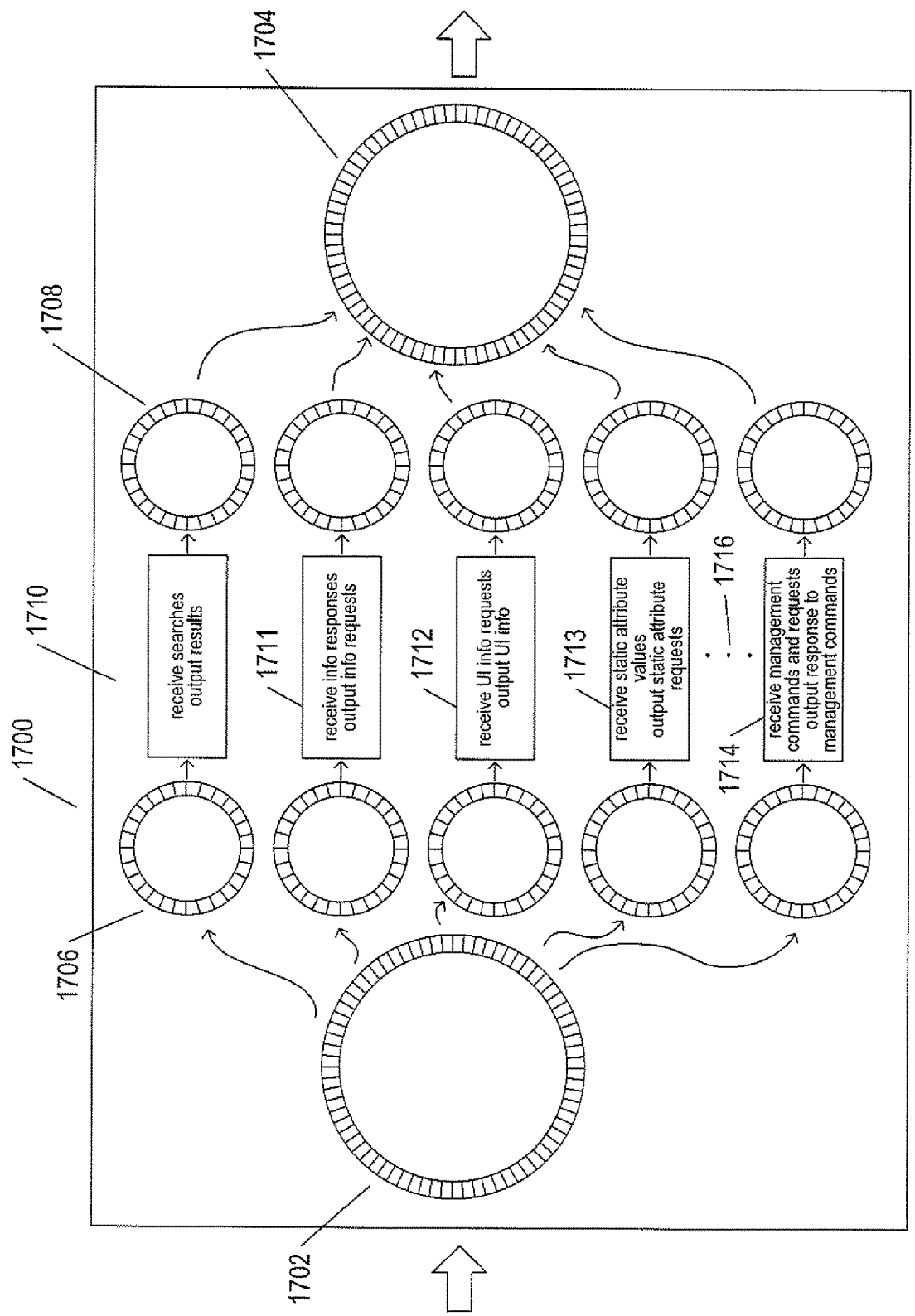
FIG. 17 is a high-level diagram of the distributed-search engine.

FIG. 17 is a high-level diagram of the distributed-search engine. The distributed-search engine receives incoming messages from one or more communications subsystems in an input queue 1702 and outputs messages to an output queue 1704 from which they are extracted and transmitted by the one or more communications subsystems. There are many different types of messages received and transmitted by the distributed-search engine. Different types of messages can be thought of as being distributed from the input queue 1702 to input queues for specific message types, such as input queue 1706 for search requests. Similarly, specific types of output messages are output to specific output queues, such as output queue 1708, from which they are input to the general output queue 1704 for transmission. Various different types of controllers or logic modules 1710-1714 process particular types of input messages and generate particular types of output messages. For example, controller 1710 receives search requests from distributed-search participants and outputs results corresponding to the search requests. Controller 1711 outputs information requests, such as dynamic attribute-value requests, and receives responses to those information requests. Controller 1712 receives UI information requests from local instances of the distributed-search subsystem and outputs responses to those requests. For example, a local instance of the distributed-search subsystem may request a current list of the different types of attributes that can be used to construct filters, policies, and search-evaluation expressions. Controller 1713 outputs static-attribute requests to distributed-search participants and receives response to those requests. Controller 1714 receives management commands and requests from local instances of the distributed-search subsystem and outputs responses to the received commands and requests. Ellipses 1716 indicate that a distributed-search engine may include additional types of controllers that receive and output additional specific types of messages.

Figure 18:
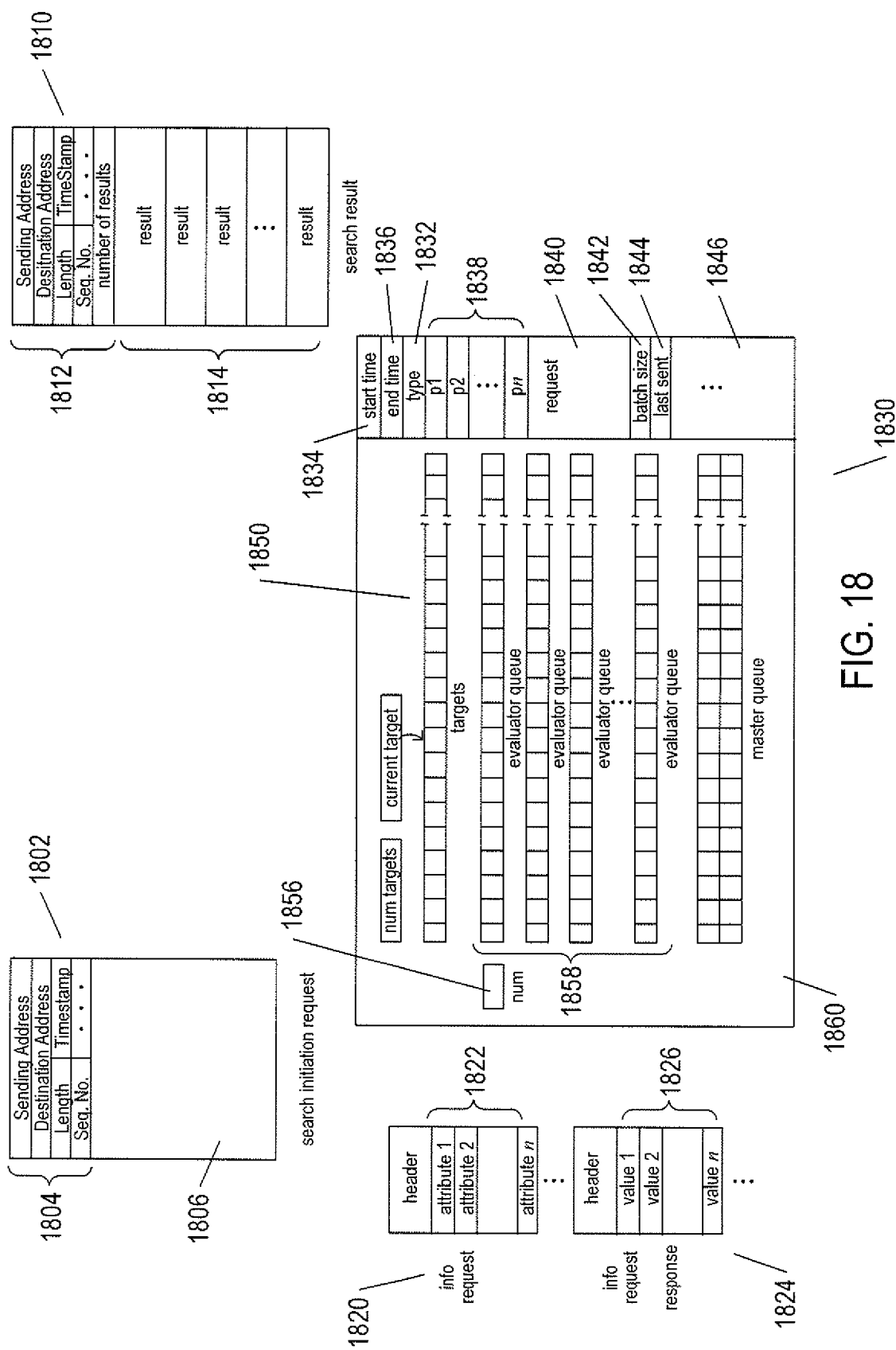
FIG. 18 illustrates various messages and data structures used during execution of a distributed search by the currently disclosed distributed-search subsystem, including an active search context, a search request, a search-request response, and information requests and responses.

FIG. 18 illustrates various messages and data structures used during execution of a distributed search by the currently disclosed distributed-search subsystem, including an active search context, a search request, a search-request response, and information requests and responses. A search-initiation-request message 1802 includes header information 1804 as well as a search-initiation request 1806 that includes a search-evaluation expression and zero, one, or more policies. A search-result message 1810 also includes a header 1812 and one or more search results 1814. Search results identify entities and include attribute/value pairs that characterize the entities. An information request 1820 is sent by the distributed-search engine to target participants requesting current values for a set of dynamic attributes 1822 specified in the information-request message. A response to the information-request message 1824 includes the requested dynamic-attribute values 1826.

An active search context 1830 is a complex data structure maintained by the distributed-search engine for each distributed search currently being executed by the distributed-search engine. In one implementation, an active search context includes an indication of the type of search 1832, a start time for the search 1834, an end time for the search 1836, and a number of additional search parameters 1838. The active search context may store the search-initiation-request message 1840 that initiated the search. The active search context may additionally include a batch size 1842, indicating the number of information requests to be sent in each batch of transmitted information requests and an indication of the time at which the last batch of information-request messages was sent 1844. Ellipses 1846 indicate that many additional parameters and information entities may be stored within an active search context. The active search context may also include a list of target participants 1850 to which information requests need to be directed. These may be participant addresses, expressions from which sets of participant addresses may be computed, or other types of information that can be used to generate addresses for target participants during execution of a distributed search. In addition, the active search context includes an indication of the number of evaluators in the search-evaluation expression 1856, a set of evaluator queues 1858, and a master queue 1860. The evaluator queues maintain an ordered set of returned dynamic-attribute values corresponding to the dynamic attribute associated each evaluator in the search-evaluation expression. The master queue 1860 maintains dynamic-attribute values, scores, and other information for the participants with the best-evaluated responses so far received. Operation of the evaluator queues and master queue is discussed, in great detail, below.

Figure 19A:
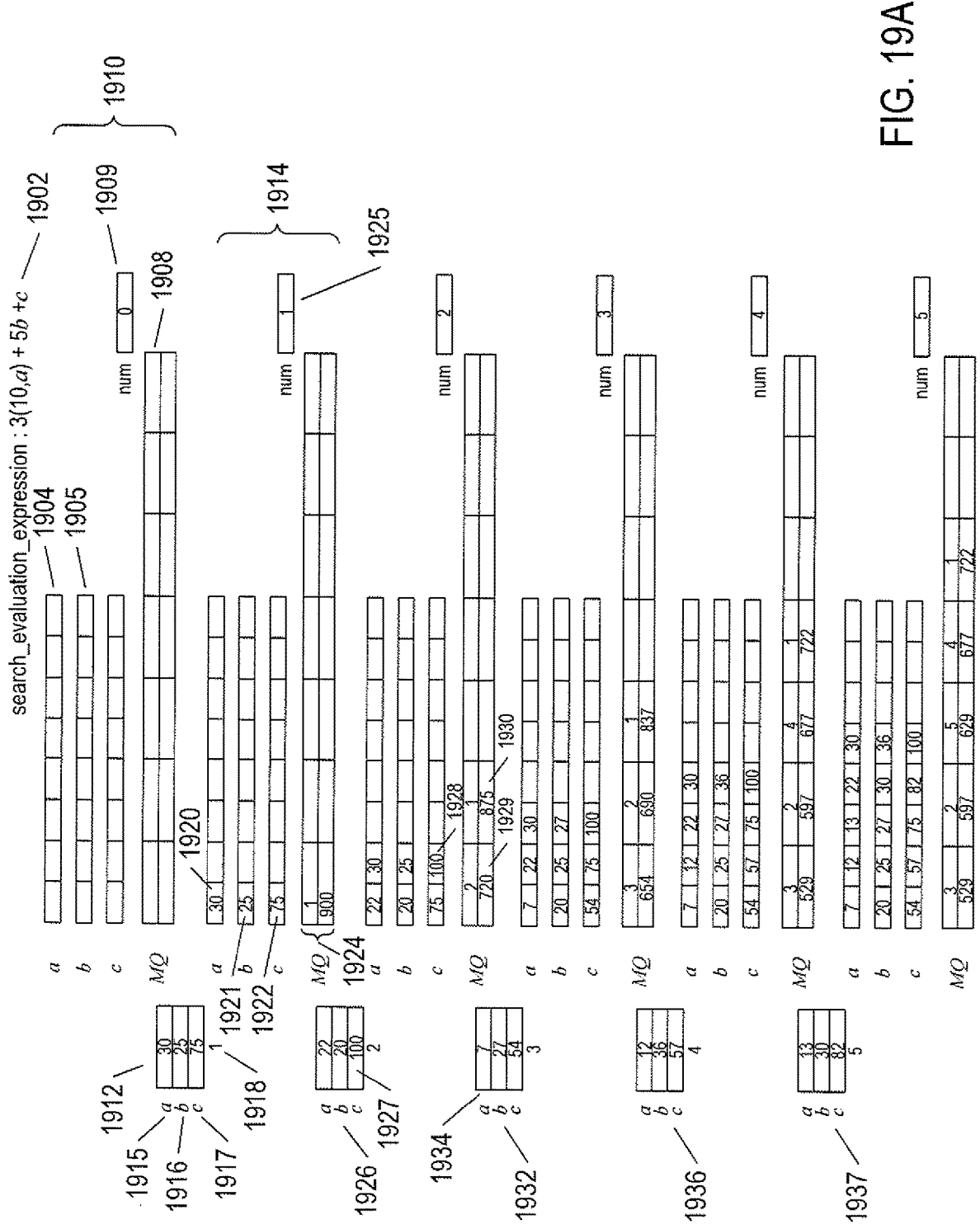
Figure 19B:
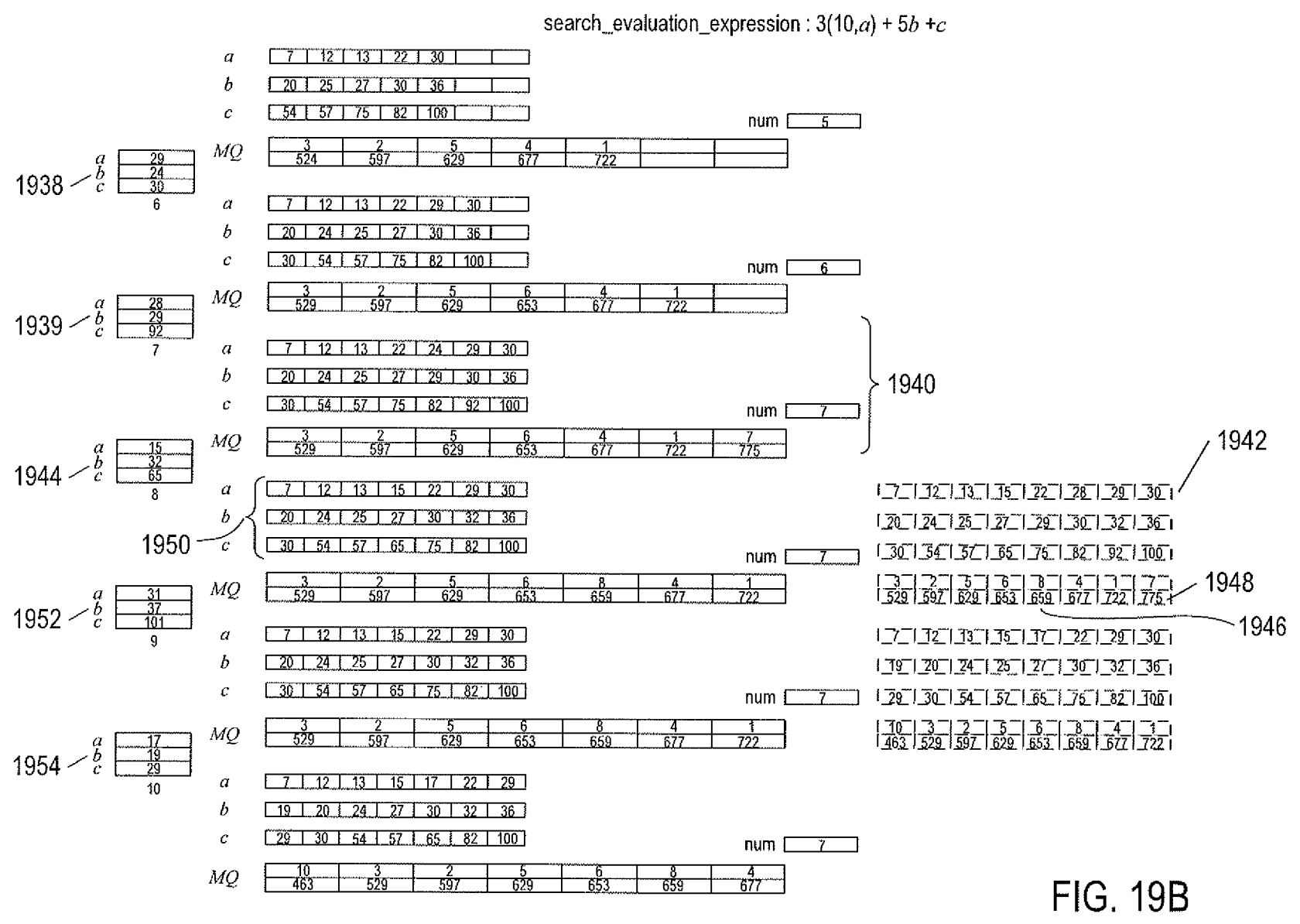

FIGS. 19A-B illustrate operation of the evaluator queues and master queue within an active search context. In this example, a dynamic-attribute-value-request message, a type of information-request message, is transmitted to target participants to obtain current values for each of 3 attributes a, b, and c. The search-evaluation expression 1902 associated with the distributed search is: $3(10,a)+5b+c$. The "+" operators indicate that a score is computed by adding values computed for each evaluator. The first evaluator, $3(10,a)$, has a weight equal to 3, a floor equal to 10, and is computed from the current value of attribute a. The second evaluator 5b has a weight of 5 and is computed from the current value of attribute b. The third evaluator is simply the value of attribute c. The search-evaluation expression is used to compute scores for each received response message, with lower scores more favorable than higher scores. Three evaluator queues 1904-1906 store, in sorted order, the values for attributes a, b, and c for the participant responses stored in the master queue MQ 1908. The number of stored responses is indicated in the variable num 1909. In FIGS. 19A-B, the state of the evaluator queues and the master queue are indicated before and after reception of each of a series of responses to dynamic-attribute-value-request messages. Initially, the queues are empty 1910. After a first response 1912 is received, an entry is placed in each queue, resulting in the queue state 1914. The first response message 1912 includes numeric values for the three attributes a, b, and c 1915, 1916, and 1917. It is also associated with an identifier, or ID 1918. In this example, the IDs are simple monotonically increasing integers starting with "1."

Next, processing of the first response message 1912 is described. The three attribute values 1915-1917 are entered into their respective queues 1920-1922. Because the queues are initially empty, they become the first entries in the queues and are therefore in sorted order. Then, a score is computed using the search-evaluation expression 1902. First, if a returned value is less than the floor in the evaluator associated with the attribute value, an initial evaluator score is set to the floor value. Otherwise, the initial evaluator score is set to the value returned in the response message. Then, a percentage or ratio is computed for each initial evaluator score and the maximum value in the queue in which the associated attribute value was inserted. The ratio is multiplied by 100 to generate an intermediate evaluator score in the range [0, 100]. Then, the intermediate evaluator score is multiplied by the weight to produce a final evaluator score. The three evaluator scores are then added to produce the final score for the response message. In the case of the first response message 1912, all of the returned attribute values are the maximum values in the queues. Therefore, the score is computed as:

$$(3\times((30\div30)\times100))+(5\times((25\div25)\times100))+((75\div75)\times100)=900$$

This score is entered, in association with the identifier for the response message "1," into the master queue as the first entry 1924. There is now one entry in the master queue and each evaluator queue, so the variable num now has the value "1" 1925. Of course, this is merely one way to compute a score from the search-evaluation expression and returned attribute values. Many other types of score computations can be used. For example, the rank of an attribute value in an evaluator queue can be used in addition to, or in place of, the percentage of the maximum value in the queue to compute the intermediate evaluator score. The raw computed ratios of values to max values in queues can be used, rather than percentages. Exponentials and logarithms can be employed to generate non-linear scoring methods. Evaluator scores may be combined by operations other than addition. However, the currently described method has proven to provide good results for certain multi-attribute search results.

A second response message 1926 is then received, and the same operations are performed. Because the values in the evaluator queues are sorted in ascending order, and because the value "100" for attribute c in the second response message 1927 is greater than the value "75" for attribute c in the first response message 1917, the value "100" is now at the end of the evaluator queue 1928 for attribute c. The scores for the first and second messages are now recomputed as:

$$(3 \times ((30 \div 30) \times 100)) + (5 \times ((25 \div 25) \times 100)) + ((75 \div 100) \times 100) = 875$$

$$(3 \times ((22 \div 30) \times 100)) + (5 \times ((20 \div 25) \times 100)) + ((100 \div 100) \times 100) = 720$$

In the illustrated queue states, the master queue is kept sorted, in ascending order, so the score and identifier for the second response message occupies the first position 1929 in the master queue and the identifier and score for the second response message now occupies the second position 1930 in the master queue. Again, the lower the score, the more desirable the response. As will be seen, below, the active search context is designed to retain a set of the lowest-scored response messages, alternatively referred to as "most favorably scored response messages," received during the course of the distributed search.

A third response message 1932 is then received, and the same operations are performed. In this case, the value for attribute a, "7," 1934 is lower than the floor "10" for the first evaluator, so the value "10" is used instead of the value "7" in computing the evaluator score associated with attribute a. The scores for all three messages are recomputed as:

$$(3 \times ((30 \div 30) \times 100)) + (5 \times ((25 \div 27) \times 100)) + ((75 \div 100) \times 100) = 837$$

$$(3 \times ((22 \div 30) \times 100)) + (5 \times ((20 \div 27) \times 100)) + ((100 \div 100) \times 100) = 690$$

$$(3 \times ((10 \div 30) \times 100)) + (5 \times ((27 \div 27) \times 100)) + ((54 \div 100) \times 100) = 654$$

In this example, the master queue is kept sorted, in ascending order, so the score and identifier for the second response message occupies the first position 1929 in the master queue and the identifier and score for the second response message now occupies the second position 1930 in the master queue.

Four more response messages 1936-1939 are received, resulting in the queue state 1940 shown in FIG. 19B. At this point, the evaluator queues and the master queue are full. From now on, any newly received response message added to the master queue along with individual attribute values added to the evaluator queues, will involve discarding an entry from each queue. This only occurs when the score computed for the newly received response message is lower than one of the scores in the master queue. As more and more responses are received, the likelihood that any next received response will be entered into the evaluator and master queues quickly decreases to a relatively low value for most types of distributed searches. The operations now become slightly more complex. First, as shown in a scratch-pad representation 1942 of the evaluator and master queues, there is an additional entry in each queue that can temporarily accommodate the attribute values and score for a newly received message. The scores are computed based on all of the entries, including those for the newly arrived response, and then the entries for the response with the highest score are deleted. Newly arrived response 1944 with ID equal to "8" ends up with a score "658," placing it towards the middle 1946 of the scratch-pad master queue.

The score for response message "7" 1948 is now highest, and therefore the entries for that response message are deleted from the queues to produce queue state 1950.

The ninth response message 1952 arrives with each attribute value greater than the current maximum value in the respective evaluator queue. As a result, no new scores need be computed, since there is no possibility that a score computed for the ninth response message could be lower than any of the scores currently residing in the master queue. The ninth response is thus immediately rejected and the queue state 1954 remains unchanged.

A Distributed Resource-Exchange System that Aggregates a Large Number of Data Centers to Create a Distributed, Multi-Organization Cloud-Computing and Resource-Sharing Facility FIGS. 20A-E illustrate the concept of resource exchange among cloud-computing facilities, data centers, and other computing facilities. FIGS. 20A-D all use similar illustration conventions, next described with reference to FIG. 20A.

Figure 20A:
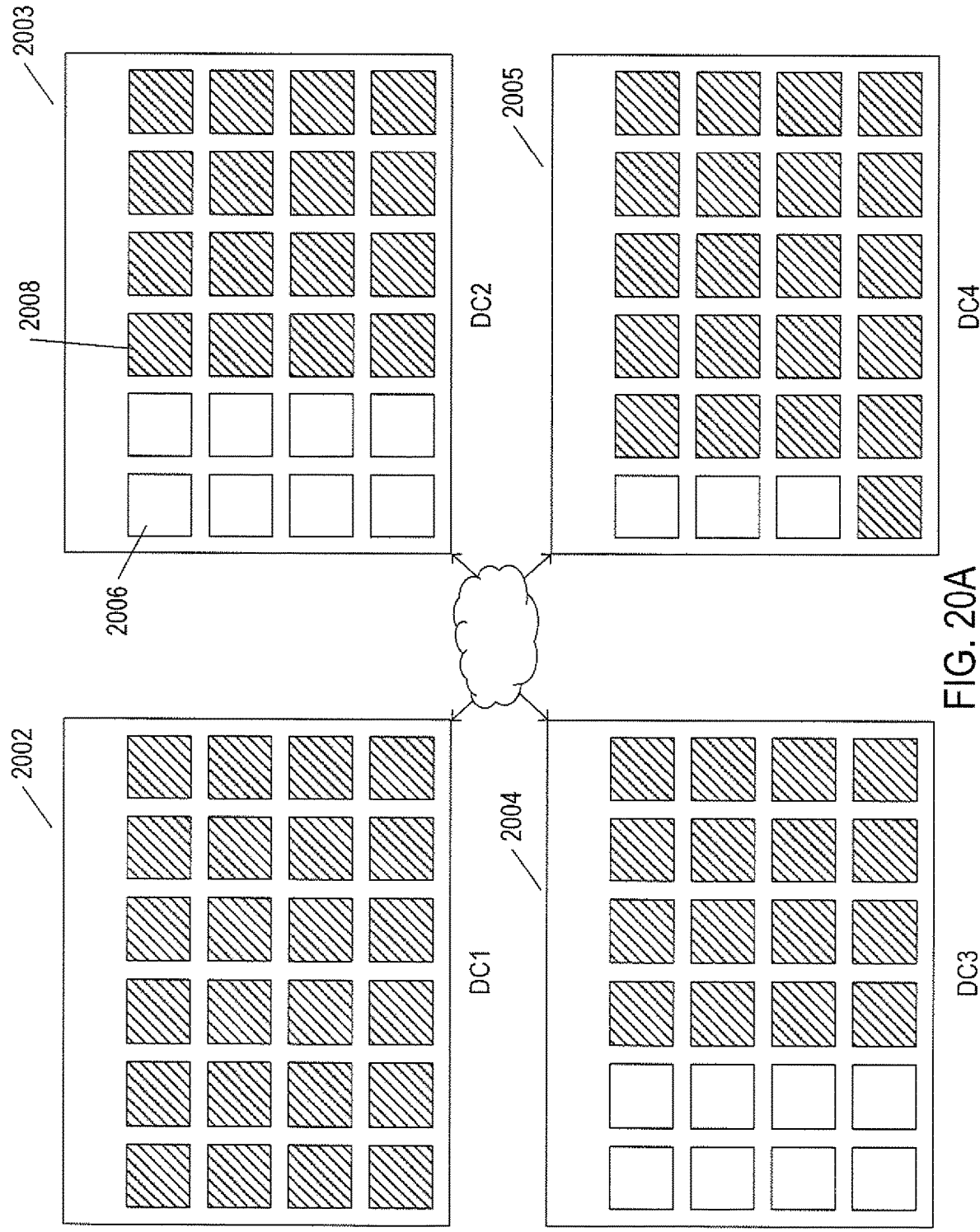
FIGS. 20A-E illustrate the concept of resource exchange among cloud-computing facilities, data centers, and other computing facilities.

FIG. 20A shows abstract representations of four different computing facilities 2002-2005. In each large rectangle representing each computing facility, smaller squares represent a capacity for hosting a VM. Squares without cross-hatching, such as square 2006, represent a currently unused capacity for hosting a VM and cross-hatched squares, such as square 2008, represent a currently in-use capacity for hosting a VM. Of course, real-world computing facilities generally have the resources and capacities to host hundreds, thousands, tens of thousands, or more VMs, but, for current concept-illustration purposes, the 24-VM-hosting capacity of each illustrated computing facility 2002-2005 is sufficient. It should be noted that, in the current document, the computational resources used to host a VM are used as an example of a resource that can be exchanged between computing facilities. The computational resources used to host a container is another example of a resource that can be exchanged between computing facilities. Virtual machines and containers are both examples of computational-resources-consuming entities that can be hosted by computing facilities.

As shown in FIG. 20A, the computing facility DC1 2002 has no spare or unused VM hosting capacity. Computing facilities DC2 2003 and DC3 2004 each have unused capacity for hosting eight additional VMs while computing facility DC4 has unused capacity for hosting three additional VMs. Unused capacity can arise within a computing facility for many reasons. A computing facility may have been expanded to accommodate a planned project or division, but the project or division may not yet need the expanded computational resources or may have been cancelled. In many cases, computational-facility administrators may maintain additional, spare capacity to be able to instantly respond to increased demand from internal users or from remote clients of internally hosted web services and applications. In some cases, the owners and/or managers of a computational facility may have configured the computational facility for providing computational resources as a service to remote clients. The amount of unused capacity within a given computational facility may fluctuate widely and over very short time spans, in certain operational states, or may remain fairly stable, over days, weeks, or months. Currently, for computing facilities other than those specifically established to provide resources as a service, there are few methodologies and media for safely and conveniently making unused capacity available to remote systems and users.

The distributed resource-exchange system facilitates leasing or donating unused computational resources, such as capacity for hosting VMs, by computing facilities to remote computing facilities and users. The distributed resource-exchange system provides a type of automated computational-resource brokerage that brokers exchange of computational resources among participant computing facilities, allowing computational resources to be conveniently, securely, and rationally shared among many different computing facilities owned and managed by many different participant organizations. At a high-level perspective, the automated computational-resource brokerage is a computational-facility-aggregation optimization subsystem that allows for applying computational resources to tasks that need them across a potentially enormous number of discrete computing facilities owned and managed by many different organizations. The distributed resource-exchange system provides efficient brokerage through automation, through use of the above-discussed methods and systems for distributed search, and through use of efficient services provided by virtualization layers with computing facilities, including virtual management networks, secure virtual internal data centers, and secure VM migration services provided by virtualization layers. The automated computational-resource brokerage is convenient and easy to use for administrators, managers, and other users of commutating facilities seeking to sell, donate, or otherwise provide local resources to remote computing-facility resource consumers because of simplified user interfaces, because of predefined attributes, filters, profiles, and easily accessible information about resource providers and resource consumers, and because of a wealth of automated methodologies that streamline searches for resources, transactions that provide resources for defined periods of time to resource consumers, collection of user feedback, and generation of rankings, ratings, and recommendations to facilitate future searchers for resources and resource-acquisition transactions. The automated computational-resource brokerage is rational because the brokerage provides a wealth of information to resource providers and resource consumers in order that participants are fully informed with regard to available resources and their attributes, and because this information is incorporated into automated methods and systems that allow the wealth of information to be constantly updated and to be used by automated distributed-search methods. The automated computational-resource brokerage provides secure remote hosting of VMs, secure data transmission and storage, secure internal and external network communications, and other security measures to ensure that resources provided by remote computing facilities are as secure, or nearly as secure, as local resources used by resource consumers.

Figure 20B:
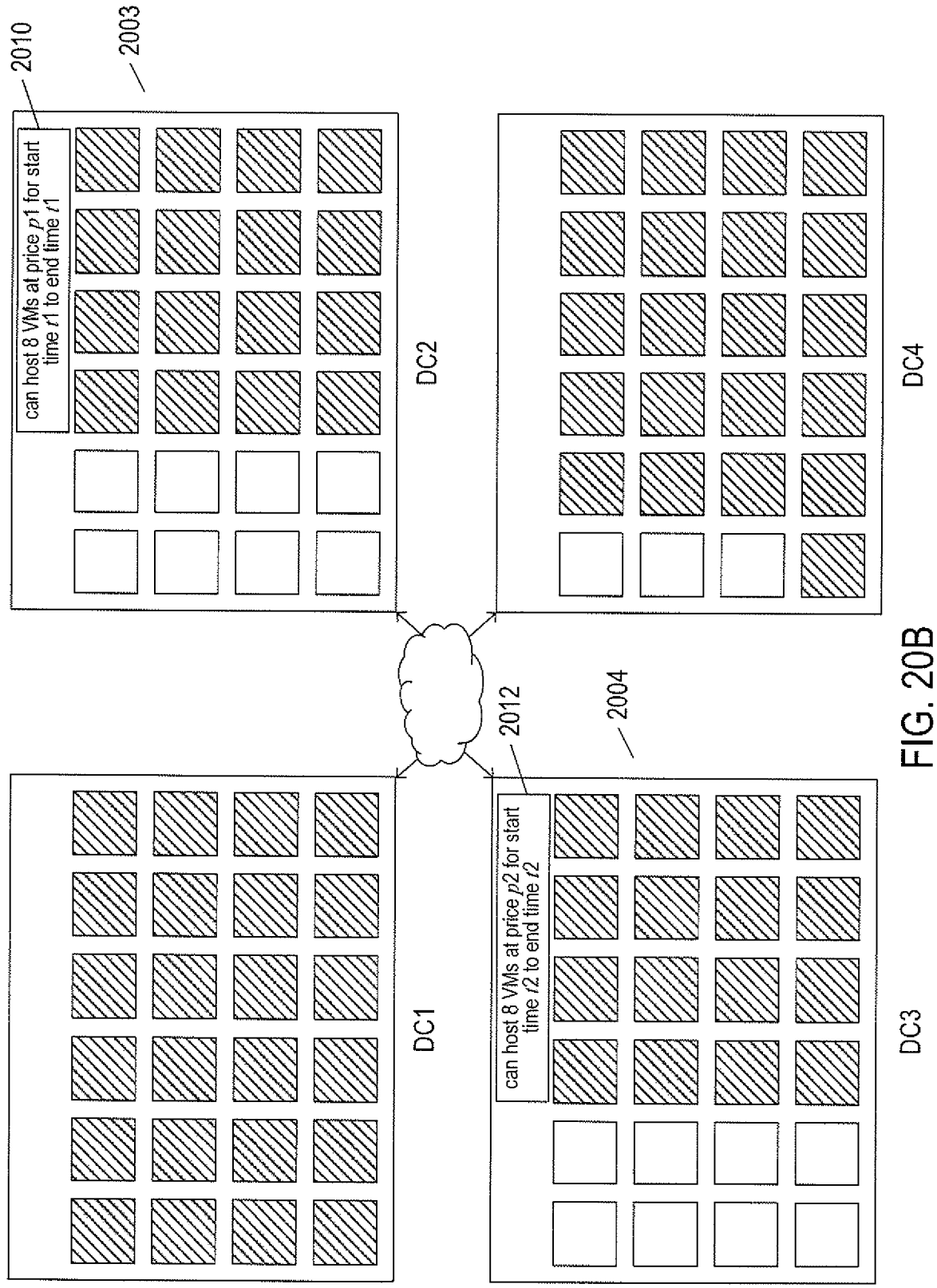

FIG. 20B illustrates an initial step in resource exchange. Computing facilities DC2 2003 and DC3 2004 have registered as participants with the automated computational-resource brokerage in order to make their spare VM-hosting capacity available to remote resource consumers. As shown in FIG. 20B, they have provided attribute values 2010 and 2012 to the automated computational-resource brokerage indicating that they are interested in selling VM-hosting capacity. As discussed above, certain of these attribute values are provided during registration, others are provided in response to static-attribute requests, and still others are provided in response to information-request messages. Attributes such as the current price for VM hosting and current hosting capacity are likely to be provided in response to information-request messages, while the types of hosting services and long-term hosting capacities may be provided in response to static-attribute requests. The fact that computing facilities DC2 and DC3 are automated-computational-resource-brokerage participants is obtained during registration with the automated brokerage.

Figure 20C:
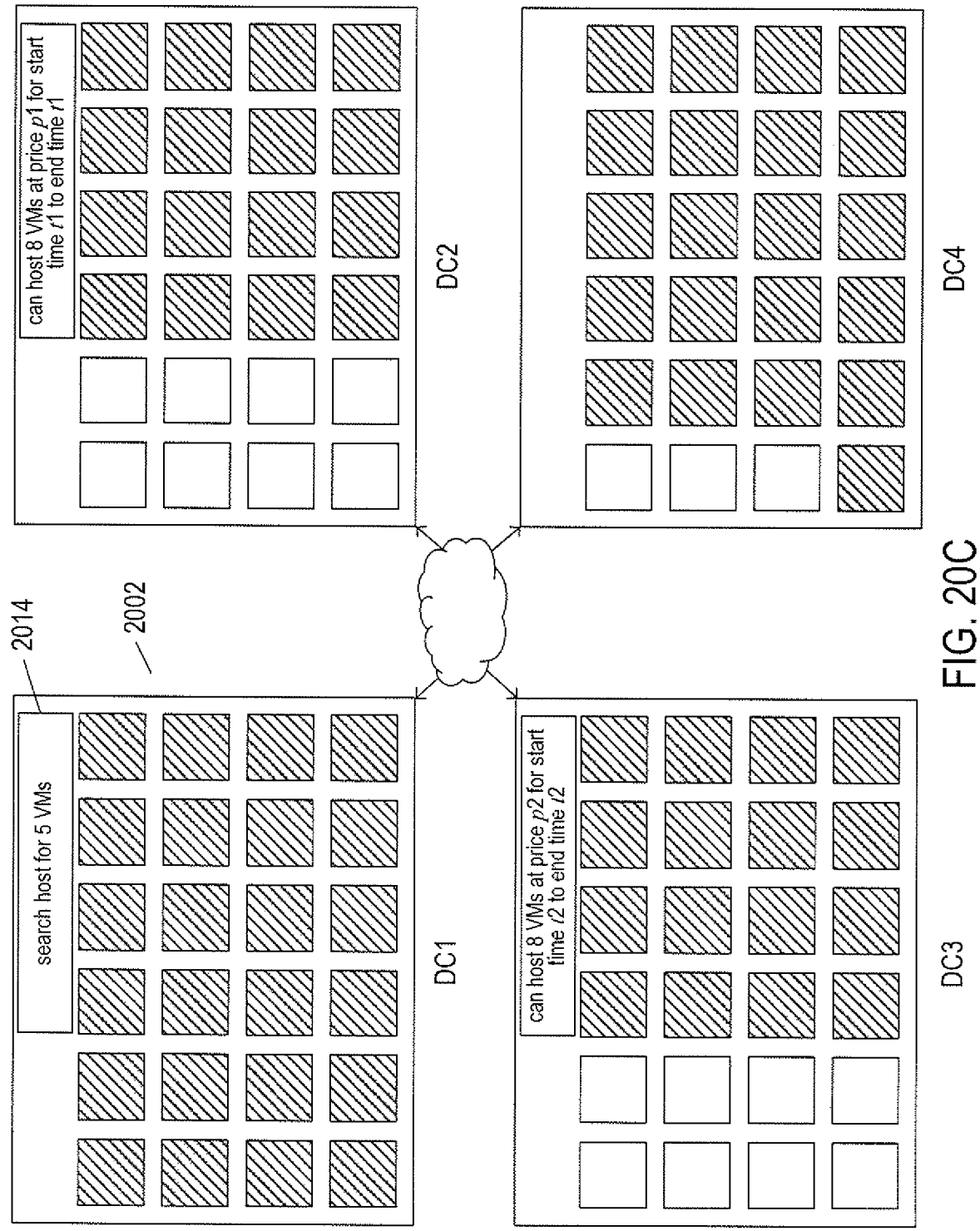

In FIG. 20C, the administrator of computing facility DC1 2003 realizes that all hosting capacity is currently in use within the computing facility. As a result, the administrator can either seek to physically expand the computing facility with new servers and other components or seek to obtain computational resources for remote providers, both for launching new VMs as well as for offloading currently executing VMs. As shown in FIG. 20C, the administrator has elected to register as a participant with the automated computational-resource brokerage and has initiated a search for one or more remote provider-participants to host five VMs 2014.

Figure 20D:
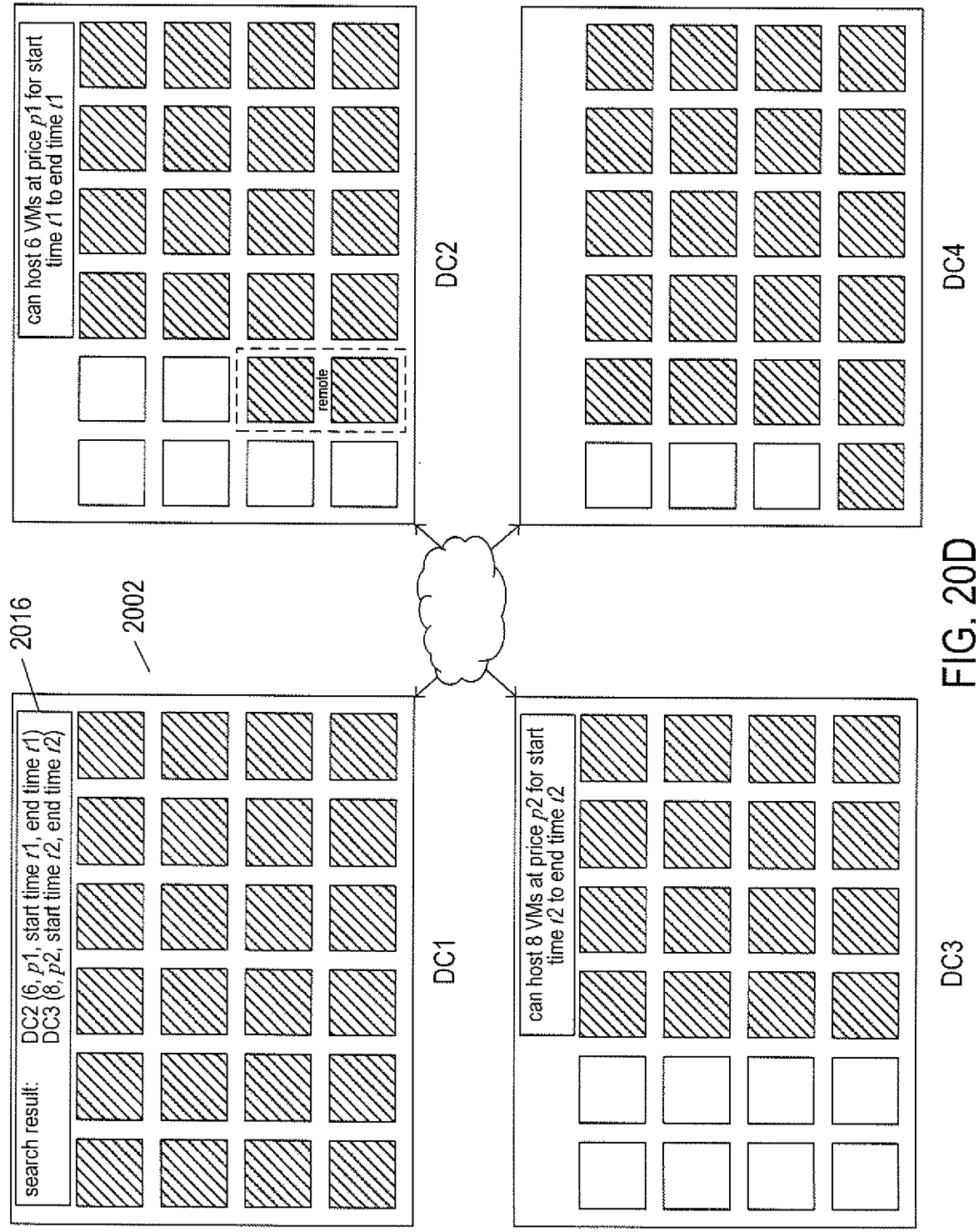

In FIG. 20D, the administrator of computing facility DC1 2002 has received search results 2016 from the automated computational-resource brokerage. The administrator, or automated resource-acquisition functionality within a local client instance of the automated computational-resource brokerage, can choose with which provider to transact for VM hosting, or can transact with both providers for hosting a different subset of the five VMs. Note that, during the time that the search was initiated, as discussed above with reference to FIG. 20C, and when initial information may have been returned from computing facility DC2 to computing facility DC1, several new VMs have been hosted by computing facility DC2. However, because the distributed search verifies respondents prior to returning search results, as discussed above, the search results 2016 accurately reflect the current hosting capacity of computing facility DC2.

Figure 20E:
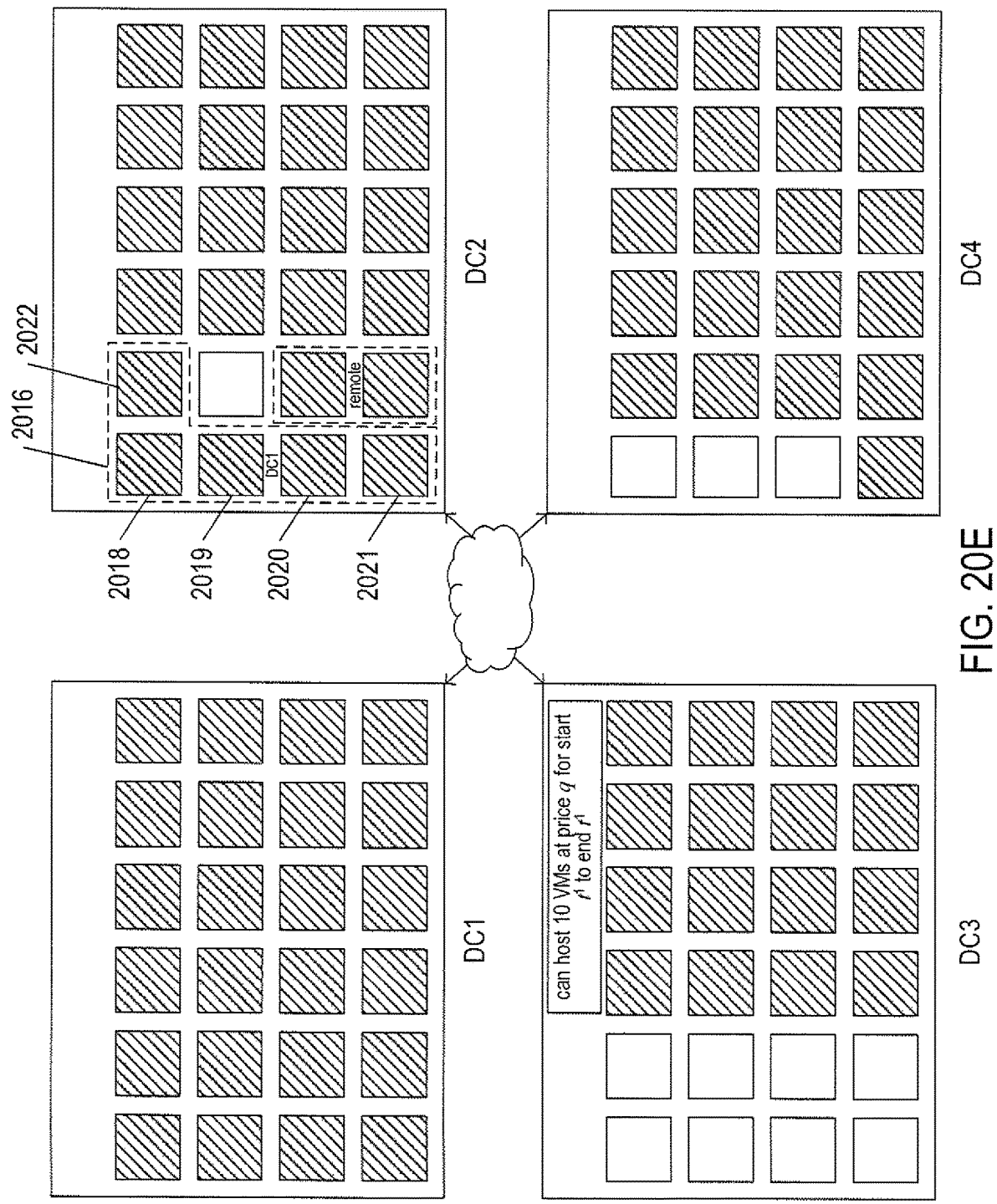

In FIG. 20E, the administrator of computing facility DC1, or automated resource-acquisition functionality within a local client instance of the automated computational-resource brokerage, has decided to transact for hosting the five VMs with computing facility DC2. As shown by the dashed lines 2016 that demarcate the 5 DC1 VMs 2018-2022 hosted by computing facility DC2, the VMs are hosted in a secure hosting partition so that neither the executing VMs nor the internal resources that they use within computing facility DC2 can be accessed or observed by DC2 entities or users. These 5 hosted VMs can be thought of as running within an extension of the DC1 computing facility.

Figure 21A:
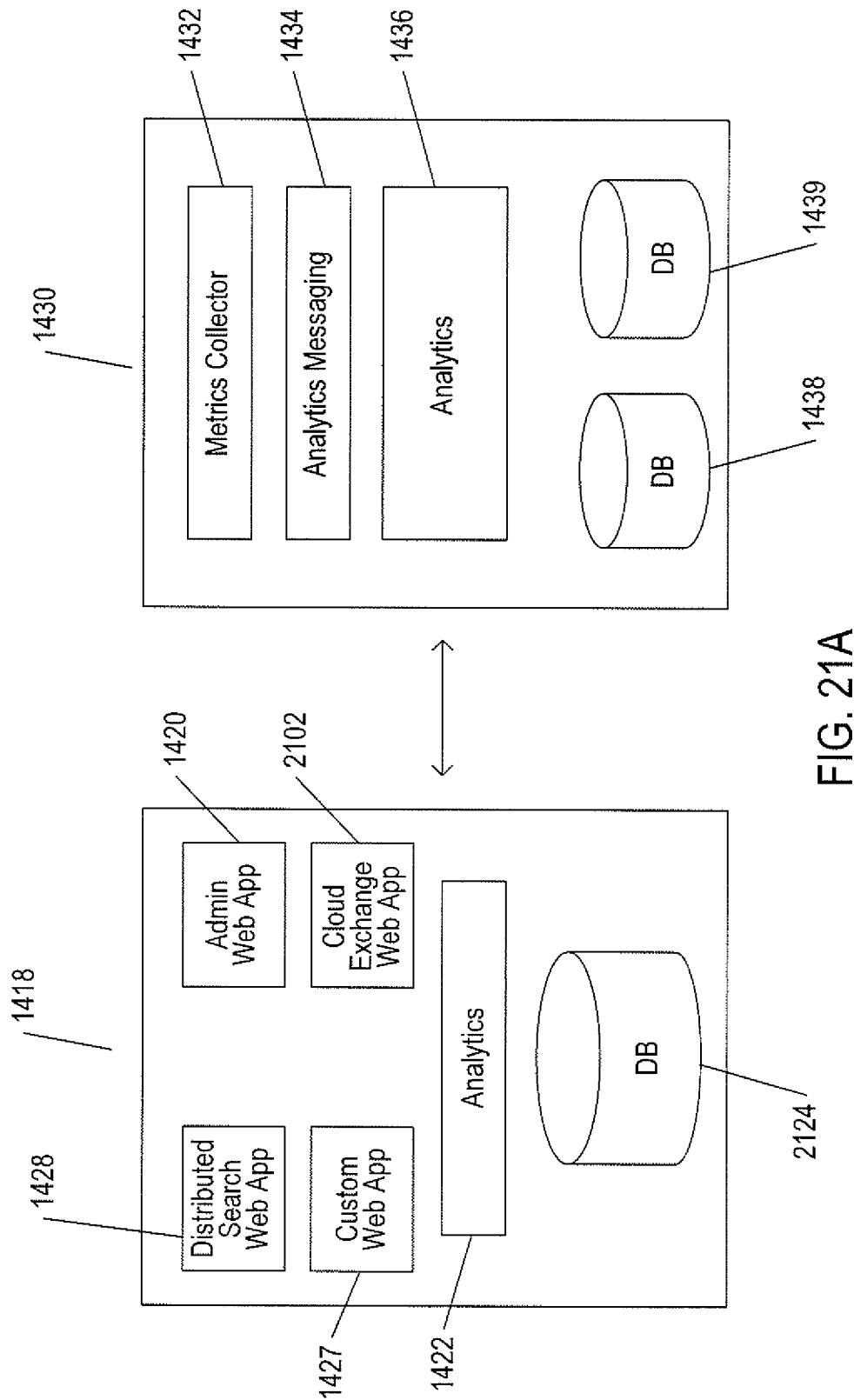
FIGS. 21A-B illustrate implementation of the automated computational-resource brokerage within multiple distributed computing facilities.
Figure 21B:
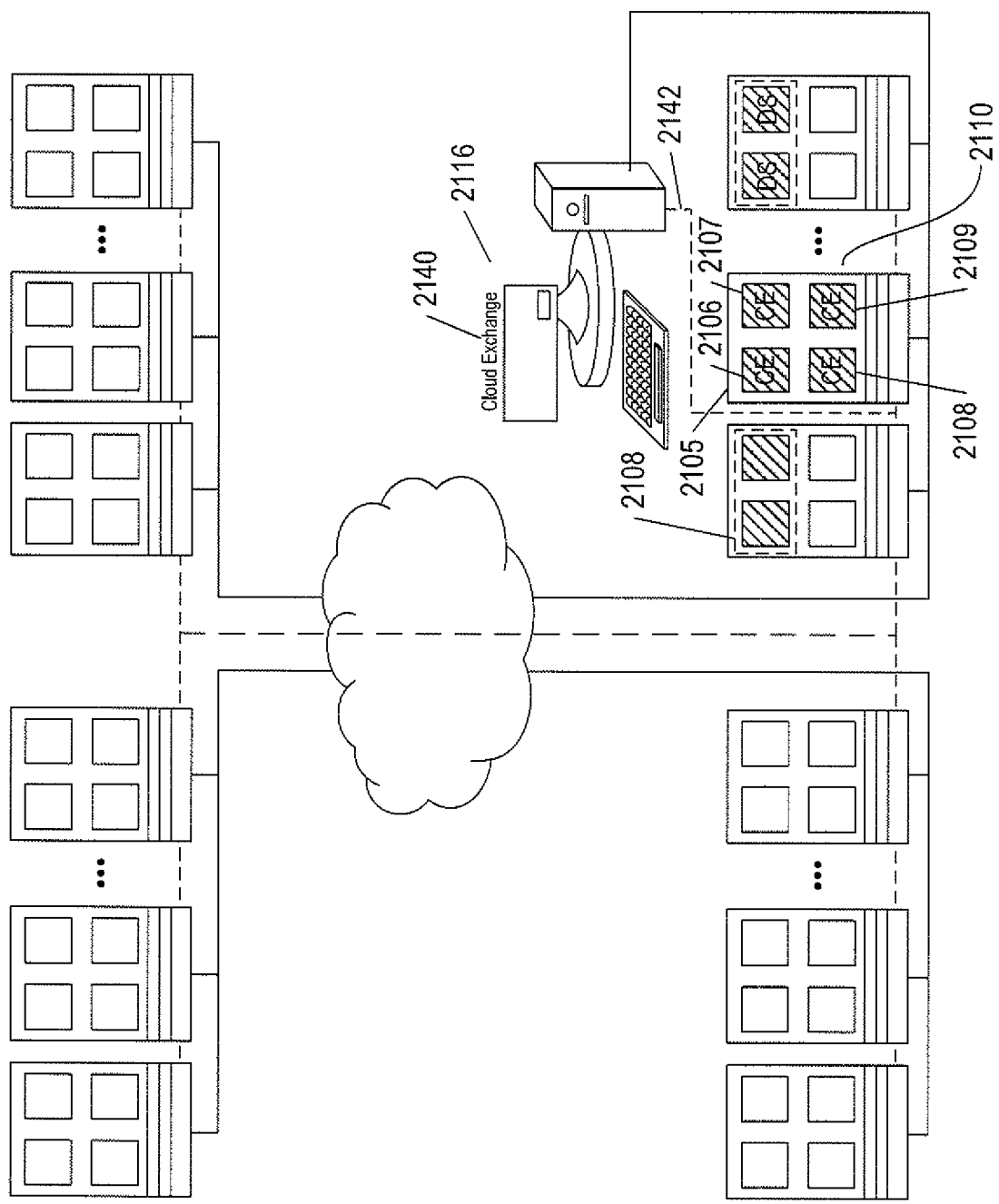

FIGS. 21A-B illustrate implementation of the automated computational-resource brokerage within multiple distributed computing facilities. The implementation of the computational-resource brokerage mirrors implementation of the distributed-search subsystem discussed above with reference to FIGS. 11B-C. The management subsystem is again shown, in FIG. 21A, using the same numeric labels used previously in FIG. 11B. In addition to the distributed-search web application 1128 that represents a local instance of the distributed-search subsystem within a server cluster, virtual data center, or some other set of computational resources within the distributed computer system, the management system provides an execution environment for a cloud-exchange web application 2102 that represents a local instance of the automated computational-resource brokerage within the server cluster. In certain implementations, the distributed-search web application 1128 may be incorporated within the cloud-exchange web application. The cloud-exchange web application 2102 provides a cloud-exchange UI (2104 in FIG. 21B) through which users can register as participants, update participant information, develop exchange policies and filters, set up automated resource-provision and resource-consumption agents within the automated computational-resource brokerage, and monitor exchanges, transactions, and other activities.

As shown in FIG. 21B, the local instance of the automated computational-resource brokerage, or cloud-exchange web application (2102 in FIG. 21A) exchanges requests and responses with a cloud-exchange engine 2105, in one implementation implemented as a multi-tiered application containing multiple cloud-exchange engine virtual machines 2106-2109 that run within a server 2110 or other computer system within the distributed computer system. The cloud-exchange engine maintains centralized attribute values and other data for the automated computational-resource brokerage, monitors transactions, carries out transactions for computational resources on behalf of participants, collects feedback and maintains ratings and/or rankings of participants, provides many default filters and policies, and carries out many additional functions that together comprise the automated computational-resource brokerage.

Figure 22:
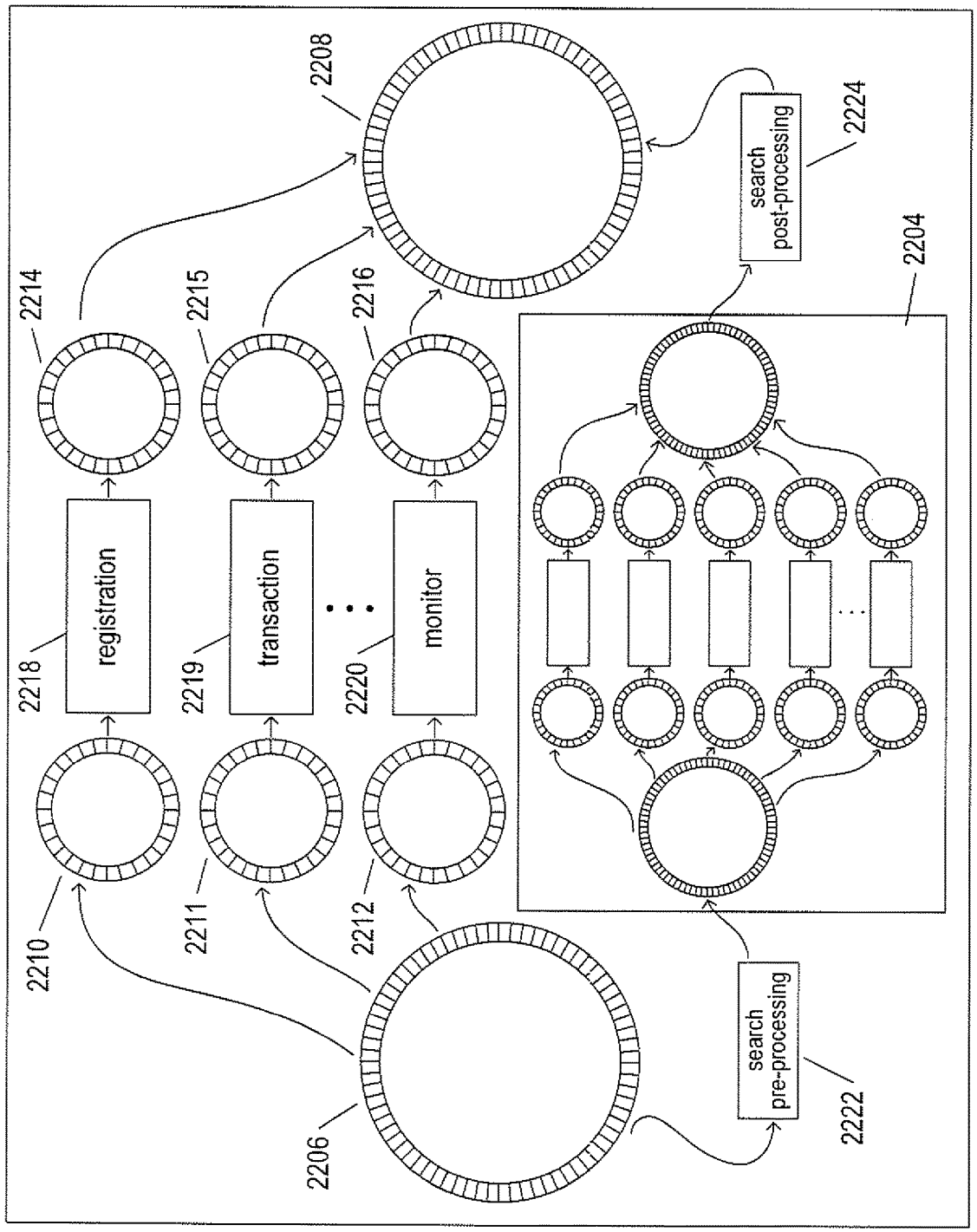
FIG. 22 illustrates the general implementation of the cloud-exchange engine (2105 in FIG. 21B).

FIG. 22 illustrates the general implementation of the cloud-exchange engine (2105 in FIG. 21B). The general implementation of the cloud-exchange engine 2202 mirrors that of the distributed-search engine 2204, discussed above with reference to FIG. 14. Incoming request and response messages are received in a general input queue 2206 and outgoing responses and requests are queued to a general output queue 2208. FIG. 14 is a high-level diagram of the distributed-search engine. There are many different types of messages received and transmitted by the cloud-exchange engine. Different types of messages can be thought of as being distributed from the input queue 2206 to input queues for specific message types, such as input queues 2210-2212. Similarly, specific types of output messages are output to specific output queues, such as output queue 2214-2216, from which they are input to the general output queue 2208 for transmission. Various different types of controllers or logic modules 2218-2220 process particular types of input messages and generate particular types of output messages. For example, controller 2218 receives registration requests and additional requests within registration dialogues and returns responses to those requests. Searches for resources, also considered to be requests for resource consumption or initiation of resource auctions, are processed by a search-pre-processing module 2222 before being input as search requests to the distributed-search engine. Search responses, or bids from resource-provider participants, are processed by a search-post-processing module 2224 before being returned to the resource-consumption participant that initiated the search or auction. Of course, many alternative implementations, including implementations that incorporate distributed-search logic directly within the cloud-exchange engine, are possible.

Resource-Exchange Life Cycle as Represented by a Resource-Exchange Context

In many implementations of the above-described resource-exchange system, each resource exchange involves a well-defined set of operations, or process, the current state of which is encoded in a resource-exchange context that is stored in memory by the resource-exchange system to facilitate execution of the operations and tracking and monitoring of the resource-exchange process. The well-defined set of operations, and the state changes associated with those operations, define the life cycle of a resource exchange within the resource-exchange system. Resource-exchange contexts are physical components of the resource-exchange system. Resource-exchange contexts persistently store policy information and state information that can be electronically accessed during resource-exchange-system operations. Resource-exchange contexts are also control components of resource-exchange system, organizing and driving the many different tasks carried out by many different resource-exchange-system components within many different computing facilities.

To facilitate understanding of the following discussion, terminology used to describe the resource-exchange system and resource-exchange-system components is next presented. The phrase "resource-exchange system" refers to a large number of computing facilities owned and managed by many different organizations that are partially aggregated to allow the computing facilities to share portions of their computational resources with other computing facilities. The phrase "resource-exchange context" refers to the information stored in memories and mass-storage devices of the resource-exchange system that encodes an indication of the current state of a particular resource exchange, a buy policy associated with the resource exchange, an active search context during at least an auction phase of the lifecycle of the resource exchange, and additional information. The phrase "resource exchange" is an exchange of a computational resource, provided for a specified time period by a resource-provider computing facility, for a fee, service, or computational resource provided by a resource-consumer computing facility. The cloud-exchange system is an automated computational-resource brokerage system, as discussed in the preceding section. The resource provider and the resource consumer, both computing-facility participants in a resource exchange, each includes a local cloud-exchange instance which provides a cloud-exchange UI and which carries out client-side tasks in support of a resource exchange that is managed by the cloud-exchange system.

The resource-exchange process can be generally subdivided into three distinct phases: (1) a pre-auction phase; (2) an auction phase; and (3) a post-auction phase. The pre-auction phase includes association of buy policies with sets of virtual machines, virtual-machine activation, and generation and sending of an initiation-request message from a resource consumer to the cloud-exchange system. The auction phase includes generating an active search context, generating a set of initial candidate resource providers, requesting of bids from the candidate resource providers, scoring and queuing returned bids, selecting final candidate resource providers, and verifying a selected resource provider by the cloud-exchange system. The post-auction phase includes migrating the one or more virtual machines to the computing facility for the selected resource provider or building the one or more virtual machines within the computing facility, establishing seamless data-link-layer ("L2") virtual-private-network ("VPN") networking from buyer to seller, and monitoring virtual-machine execution in order to detect and handle virtual-machine-execution termination, including initiating a financial transaction for compensating the resource provider for hosting one or more virtual machines.

Figure 23A:
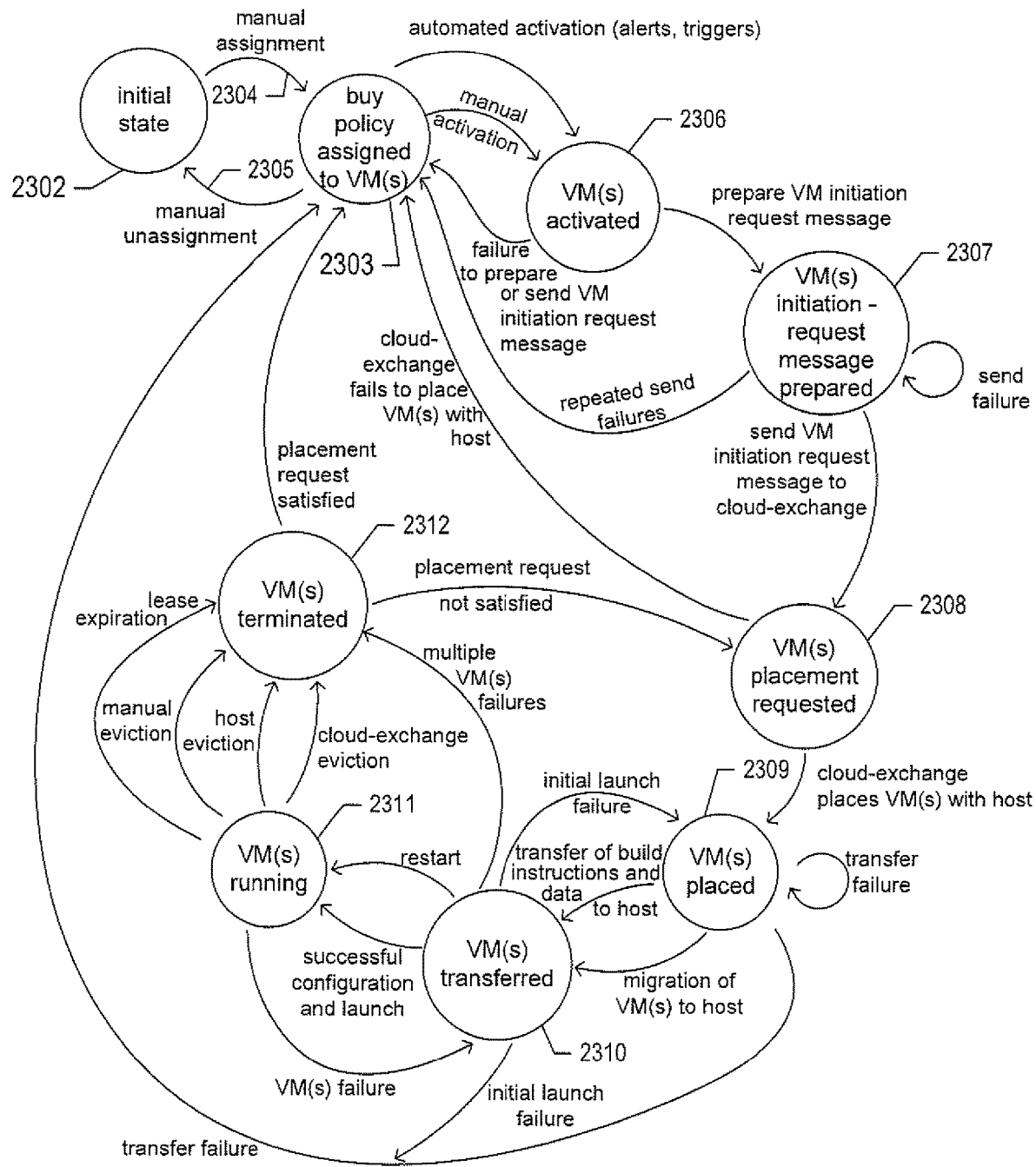
FIGS. 23A-C show the states associated with a resource exchange, and the transitions between the states, that define the VM placement and execution process for the described implementation of the cloud-exchange System and that define the lifecycle of a resource-exchange context and the particular resource exchange represented by the resource-exchange context.
Figure 23B:
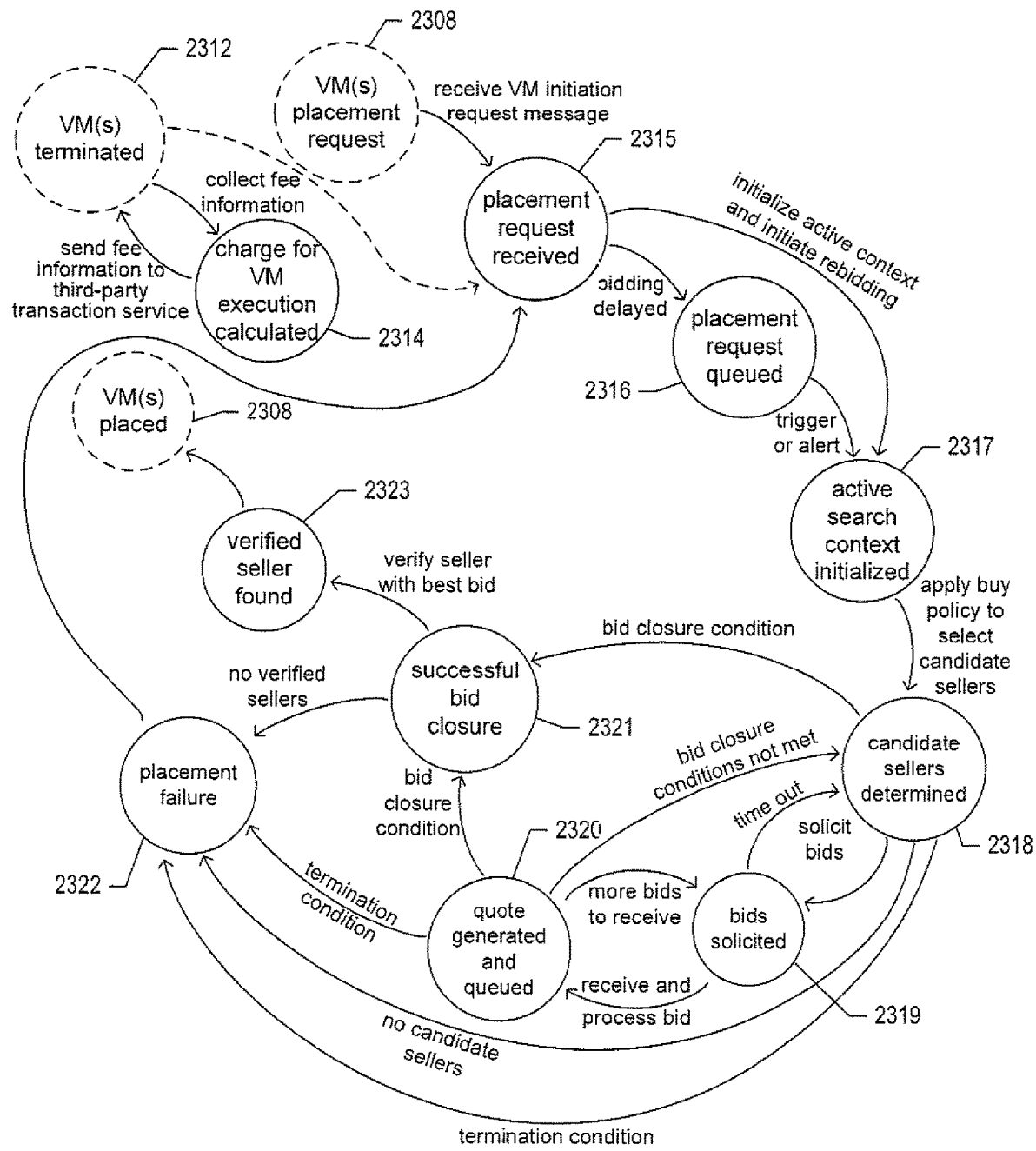
Figure 23C:
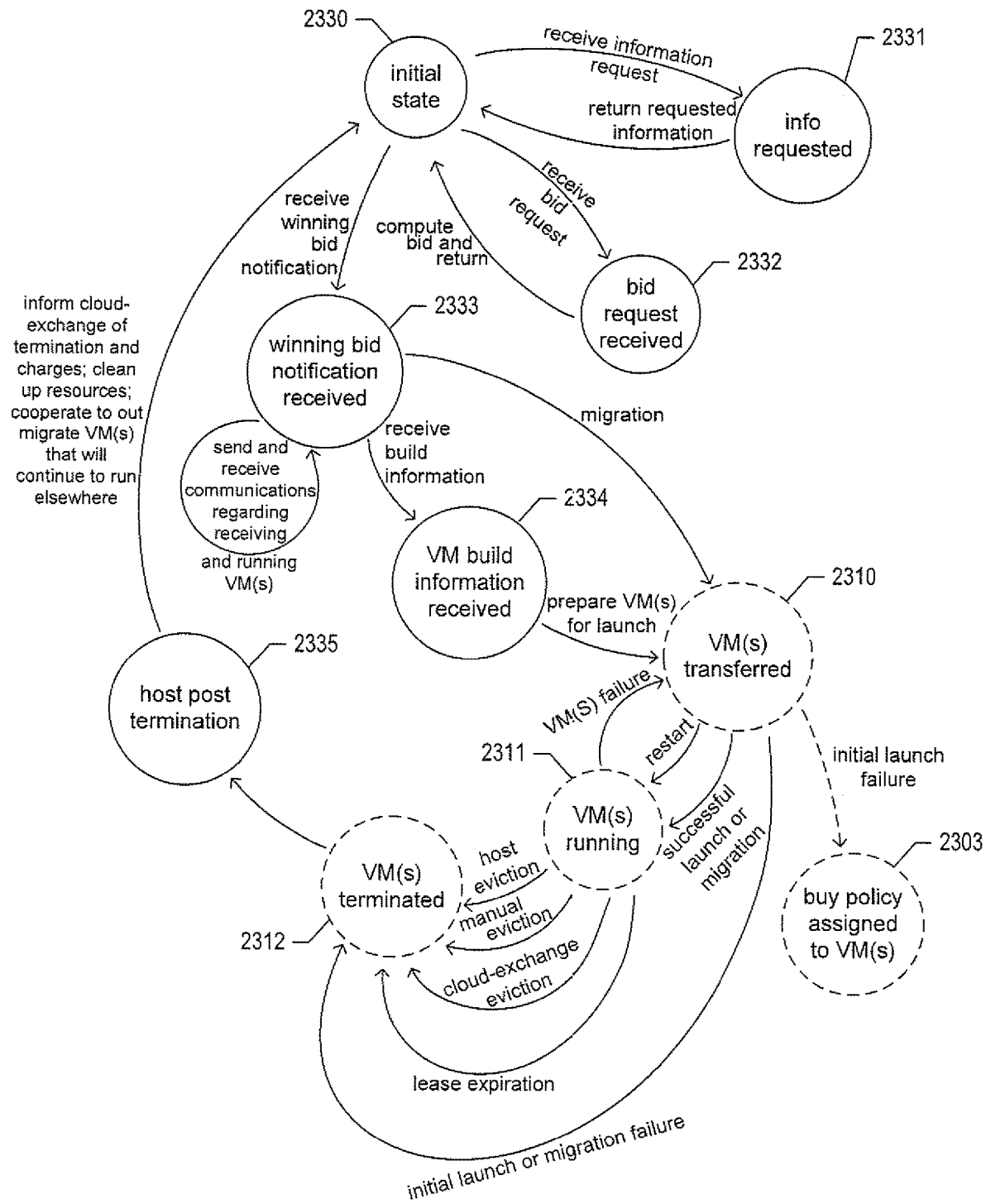

FIGS. 23A-C show the states associated with a resource exchange, and the transitions between the states, that define the VM placement and execution process for the described implementation of the cloud-exchange System and that define the lifecycle of a resource-exchange context and the particular resource exchange represented by the resource-exchange context. In FIGS. 23A-C, states are represented by labeled circles and state transitions are represented by curved arrows. A resource context, as discussed above, includes various types of stored information within the local cloud-exchange instances of resource consumers and resource providers as well as stored information within the cloud-exchange system. For much of the lifecycle of a resource exchange, an active search context stored within the cloud-exchange system is a significant component of the resource-exchange context. During all phases of the life cycle of the resource exchange, the current state of the resource exchange is continuously maintained within the resource-exchange context. The current state defines the remaining sequence of tasks that need to be completed by each of the participants in the resource exchange in order to successfully complete the resource exchange.

FIG. 23A a provides a resource-consumer-centric state-transition diagram for a particular resource exchange. The resource-exchange system is considered to be in an initial state 2302 preceding the resource exchange. In the initial state, many other resource exchanges may be in progress within the resource-exchange system. However, the currently discussed state-transition diagrams are intended to illustrate the lifecycle for a particular resource exchange independently from the many other resource exchanges and other events that may be concurrently and simultaneously occurring within the resource-exchange system. For simplicity of illustration, it is assumed that a particular resource exchange involves one or more virtual machines that execute together within a particular host. It is also possible for the virtual machines of a set of one or more virtual machines to be placed into two or more different hosts. However, in this case, each of the placements can be considered to be a separate resource exchange, with the process for each separate resource exchange generally described by the state-transition diagrams provided in FIGS. 23A-C.

The resource-exchange state transitions from the initial state to a buy-policy-assigned state 2303 as a result of manual assignment, by a system administrator or other employee of the organization managing a resource-consumer computing facility, of a buy-policy to one or more virtual machines. In certain implementations, this is carried out through a local cloud-exchange user interface. In one implementation, the virtual machines may be represented by icons that can be grouped together into folders or aggregations. Buy policies may be similarly represented by icons that can be dragged and dropped onto the folders or aggregations by mouse operations directed to the local user interface. The same user interface also allows a buy policy associated with a set of one or more virtual machines to be unassigned, resulting in transition from the buy-policy-assigned state 2303 back to the initial state 2302. These transitions are represented by curved arrows 2304-2305. In the following discussion, particular transitions between states are not numerically labeled, since the curved arrows representing transitions are annotated.

In the buy-policy-assigned state, a set of one or more virtual machines can be thought of as a potential resource exchange. An activation event promotes such potential resource exchanges to candidate-resource-exchange status, represented by the activated state 2306. Activation events generally fall into two broad categories of manual activation and automated activation. Manual activation involves interaction of a user with the UI provided by the local cloud-exchange instance within the resource-consumer computing facility or with a cloud-based UI containing virtual machine inventory data synchronized with the local cloud-exchange instance. Automated activation can occur due to alerts and triggers, electronic events that arise when certain additional events occur or when specified conditions arise within the resource-exchange system. The local cloud-exchange instance may be configured to generate, according to the buy-policy, alerts and/or triggers at specific points in time or when various different types of conditions obtain. As one example, an alert may be triggered when the available capacity for data storage or task execution within the computing facility falls below threshold levels. There are, of course, many different possible conditions or specifications that lead to automated triggers and alerts which, in turn, lead to activation of a buy-policy-assigned set of one or more virtual machines. Once a set of one or more virtual machines is activated, the local cloud-exchange instance prepares an initiation-request message for transmission to the cloud-exchange system, which is accompanied by a transition of the resource-exchange state to the initiation-request-message-prepared state 2307. The local cloud-exchange instance then sends the initiation-request message to the cloud-exchange system. When the initiation-request message is successfully sent, the state of the resource exchange transitions to the placement-requested state 2308. A failure to transmit the message returns the resource-exchange state to the initiation-request-message-prepared state, in which additional attempts to send the initiation-request message may be undertaken. After a sufficient number of failures, the resource-exchange state transitions back to the buy-policy-assigned state 2303, often with various types of error logging and error reporting to the local user interface. In alternative implementations, repeated send failures may result in a transition of the resource-exchange state back to the activated state 2306.

The next states in FIG. 23A, described below, are again shown in FIG. 23B. The transitions between these states involve process steps carried out primarily by the cloud-exchange system and a resource-provider system selected to host the set of one or more VMs. Nonetheless, the local cloud-exchange instance within the resource-consumer computing facility is aware of these state transitions, in many implementations.

The resource-exchange state transitions from the placement-requested state 2308 to the placed state 2309 once the cloud-exchange system places the one or more virtual machines with a selected host computing facility, or resource provider. Once the set of one or more virtual machines has been placed, a successful transfer of build instructions or a successful migration of the one or more virtual machines from the resource-consumer computing facility to the host results in a transition of the resource-exchange state to the transferred state 2310. However, a failure to transfer the build data or to migrate the set of one or more virtual machines results in a transition of the resource-exchange state to the buy-policy-assigned state 2303, in one implementation. In alternative implementations, transitions to other states are possible when, for example, the cloud-exchange system is able to recover from such transfer failures by placing the one or more virtual machines with another host. From the transferred state 2310, the resource-exchange state transitions to the running state 2311 when the one or more virtual machines are successfully configured and launched within the host system. Of course, during a hot migration, the configuration and launching step is merged with the migration step. Execution failure of the one or more virtual machines returns the resource-exchange state to the transferred state 2310. A successful launch of execution or re-start of execution of the one or more VMs returns the resource-exchange state to the running state 2311. Multiple execution failures may result in a transition from the transferred state to the terminated state 2312. In the running state 2311, the one or more virtual machines continue to execute until expiration of the current lease, the occurrence of a resource-consumer eviction, a host eviction, or a cloud-exchange eviction, or the occurrence of other types of execution-termination events. When the original placement request has not yet been satisfied, the resource-exchange state transitions from the terminated state back to the placement-requested state 2308 from which the cloud-exchange system can again place of the one or more virtual machines with a host for continued execution. When the initial placement request is satisfied, the resource-exchange state transitions back to the buy-policy-assigned state 2303.

FIG. 23B provides a cloud-exchange-system-centric resource-exchange state-transition diagram. This state-transition diagram includes three states already shown in FIG. 23A and discussed above. These three states are shown in with dashed circles rather than solid circles. When execution of the one or more virtual machines terminates, and the resource exchange is therefore currently in the terminated state 2312, the resource-exchange state briefly transitions to the charge-for-VM-execution-calculated state 2314 when the cloud-exchange system collects the information for the terminated execution of the one or more virtual machines and computes a charge for the terminated execution. The resource-exchange state transitions back to the terminated state 2312 once the cloud-exchange system sends the fee information and calculated fee to a third-party transaction service. The third-party transaction service carries out the financial transactions needed for transfer of the calculated fee from the resource consumer to the resource provider. There are many different types and modes for these transaction services. The calculated fees may be automatically withdrawn from deposit accounts, in certain cases, or the third-party transaction service may forward electronic or paper bills to the organization that manages the resource-and consumer computing facility. When an initiation-request message has been received by the cloud-exchange system, and the resource-exchange state is in the placement-requested state 2308, the resource-exchange state transitions to the placement-request-received state 2315. When initiation of an auction is delayed, according to the buy-policy associated with the set of one or more virtual machines or because of bandwidth limitations within the cloud-exchange system, the resource-exchange state transitions to the placement-request-queued state 2316. Otherwise, the resource-exchange state transitions to the active-context-initialized state 2317 when the cloud-exchange system uses the information transferred in the initiation-request message, along with information stored within the cloud-exchange system, to prepare an active search context for the placement request. The occurrence of a trigger or alert results in a transition from the placement-request-queued state 2316 to the active-search-context-initialized state 2317. The resource-exchange state transitions from the active-search-context-initialized state 2317 to the candidate-sellers-determined state 2318 when the cloud-exchange system applies buy-policy filters and other information to select an initial candidate set of resource providers. In certain cases, additional information may be solicited by the cloud-exchange system from resource providers to facilitate selection of the initial candidate resource-providers set. Once an initial set of candidate resource providers has been determined, the resource-exchange state transitions, in one implementation, to the bids-solicited state 2319 following transmission, by the cloud-exchange system, of bid solicitations to each of the initial candidate resource providers. When, after a reasonable period of time, one or more of the candidate resource providers has not responded to the bid solicitation, the resource-exchange state may transition back to the candidate-sellers-determined state 2318 in order for additional bid solicitations to be sent out by the cloud-exchange system to non-responding candidate resource providers. In the bids-solicited state 2319, the cloud-exchange system transitions to the quote-generated-and-queued state 2320 upon receiving and processing each bid before returning to the bids-solicited state 2319 to await further bids, when bids have not been received from all candidate resource providers. When the final bid has been received, and a quote generated and queued for the bid, and when bid-closure conditions have been met, the resource-exchange state transitions to the successful-bid-closure state 2321. When, however, one of various different types of termination conditions have instead arisen, the resource-exchange state transitions to the placement-failure state 2322. Otherwise, the resource-exchange state may transition back to the candidate-sellers-determined state 2318 for an immediate or a delayed subsequent round of bid solicitations. When no final candidate resource providers have been obtained following a maximum number of bid-solicitation attempts, or when one of many different types of termination conditions obtain, the resource-exchange state transitions from the candidate-sellers-determined state 2318 to the placement-failure state 2322. When a bid-closure condition obtains while the resource-exchange state is the candidate-sellers-determined state 2318, the resource-exchange state transitions to the successful-bid-closure state 2321. In a second, often more efficient implementation, the bids are generated by the cloud-exchange engine automatically, on behalf of the candidate resource-providers, in which case the bids-solicited state 2319 and the quote-generated-and-queued state 2320 are merged with the candidate-sellers-determined state 2318. In this second implementation, the cloud-exchange engine automatically bids on behalf of the identified candidate sellers and transitions to successful-bid-closure state 2321 or placement-failure state 2322. When the cloud-exchange system is able to successively verify one of the final candidate resource providers, the resource-exchange state transitions to the verified-seller-found state 2323. Otherwise, a transition to the placement failure state 2322 occurs. From the verified-seller-found state 2323, the resource-exchange state transitions to the previously described placed state 2309. The resource-exchange state transitions from the placement-failure state 2322 to the previously described placement-request-received state 2315.

Of course, in each particular implementation of the resource-exchange system, there may be many additional states and state transitions. The currently described state-transition diagrams are intended to show those states and state transitions that are common to the reasonably large fraction of the various possible implementations of the resource-exchange system.

FIG. 23C provides a resource-provider-centric resource-exchange state-transition diagram. The resource provider is shown to inhabit an initial state 2330. When the resource provider receives an information request, the resource-exchange state transitions to the information-requested state 2331 and then returns back to the initial state when the requested information is returned to the cloud-exchange system. Similarly, when the resource provider system receives a bid request, the resource-exchange state transitions briefly to the bid-request-received state 2332 before returning to the initial state following a transmission of a computed bid request back to the cloud-exchange system. When the resource-provider system receives a winning-bid notification from the cloud-exchange System, the resource-exchange state transitions to the winning-bid-notification-received state 2333. In the winning-bid-notification-received state, the resource-provider computing facility exchanges communications with the cloud-exchange system and the local cloud-exchange instance within the resource consumer to coordinate the transfer of virtual-machine build information or migration of virtual machines to the resource provider. When the virtual machine is built by the resource provider, the resource-exchange state transitions to the build-information-received state 2334 and then to the previously described transferred state 2310 once the one or more virtual machines have been prepared for launch. The resource-exchange state transitions from the winning-bid-notification-received state 2333 to the transferred state 2310 directly when the one or more virtual machines are migrated to the resource provider. States 2310-2312 and 2303 are again shown in FIG. 23C, for completeness, but are not again described. Following termination of the execution of the one or more virtual machines, the resource-exchange state transitions to the host-post-termination state 2335. In the host-post-termination state, the resource provider exchanges communications with the cloud-exchange system to inform the cloud-exchange system of the execution termination and of the accrued fees for hosting the one or more virtual machines, cooperates with other entities to migrate the one or more virtual machines to another computing facility, in the case that the one or more virtual machines will continue to execute following lease termination or eviction, and cleans up local resources allocated for executing the one or more virtual machines within the resource-provider computing facility. The transition to the host-post-termination state may be initiated by a cloud-exchange lease-expiration scheduler which continuously monitors active resource exchanges to detect lease terminations.

Note that the resource-exchange state is generally a combination of two or more of the states, discussed above with reference to FIGS. 23A-C, each inhabited by one or more of the resource consumer, the cloud-exchange system, and one or more resource providers. For example, the resource-exchange state may temporarily be a combination of the host-post-termination state 2335, the placement-request-receive state 2315, and the buy-policy-assigned state 2303. Note also that certain of the operations performed to affect state transitions may vary, depending on the history of state transitions for a particular resource exchange. As one example, an active search context needs only to be allocated the first time a resource exchange transitions from the placement-request-receive state 2315 to the active-search-context-initialize state 2317.

Resource-Provider Pricing of Hosting Services

As discussed above, during the auction phase of a resource exchange, initial candidate resource providers are obligated to bid for the resource-exchange exchange, or trade, for which they are identified as being candidate resource providers. In a first implementation, discussed above, the initial candidate resource providers respond to bid requests by transmitting a bid-response message to the cloud-exchange system. In the second implementation, discussed above, the bid requests are automatically generated by the cloud-exchange engine on behalf of resource providers, with the cloud-exchange engine using stored information previously furnished by the resource providers to generate bids. In either case, whether the bids are solicited from the resource providers or generated on behalf of the resource providers, the auction is a specific type of distributed search. The current document is directed to processing of bid requests by the local cloud-exchange instances within resource providers. Processing of bid requests generates, in the described implementation, quotes for hosting the one or more virtual machines for which a resource consumer is requesting bids. The hosting price is generally one factor used by the distributed-search engine to compute a score for the bid represented by the bid-response message. The auction is a distributed search for a resource provider that can host the one or more virtual machines, under specified constraints, for the lowest possible price. In the following discussion, it is assumed that a price is determined for hosting either a single VM or for hosting a set of VMs with similar execution characteristics. The discussed implementations are straightforwardly modified to support pricing sets of dissimilar VMs, although, in many implementations, dissimilar VMs can be separately auctioned by the cloud-exchange system.

Figure 24:
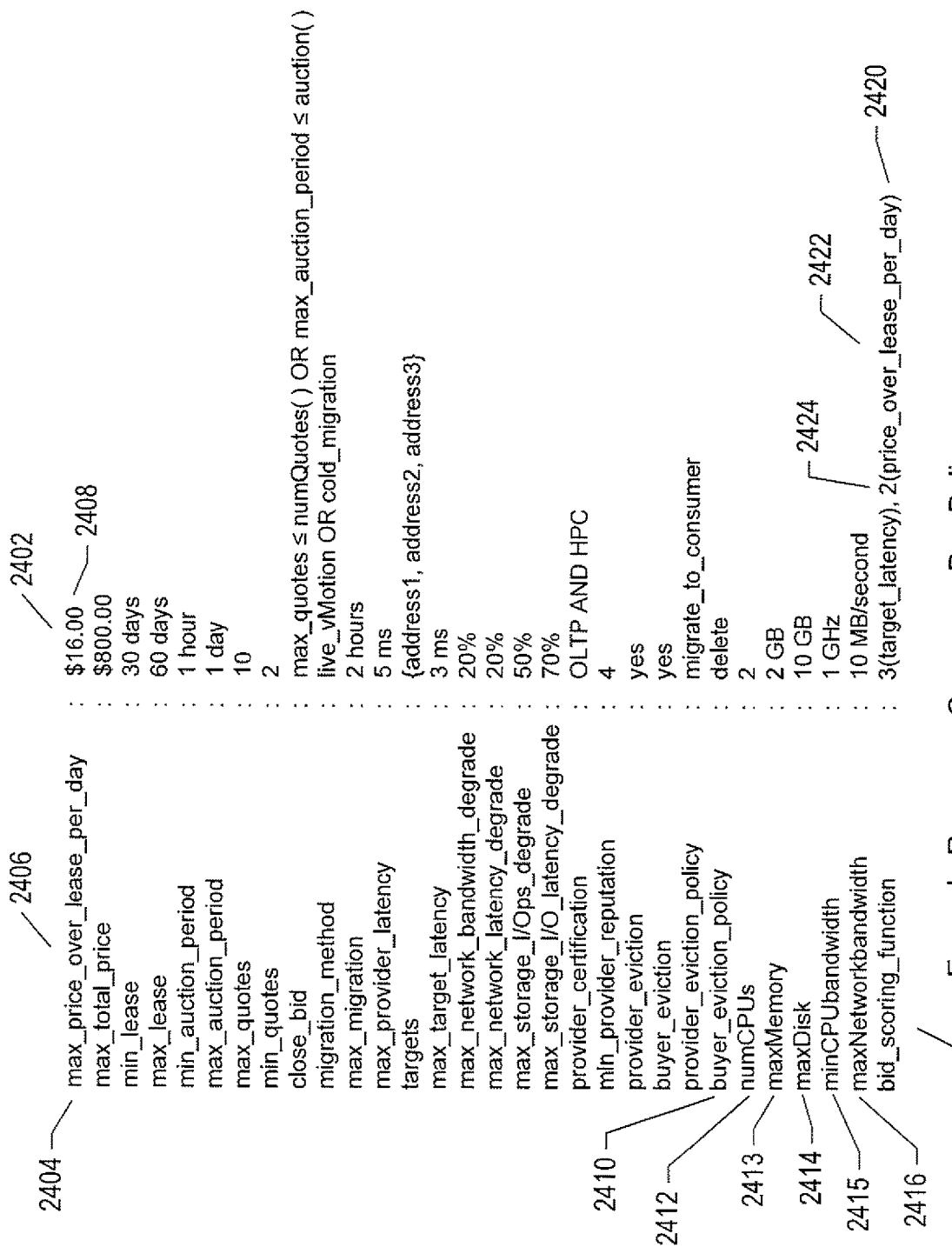
FIG. 24 illustrates an example buy policy that is furnished by a resource consumer to the cloud-exchange system for use by the cloud-exchange system to configure a distributed search for a resource provider to host a virtual machine.

FIG. 24 illustrates an example buy policy that is furnished by a resource consumer to the cloud-exchange system for use by the cloud-exchange system to configure a distributed search for a resource provider to host a virtual machine. The buy policy 2402 is an example of a policy discussed above with reference to FIG. 15C. The buy policy comprises a set of attribute/value pairs, including attribute/value pair 2404 with attribute max_price_over_lease_per_day 2406 and value $16.00 2408. This attribute/value pair represents a constraint for the auction, or distributed search. The constraint specifies that the resource consumer is willing to pay only as much as $16 per day to a resource provider for hosting the one or more virtual machines for which the resource consumer is seeking bids. In the buy policy shown in FIG. 24, there are numerous specified constraints, beginning with constraint 2404 and ending with constraint 2410. Following the constraints, the buy policy includes 5 attribute/value pairs 2412-2416 that specify the configuration for the virtual machine, including the needed number of virtual CPUs, the maximum amount of memory needed, the maximum amount of storage space needed, a minimum needed CPU bandwidth, and a maximum needed network bandwidth. There are, of course, many different ways for any particular constraint or configuration element to be expressed in terms of an attribute and a corresponding value. The particular attributes and values chosen for the example buy policy shown in FIG. 24 are merely examples. The buy policy additionally includes an attribute/value pair 2418 with a search evaluation expression as the value. Search evaluation expressions are discussed above with reference to FIG. 15C. Search evaluation expressions are used by the distributed-search-engine component of the cloud-exchange system for scoring bids returned by initial candidate resource providers. The search evaluation expression 2420 includes a price component 2422 multiplied by a weight 2424 with value 2. Thus, when a candidate resource provider returns a bid-response message that includes a hosting price, the hosting price becomes a factor in the search evaluation expression that is used by the distributed-search-engine component of the cloud-exchange system to select a winning bid.

Figures 25A, 25B:
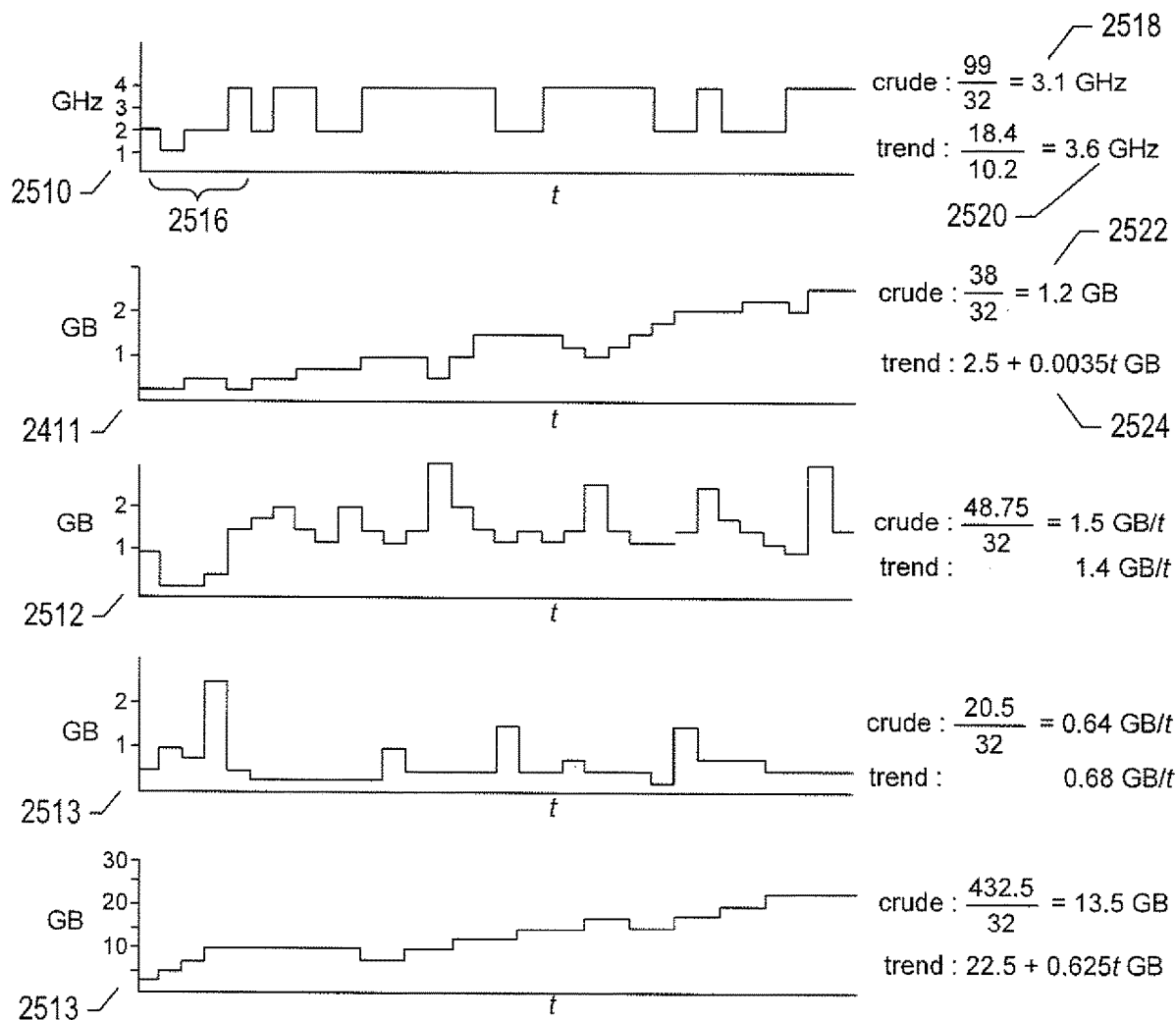
FIGS. 25A-B illustrate certain of the information used by one implementation of the local cloud-exchange instance within a resource provider to compute one or more hosting fees that are returned in bid-response messages to the cloud-exchange engine, in certain implementations, or generated by the cloud-exchange engine on behalf of resource providers, in other implementations.

FIGS. 25A-B illustrate certain of the information used by the local cloud-exchange instance, in various implementations, to determine hosting fees for virtual machines. In certain implementations, a resource provider computes one or more hosting fees that are returned in bid-response messages to the cloud-exchange engine. In other implementations, hosting fees are generated by the cloud-exchange engine on behalf of resource providers. In general, the hosting-fee information is computed based on the sum of resource units expected to be consumed by a virtual machine during a lease period. In one approach, the expected rate of consumption, in resource units per unit of time, is determined for a virtual machine, and the resource-consumption rate is multiplied by the lease period, in units of time, to obtain a total amount of each type or resource that the virtual machine is expected to consume during the lease period. In the currently described implementation, for many pricing modes further discussed below, the cloud-exchange engine or the local cloud-exchange instance within the resource provider computes fees or prices for each of CPU usage 2502, memory usage 2503, network usage 2504, storage-access usage 2505, and storage-capacity usage 2506. In many cases, the resource provider provides a virtual machine with virtual CPUs, virtual memory, virtual networks, and virtual mass-storage which are mapped, as discussed in a previous subsection, to physical computational resources within one or more data centers. As shown in FIG. 25A, in the currently described implementation, the resource consumption rates are based on a CPU-usage rate 2502, a memory-usage rate 2503, a network-usage rate 2504, a storage-access rate 2505, and a storage-capacity-usage rate 2506. By computing fees associated with each of the five above-mentioned resources, the local cloud-exchange instance within a resource provider is able to generate a reasonably fine-grained estimate of the fees for hosting one or more VMs. In general, the CPU-bandwidth fee 2502 is computed in units of processor cycles, computed by multiplying a processor-bandwidth-consumption rate, expressed as a bandwidth consumed per time unit, such as gigahertz ("GHz") per hour, by the lease period. As shown in FIG. 25A, the bandwidth-consumption rate is often expressed as a bandwidth-consumption rate per virtual CPU multiplied by a number of virtual CPUs, so that the CPU-bandwidth fee is expressed as the number of CPUs times the bandwidth per CPU per unit of time multiplied by the lease period, in units of time. The memory fee is generally expressed as a total amount of memory consumed, obtained by multiplying a rate of memory consumption per unit of time, such as gigabytes ("GB") per hour, by the lease period, in units of time. Similar units are used for expressing rates of network and storage-access resource consumption 2504-2505 and storage-capacity consumption 2506 per unit time, from which total consumption of the network, storage-access, and storage-capacity resources is obtained by multiplying the consumption rates by the lease period, expressed in units of time. The network and storage-access consumption rates indicate the amount of data exchanged between the virtual machine and the network and virtual storage devices, respectively, per unit of time. Of course, in different implementations, fewer, a greater number of, or different types of resource fees may be computed as a basis for calculating bid prices.

FIG. 25B shows information that can be obtained by the local cloud-exchange instance within a resource provider, by the local cloud-exchange instance within a resource consumer, or by the cloud-exchange engine. FIG. 25B shows five plots 2510-2513 indicating resource consumption per time by an executing virtual machine for each of the five computational resources discussed above with reference to FIG. 25A. In plot 2510, for example, the CPU bandwidth used by an executing virtual machine over a period of time is plotted. During an initial time period 2516, the CPU-bandwidth consumption is somewhat irregular. Following the initial time period, CPU-bandwidth consumption varies more regularly between 2 GHz and 4 GHz. The information in the plot can be computationally summarized in various ways. For example, the CPU-bandwidth consumed by the virtual machine may be crudely approximated as the average consumed CPU bandwidth over the entire time 2518. Alternatively, a more sophisticated approach may be used to determine a trend or pattern in resource consumption and to generate a value or expression for resource consumption by the VM 2520. The crude average shows that CPU-bandwidth consumption by the VM is approximately 3.1 GHz. A more sophisticated analysis reveals that, on average, the VM consumes 3.6 GHz, following an initial time. In plot 2511, consumption of memory by the VM is shown over a period of time. In this case, it appears that memory usage by the VM continuously increases over time. A crude average of memory usage over the entire period 2522 indicates a memory usage of 1.2 GB. However, a more sophisticated analysis produces an expression 2524 from which the memory usage at any given point in time can be computed and from which the memory usage for a particular period of time can be computed by integration.

There are, of course, an almost limitless number of ways that the resource consumption of a virtual machine can be expressed, either using fixed values, algebraic expressions, tables, or other such expression methods. For certain types of resources, the consumption may be expressed as a numeric value or expression indicating the amount of the resource used per unit of time while, for other types of resources, the consumption may be expressed as a numeric value or expression indicating the amount of resource used, expressed in cycles of I/Os per unit of time, per unit of time.

Resource-consumption data can be obtained from various different sources. As discussed above, a physical or virtual data center includes a management server and management interface (1006 and 1008 in FIG. 10) and an aggregation of virtual data centers may include an aggregation management server and interface (1314 in FIG. 13). Management functionality provided by management servers within a data center are accessed by local cloud-exchange instances and management servers within a participant data centers are accessed by the cloud-exchange engine. Various different types of management servers and management subsystems provide different types of resource-consumption histories for virtual machines executing within the virtual data centers or virtual-data-center aggregations. The resource-consumption data is often normalized, extended, statistically analyzed, and otherwise processed to provide resource-consumption data that can be used to characterize the resource-consumption personality of virtual machine and types of virtual machines. The resource-consumption personality may be compiled for a particular virtual machine based on that virtual machine's recorded execution behavior. Alternatively, a resource-consumption personality can be compiled for certain types of well-known virtual-machine configurations, including the application or applications run by the virtual machines and other configuration information. These types of stock resource-consumption personalities can be used, for example, to characterize and project resource consumption for virtual machines that are built, on-site, by resource providers on behalf of resource consumers. In a yet different approach, a resource-consumption personality can be compiled from responses to crowd-sourced inquiries and other available information regarding resource consumption by virtual machines with known configurations. A resource-consumption personality can be provided by a resource consumer for a virtual machine for which the resource consumer is seeking a resource-provider host through the cloud-exchange system. Alternatively, a resource-consumption personality can be maintained by the resource provider for a variety of virtual-machine types and configurations. Finally, the cloud-exchange system can itself compile and maintain resource-consumption personalities for individual virtual machines as well as for various types and configurations of virtual machines.

Figure 26A:
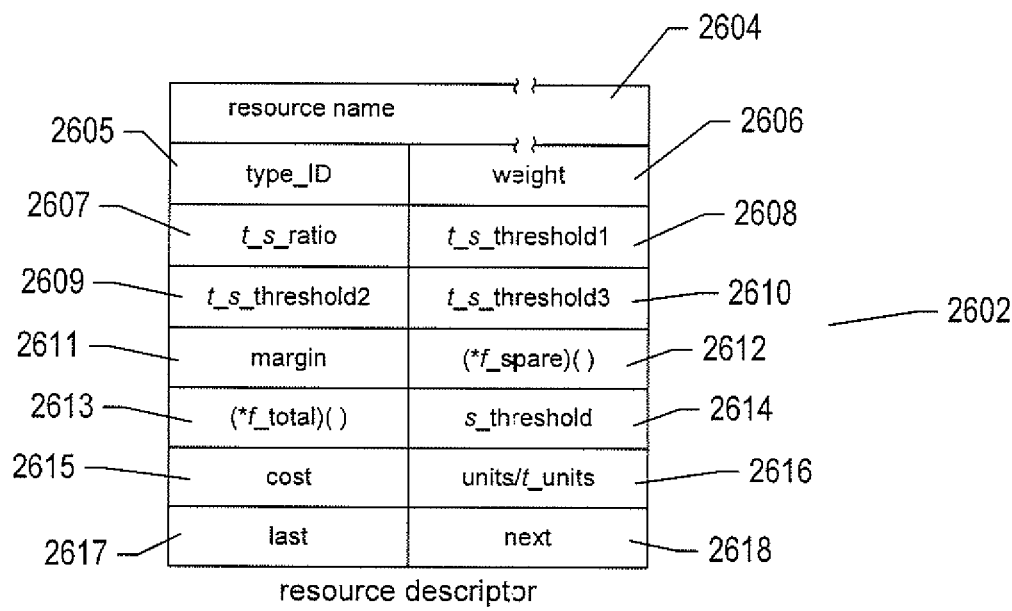
FIGS. 26A-C illustrate several data structures used in an implementation of resource-provider hosting-price calculation, discussed below.
Figure 26B:
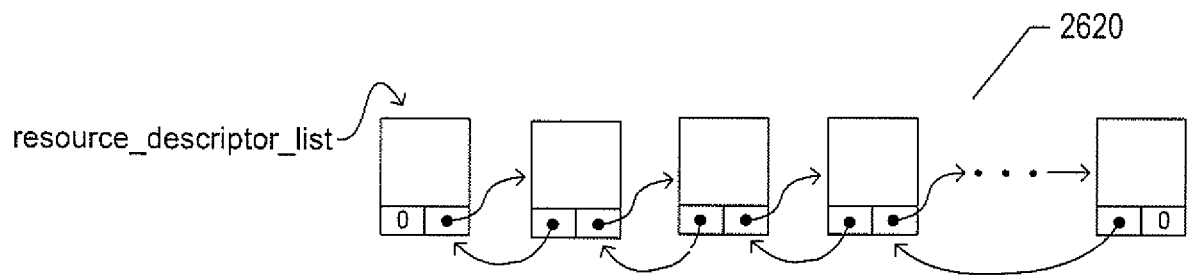
Figure 26C:
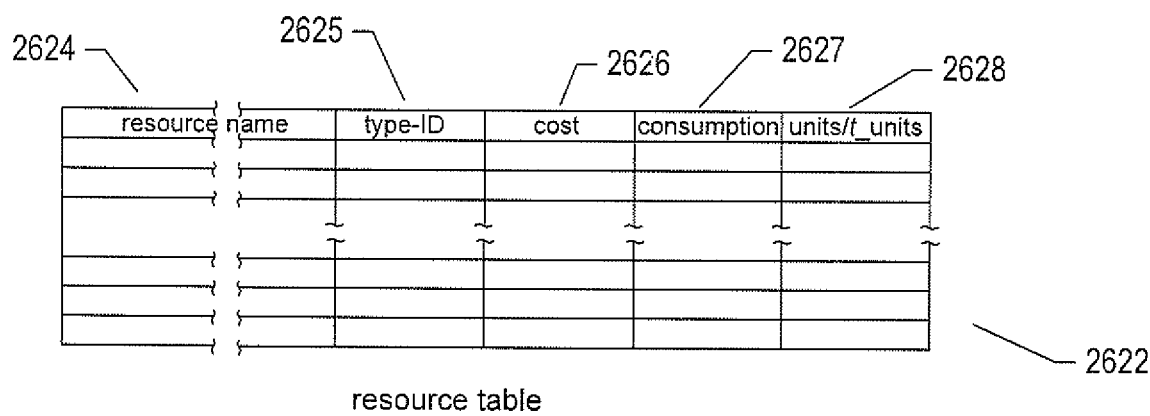

FIGS. 26A-C illustrate several data structures used in an implementation of resource-provider hosting-price calculation, discussed below. FIG. 26A shows a resource-descriptor data structure 2602 that stores data related to a particular computational resource. This data includes: (1) a resource name 2604; (2) a resource-type identifier 2605; (3) a weight 2606 used in price computations; (4) a total-capacity-to-spare-capacity ratio 2607; (5) three total-capacity-two-spare-capacity thresholds 2608-2610; (6) a margin 2611; (7) a function for obtaining the spare capacity for the resource 2612; (8) a total-capacity function 2613; (9) three spare-capacity thresholds 2614; (10) a resource cost 2615; (11) an indication of the units in which the cost is expressed 2616; (12) a last pointer 2617; and (13) a next pointer 2618. As shown in FIG. 26B, resource descriptors are linked together by their last and next pointers to form a resource-descriptor list 2620. FIG. 26C shows a resource-table data structure 2622 that is used to store both a cost and a consumption or consumption rate for each of multiple computational resources. Each row in the table represents data for a particular computational resource. The columns of the table correspond to fields within the table-entry data-representation of a computational resource. The fields include: (1) a resource name 2624; (2) a resource-type identifier 2625; (3) a computed cost 2626; (4) a computed consumption rate 2627; and (5) an indication of the units in which the cost and consumption is expressed 2628.

Figure 27:
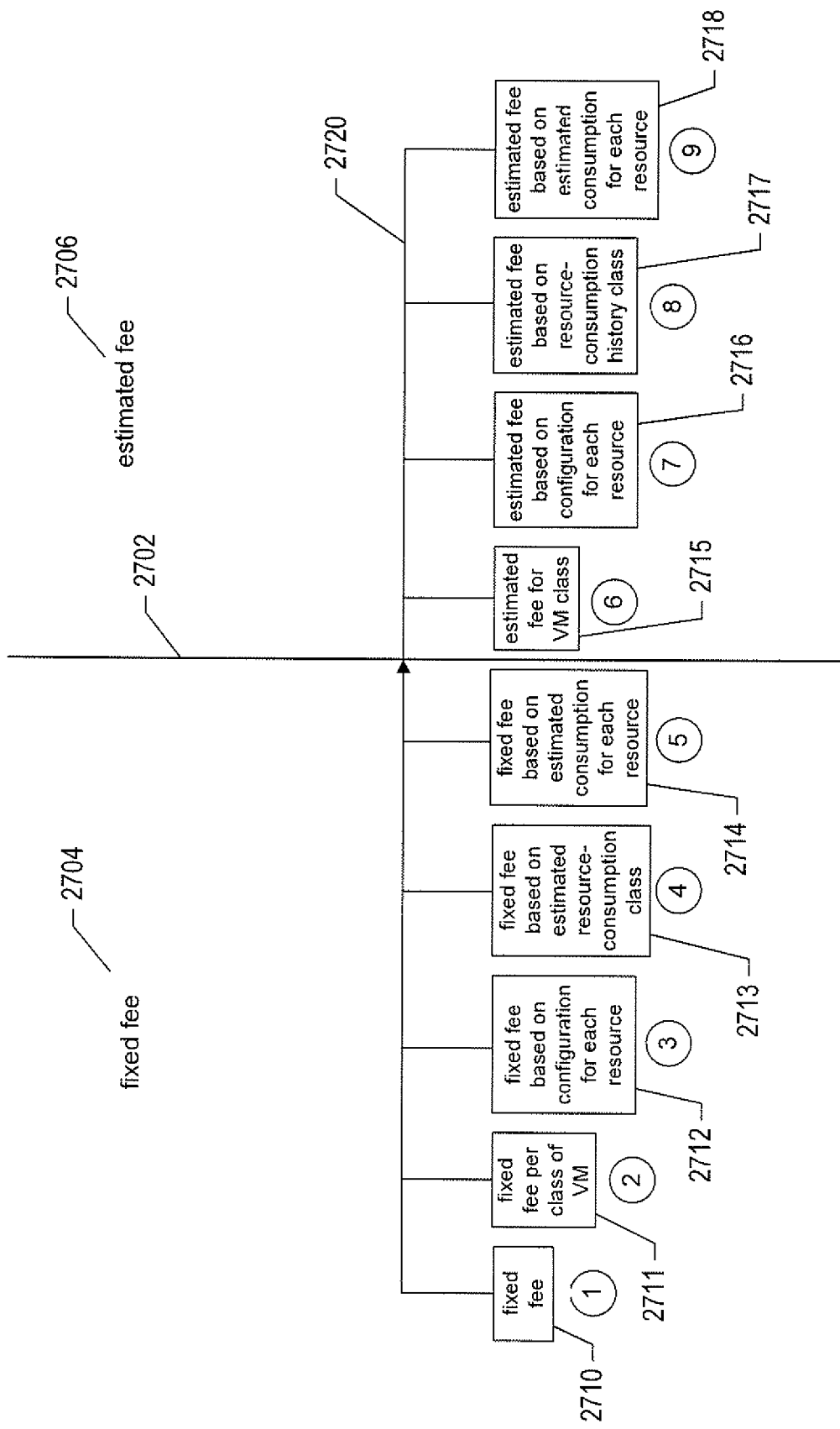
FIG. 27 illustrates a variety of different types of hosting fees that can be computed by the local cloud-exchange instance within a resource provider for inclusion in a bid-response message.

FIG. 27 illustrates a variety of different types of hosting fees that can be computed by the local cloud-exchange instance within a resource provider for inclusion in a bid-response message. A vertical line 2702 in the center of FIG. 27 divides the illustrated types of hosting fees into two general categories: (1) fixed fees 2704; and (2) estimated fees 2706. A fixed-fee bid means that the resource provider is offering to charge the quoted fee for hosting the one or more virtual machines that are the subject of a bid request. Should the one or more virtual machines consume fewer computational resources than projected, the resource consumer nonetheless pays the full fixed fee at the conclusion of hosting of the one or more virtual machines by the resource provider. On the other hand, should the one or more virtual machines consume more computational resources than projected, the resource consumer nonetheless pays only the fixed fee rather than a fee based on the computational resources consumed by the one or more virtual machines. It is often the case that fixed-fee quotes are desirable to resource consumers from the standpoint of cost predictability. As a result, resource consumers may often be willing to pay a premium for fixed-fee hosting. By contrast, an estimated-fee bid is a projected hosting price based on available information related to the projected computational-resource consumption of the one or more virtual machines to be hosted. At the completion of hosting, the resource consumer is charged for the computational resources used by the one or more virtual machines rather than the estimated fee. Estimated-bid hosting is less risky for resource providers but somewhat riskier for resource consumers. However, various different constraints supplied by resource consumers in a bid request can ameliorate the risks associated with estimated-bid hosting. For example, a resource consumer may include a constraint that the total hosting fee not exceed a particular fixed value. This can be accompanied with another constraint that specifies how hosting proceeds when the accumulated fees reach the specified maximum value. In one case, hosting may be prematurely terminated by the resource provider while, in another case, the resource provider agrees to finish hosting the one or more virtual machines without further charges. The attribute/value constraints included in a buy policy provide great flexibility in the types of virtual-machine-hosting agreements that can be made by resource consumers and resource providers via the cloud-exchange system.

Nine different fee-calculation modes 2710-2718 are represented in FIG. 27 as rectangles positioned along a horizontal axis 2720. The fee-calculation modes in each of the two portions 2704 and 2706 of FIG. 27 corresponding to fixed-fee and estimated-fee pricing increase in precision from left to right along the horizontal axis. However, the complexity of the fee calculation and the amount of information needed to calculate the fee also increases from left to right along the horizontal axis.

The simplest fee-calculation mode 2710 is a blanket fixed fee for hosting one or more virtual machines. While simple to calculate, a blanket fixed-fee mode provides little flexibility to resource providers in balancing hosting costs with hosting revenues and in competitively pricing hosting services. Additional flexibility is provided by a second fee-calculation mode 2711 in which a fixed fee is assigned to each of a number of different classes of virtual machines. A virtual machine is assigned to a particular class based on various configuration parameters for the virtual machine included in the bid. A third fee-calculation mode 2712 computes a fixed fee based on the values for each configuration parameter associated with the one or more virtual machines. A fourth fee-calculation mode 2713 computes a fixed fee based on assigning the one or more virtual machines to a particular resource-consumption class. A fifth fee-calculation mode 2714 computes a hosting fee based on the estimated consumptions or rates of consumption for each different computational resource for which consumption information is available, such as the five computational resources discussed above with reference to FIG. 25A. This fifth fee-calculation mode is a fine-granularity fee estimation in which a significant amount of information regarding the one or more virtual machines is used in order to accurately estimate a hosting fee based on at currently projected resource consumptions. The remaining four fee-calculation modes 2715-2718 are equivalent to the fee-calculation modes 2711-2714, with the exception that an estimated fee is generated by fee-calculation modes 2715-2718 in contrast to the fixed-fee estimation made in fee-calculation modes 2711-2714.

Figure 28A:
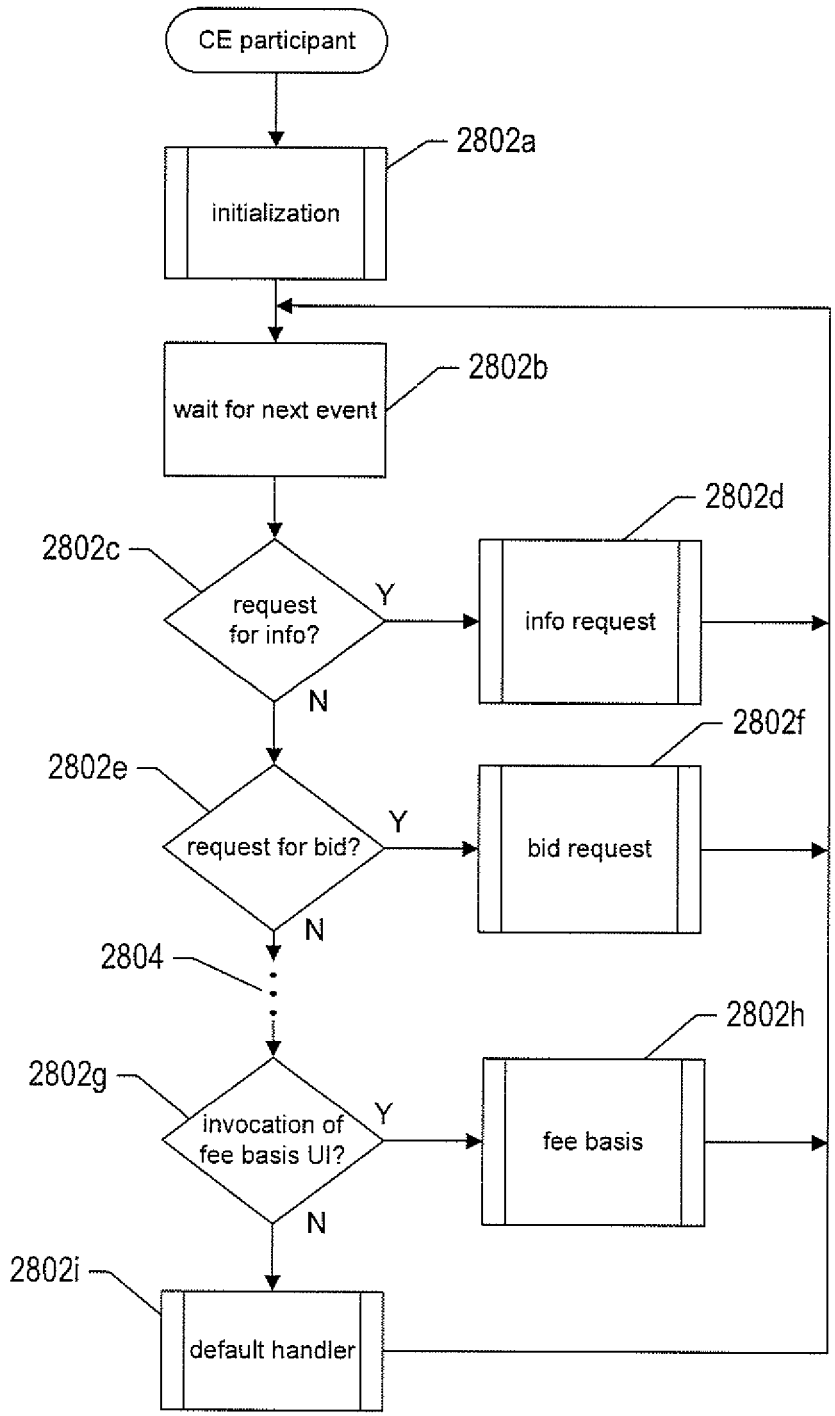
FIGS. 28A-O provide control-flow diagrams that illustrate one implementation of hosting-price computation carried out by a local cloud-exchange instance within a resource provider.
Figure 28B:
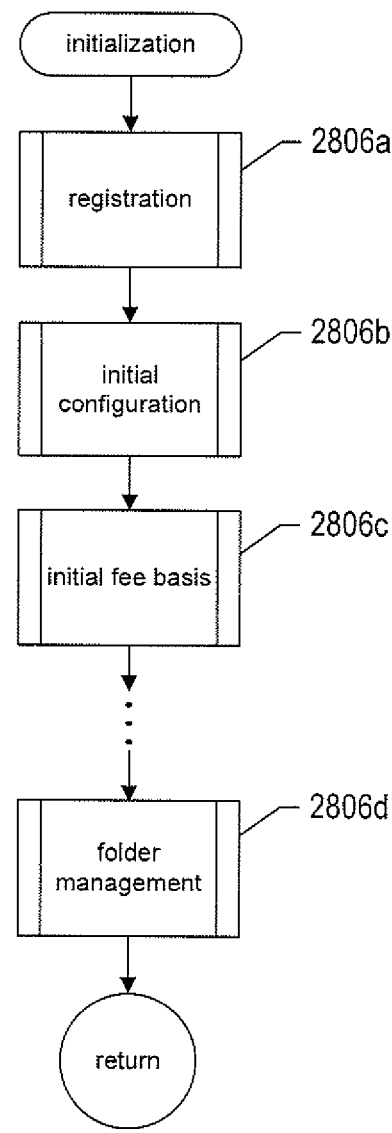
Figure 28C:
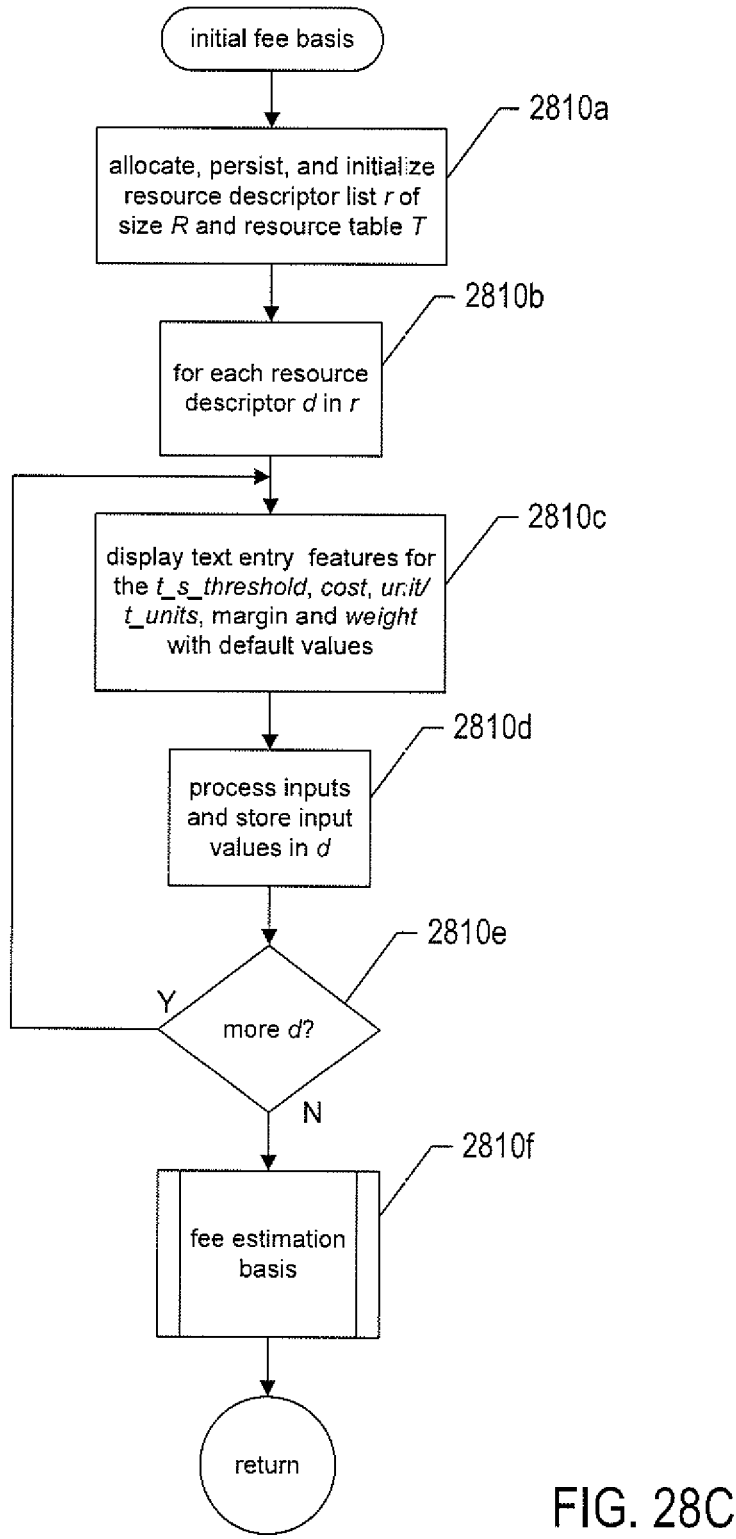
Figure 28D:
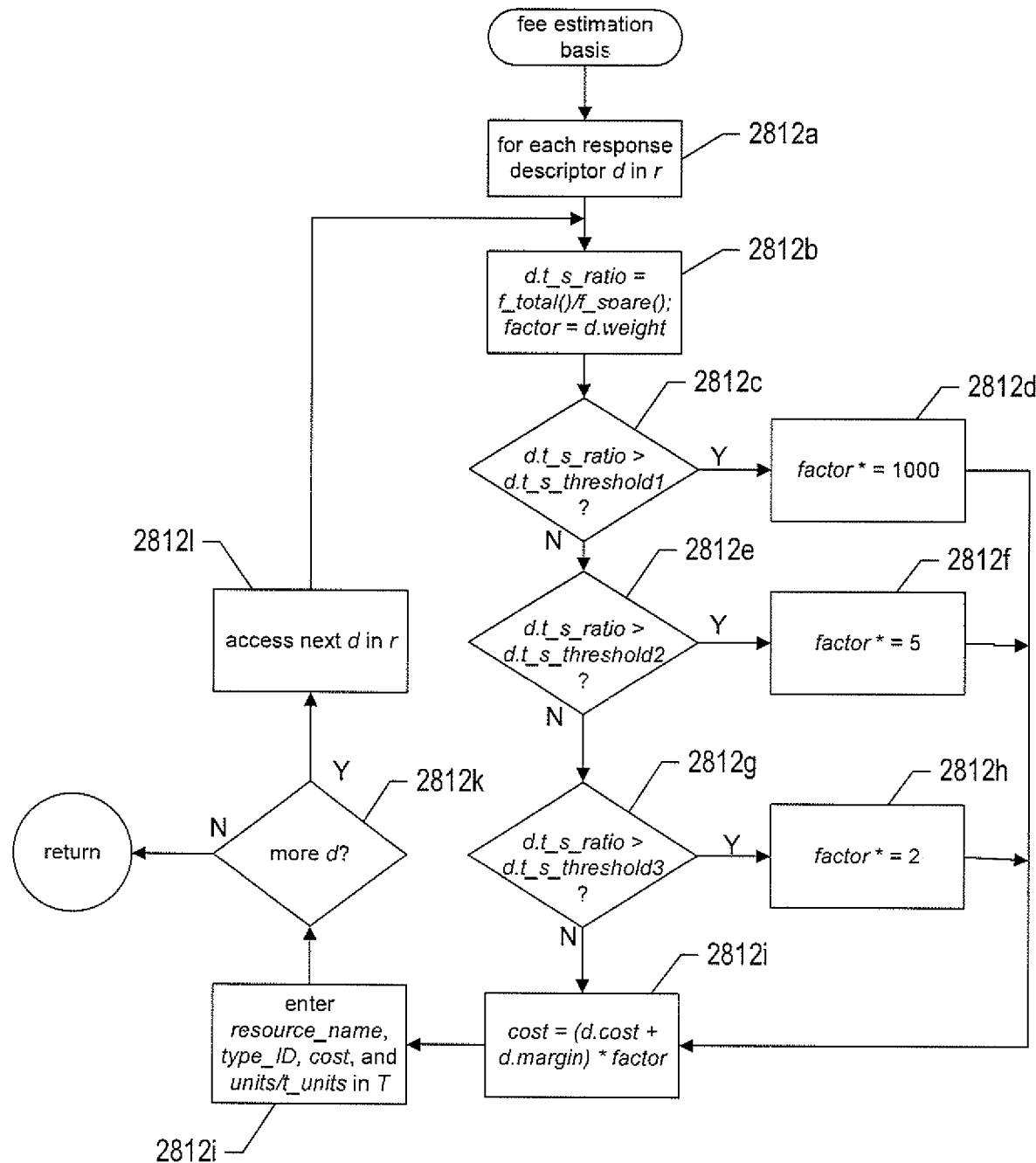
Figure 28E:
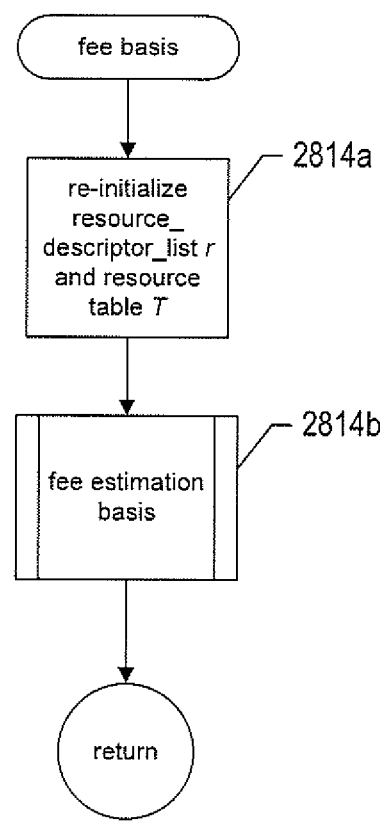
Figure 28F:
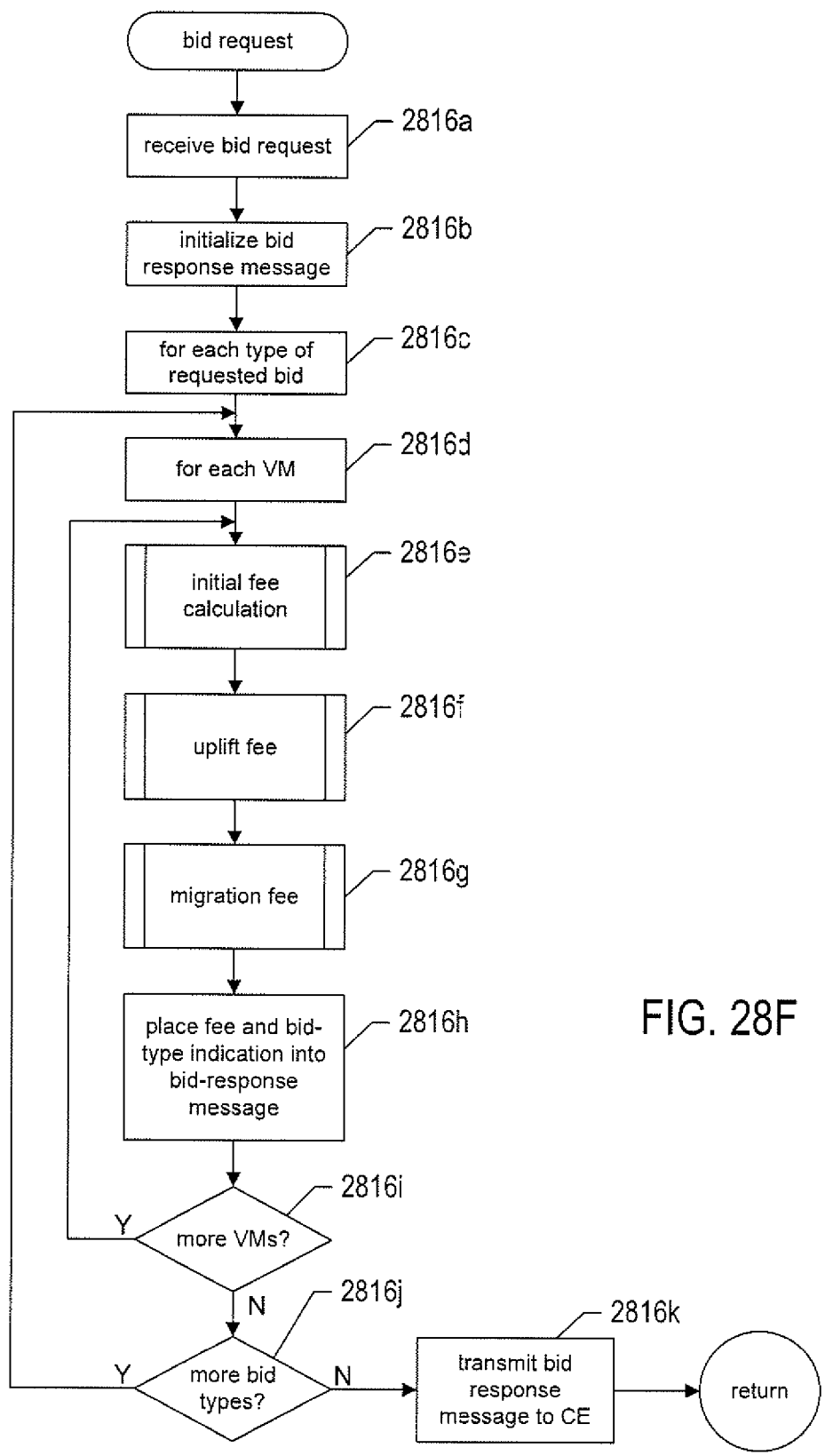
Figure 28G:
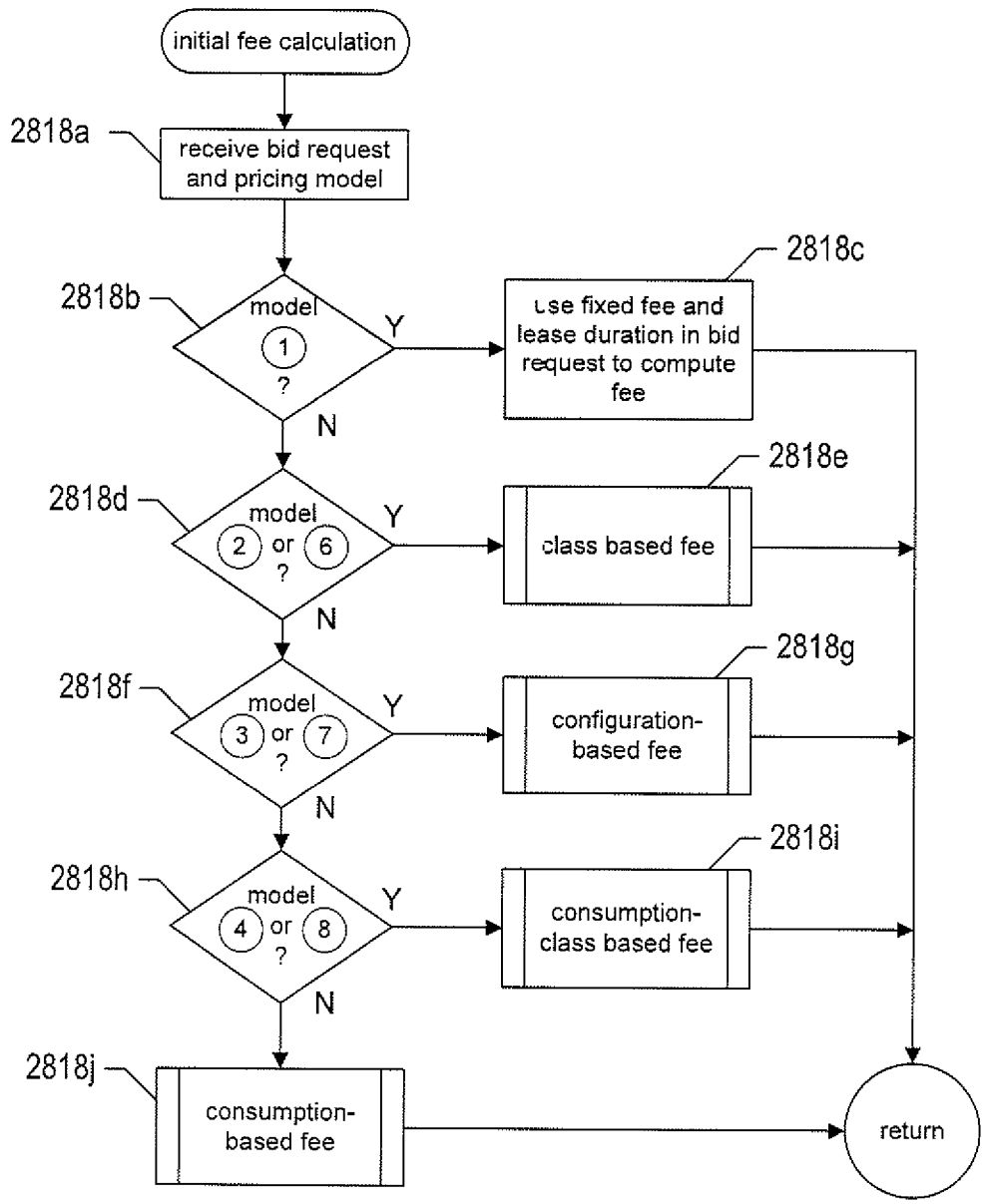
Figure 28H:
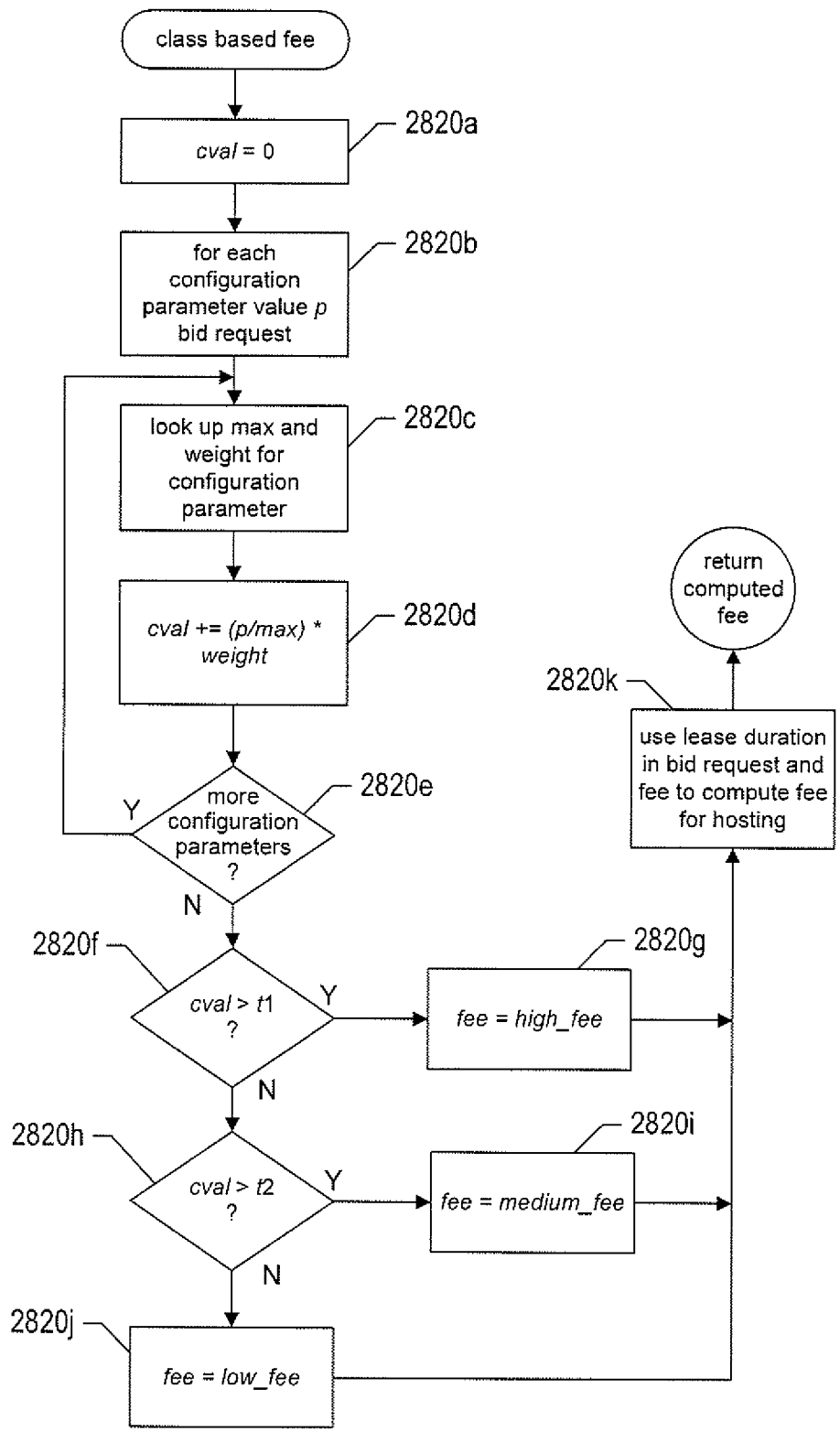
Figure 28I:
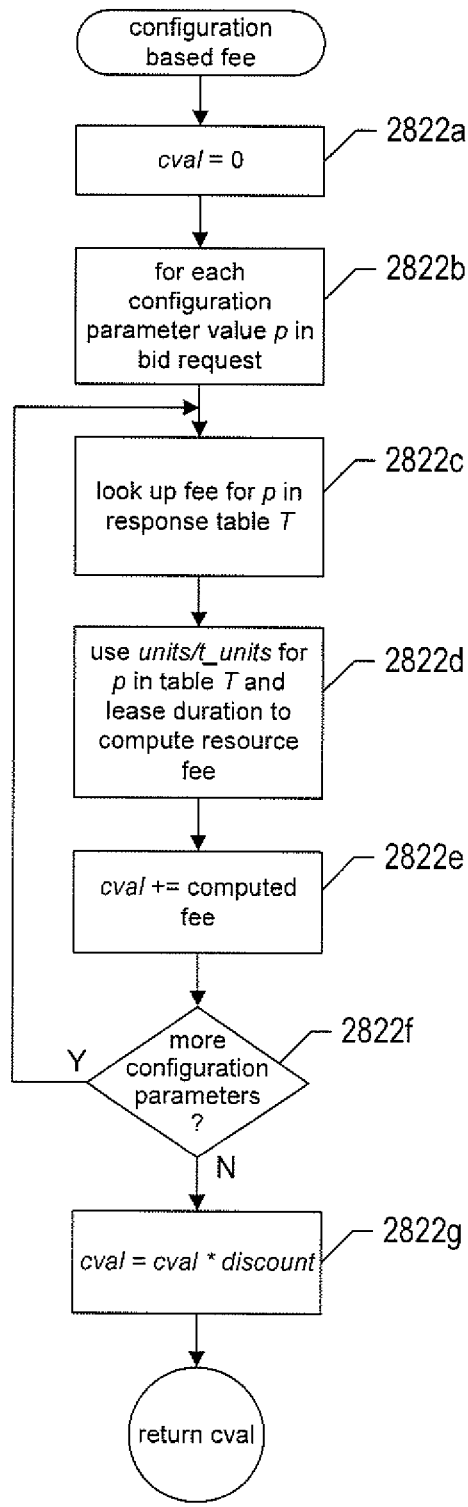
Figure 28J:
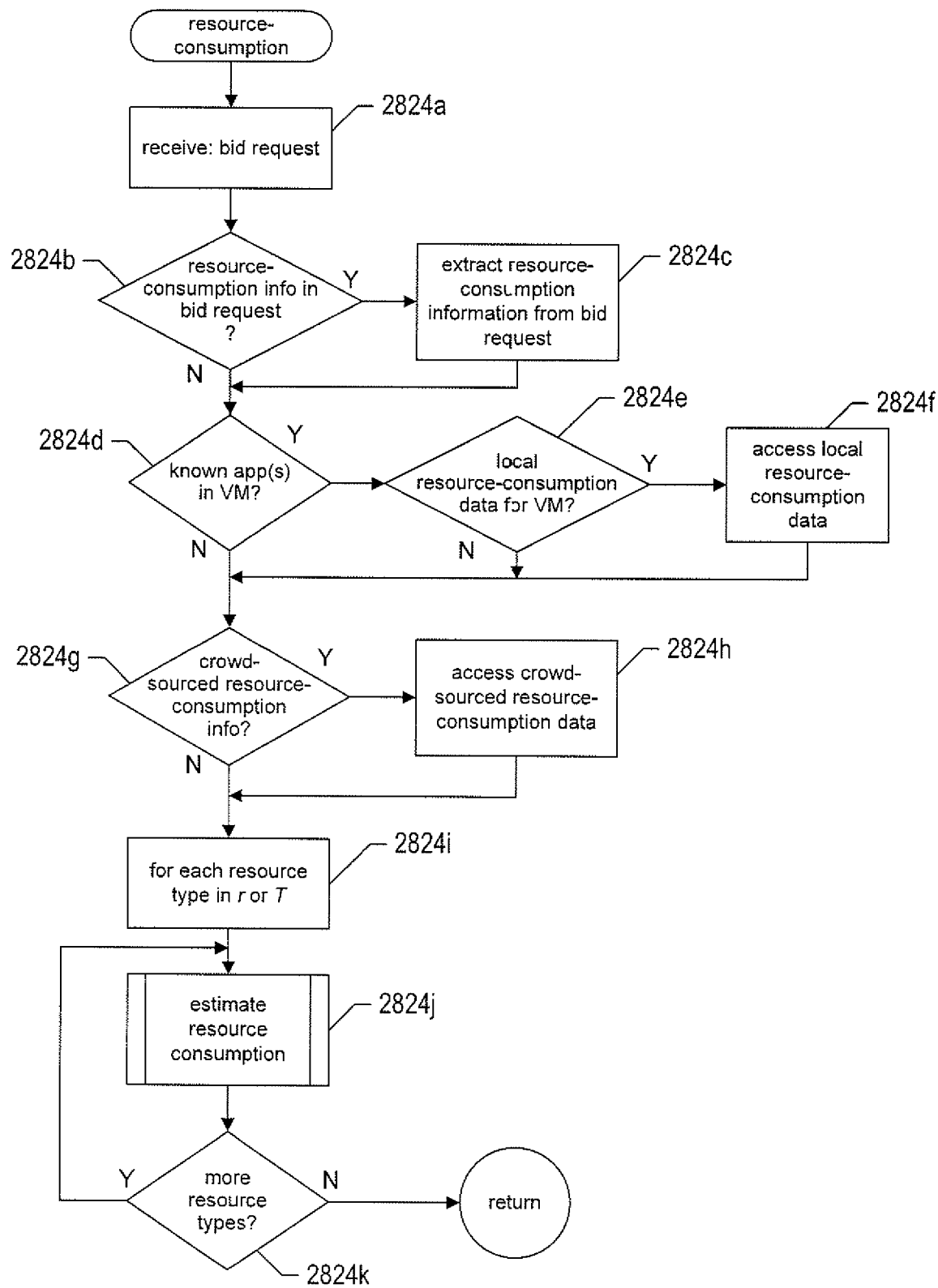
Figure 28K:
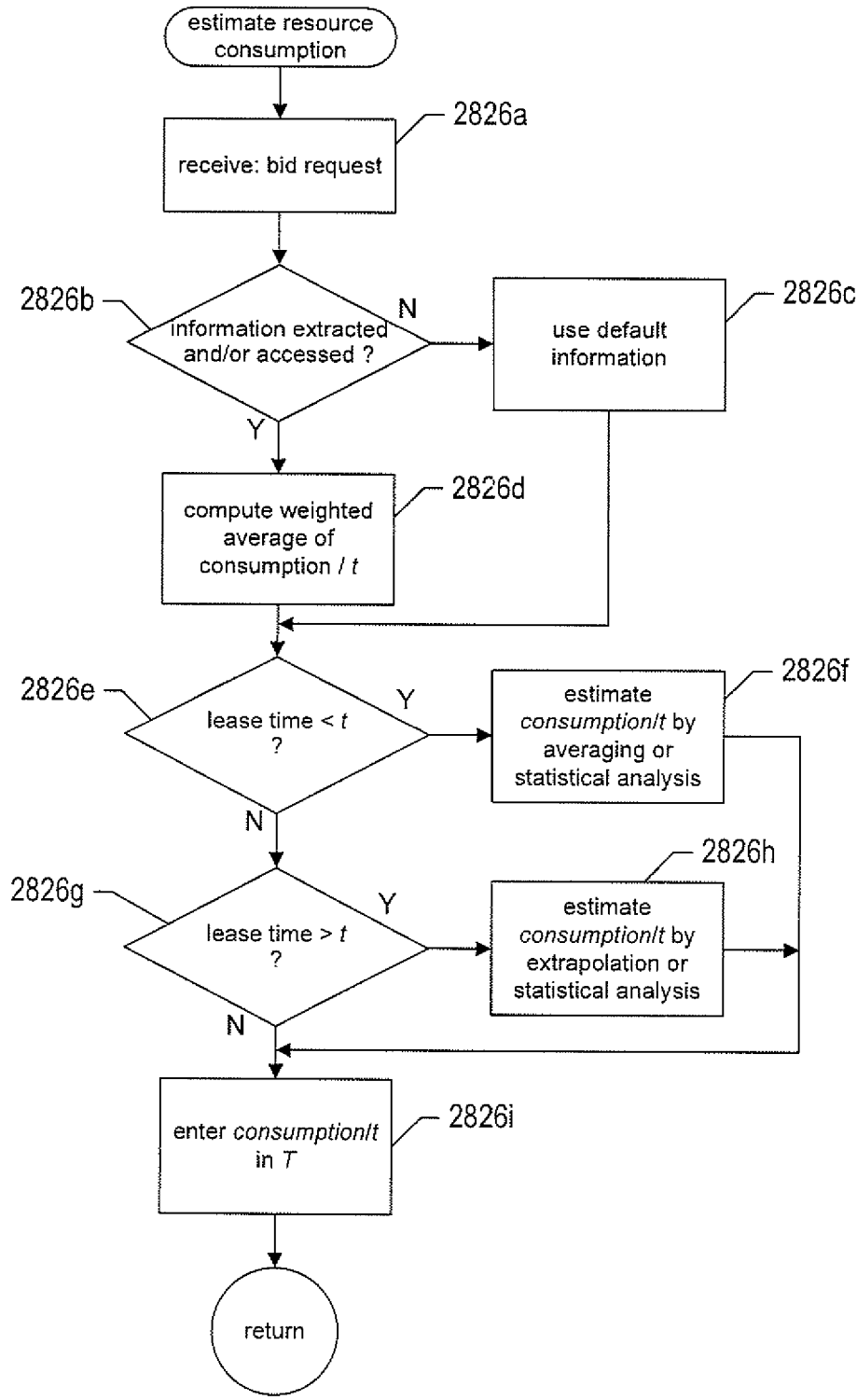
Figure 28L:
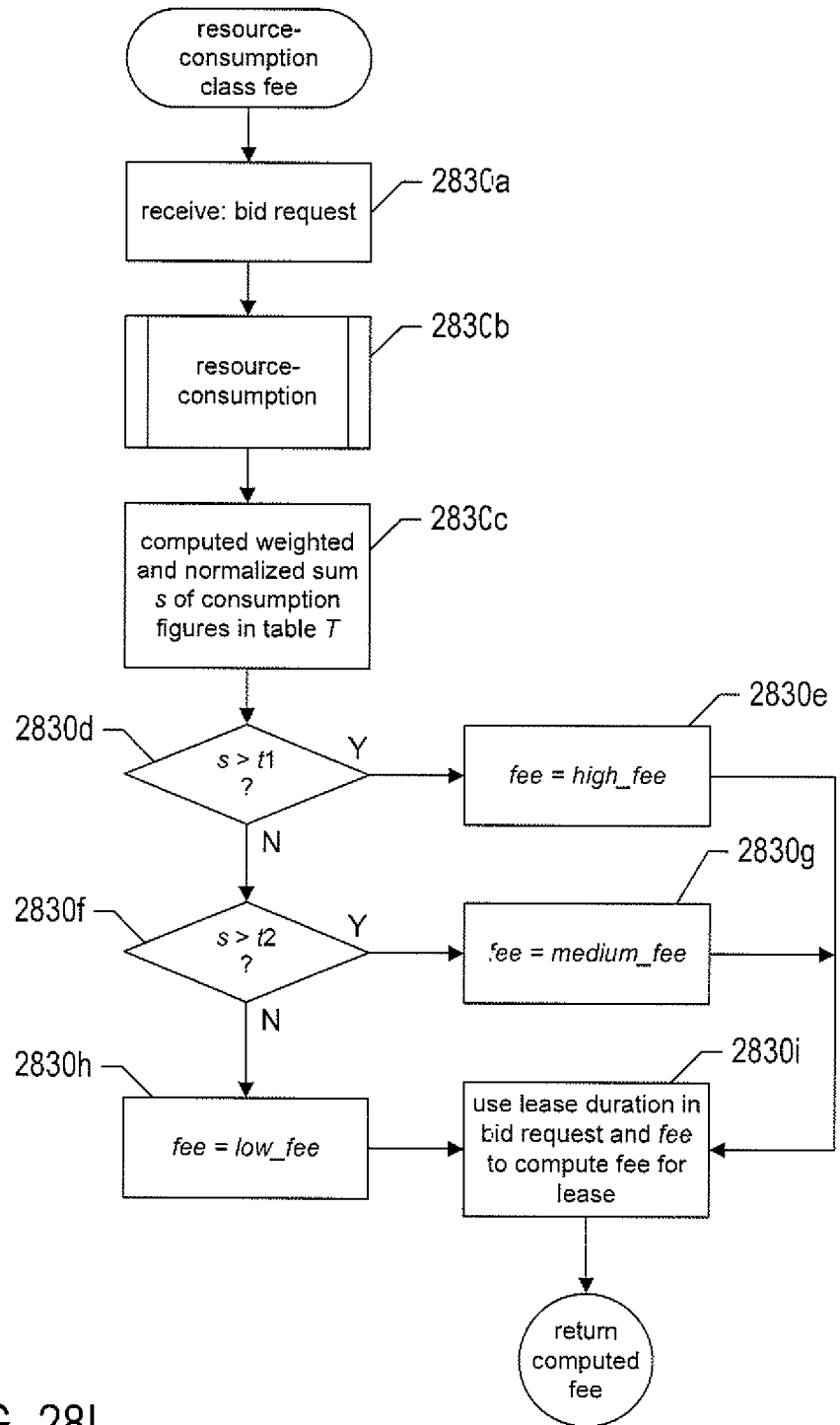
Figure 28M:
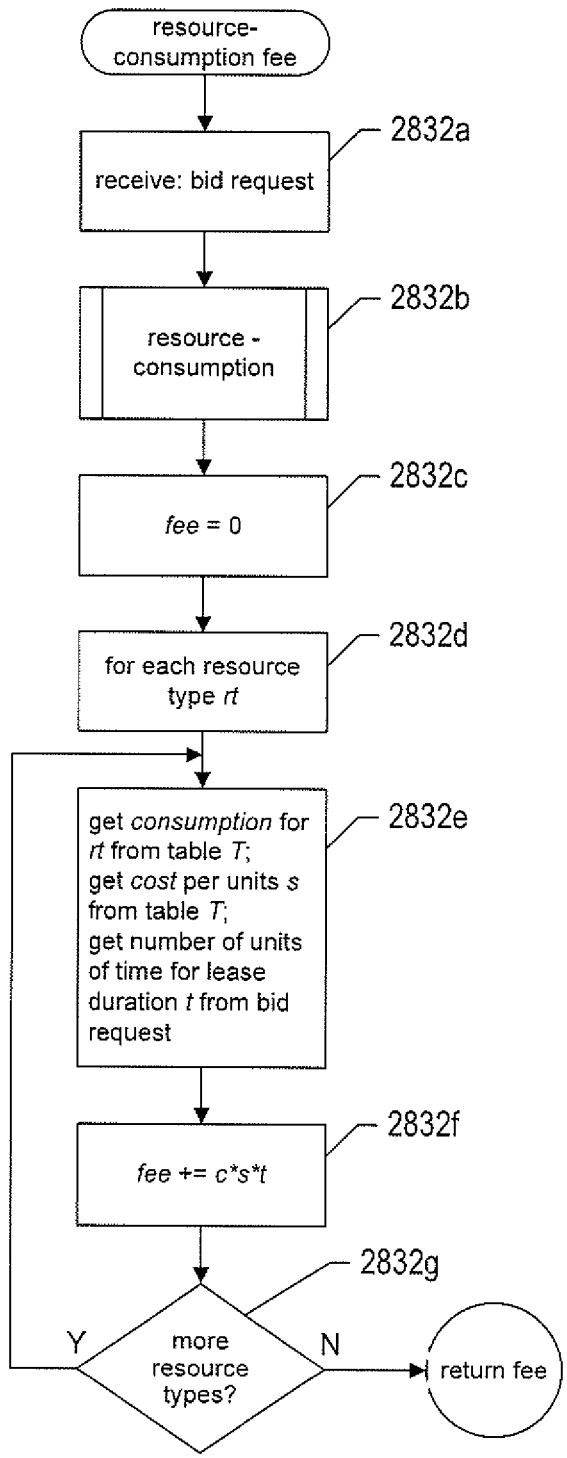
Figure 28N:
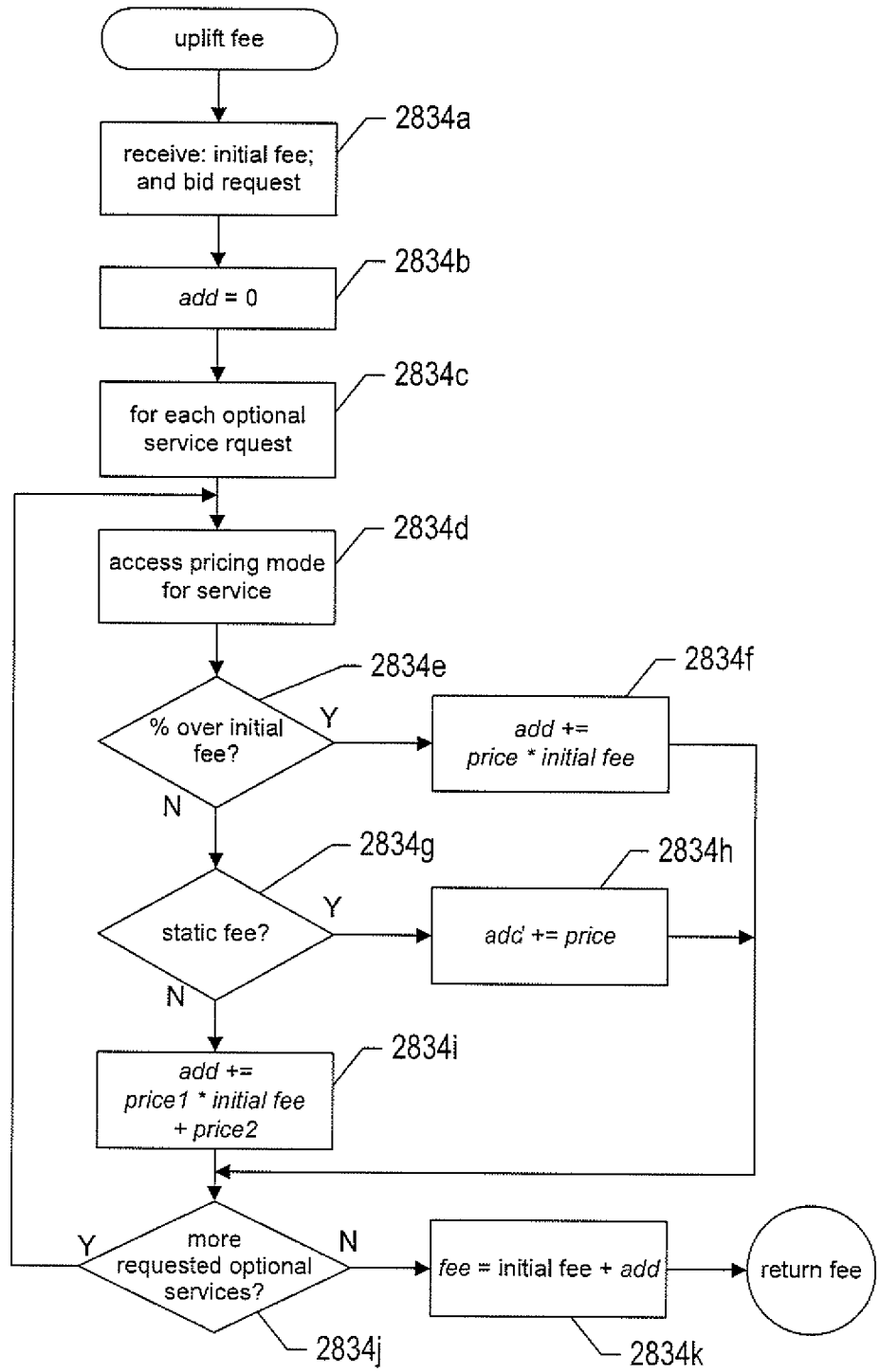
Figure 28O:
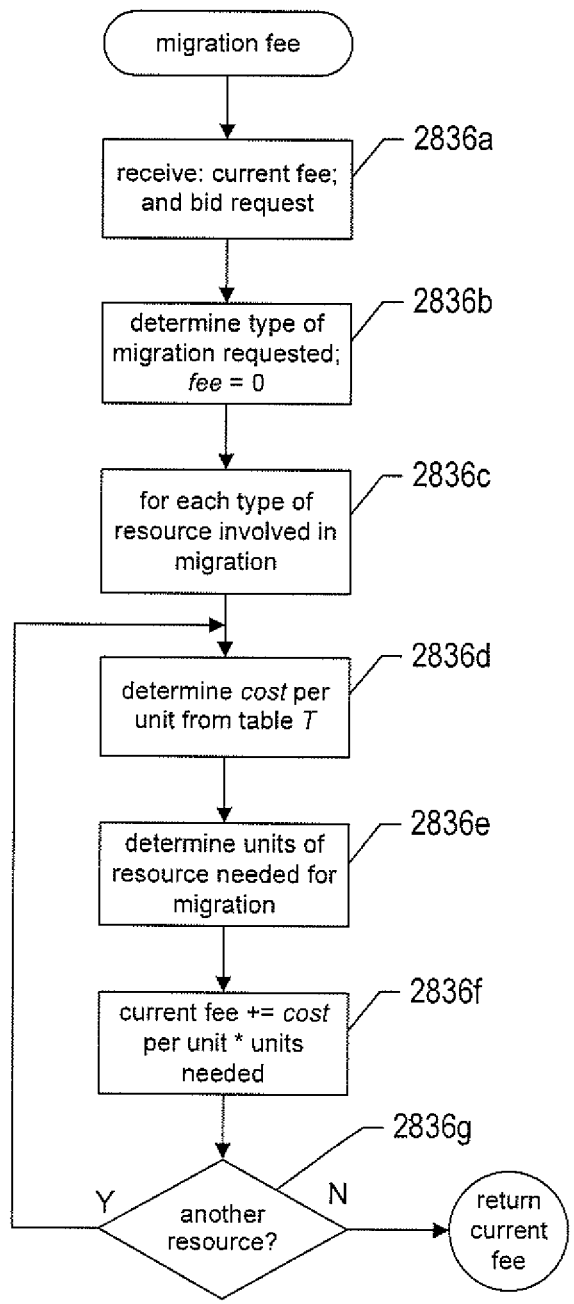

FIGS. 28A-O provide control-flow diagrams that illustrate one implementation of hosting-price computation carried out by a local cloud-exchange instance within a resource provider. FIG. 28A provides a high-level flow-control diagram that illustrates implementation of a local cloud-exchange instance. The local cloud-exchange instance is implemented as an event handler that continuously waits for a next event to occur and then processes the event. In a first step 2802a, an initialization routine is called to initialize and configure the local cloud-exchange instance. Then, in a continuously executing loop of steps 2802b-2802i, the local cloud-exchange instance waits for a next event to occur, in step 2802*b*, and then, when a next event occurs, handles the next event via a call to an event handler for that event. For example, when the next occurring event is a reception of a request for information from the cloud-exchange Engine, as determined in step 2802*c*, an event handler "info request" is called, in step 2802*d*, to retrieve and return the requested information. When the next occurring event is reception of a bid request, as determined in step 2802*e*, the event handler "bid request" is called, in step 2802*f*, to prepare and transmit a bid-response message. Ellipses 2804 indicate that there are many additional types of events that may occur and that may be handled by event handlers for those events. When the next event is the invocation of a fee-basis-input user-interface feature, as determined in step 2802*g*, the event handler "fee basis" is called, in step 2802*h*. A default handler 2802*i* is called to handle various rare and unexpected events.

FIG. 28B provides a control-flow diagram for the initialization routine called in step 2802*a* of FIG. 28A. In step 2806*a*, a registration routine is called to register or reregister the local cloud-exchange instance with the cloud-exchange system. In step 2806*b*, an initial-configuration routine is called to configure the local cloud-exchange instance. In step 2806*c*, an initial-fee-basis routine is called to compute fee-calculation information that is stored in a resource-descriptor list and resource table, as discussed below, to facilitate handling of received bid requests. Ellipses 2808 indicate that many additional steps and routine calls may occur in the initialization routine. A final folder-management routine is called in step 2806*d* to carry out preliminary folder operations on folders representing resources available for resource exchanges.

FIG. 28C provides a control-flow diagram for the initial-fee-basis routine called in step 2806*c* of FIG. 28B. In step 2810*a*, the initial-fee-basis routine allocates, persists, and initializes a resource-descriptor list r with R resource descriptors as well as a resource table T. In the following control-flow diagrams, it is assumed that the resource-descriptor list r, the list size R, and the resource table T are either globally accessible by the various routines that access these data structures or are passed by reference to the routines. In the for-loop of steps 2810*b*-2810*e*, for each resource descriptor in the resource-descriptor list r, the initial-fee-basis routine displays text entry features for resource-descriptor fields of the resource descriptor in a user interface, processes input data, and stores values for the fields in the resource descriptor. The initial-fee-basis routine obtains the fee-estimation parameter values through the user interface from a system administrator or other employee of a data center that includes the local cloud-exchange instance. Then, in step 2810*f*, the initial-fee-basis routine calls a fee-estimation-basis routine to compute values from the user-input parameter values that are stored in table T.

FIG. 28D provides a control-flow diagram for the fee-estimation-basis routine called in step 2810*f* of FIG. 28C. In the for-loop of steps 2812*a*-2812*l*, the fee-estimation-basis routine considers each resource descriptor d in the resource-descriptor list r. In step 2812*b*, the fee-estimation-basis routine calls the total-capacity function and spare-capacity function for the resource represented by the currently considered resource descriptor d in order to compute a total-capacity-two-spare-capacity-ratio value. In addition, a local variable factor is initialized to the weight for the resource represented by the resource descriptor. When the total-capacity-two-spare-capacity ratio is greater than a first threshold value, as determined in step 2012*c*, the contents of the variable factor is multiplied by 1000. This large multiplier essentially ensures that any response to a bid request for a virtual machine that consumes the resource represented by the resource descriptor will include a sufficiently high hosting price to eliminate the bid-response message from further consideration by the cloud-exchange engine in a resource-exchange auction. This is because, when the total-capacity-two-spare-capacity ratio exceeds the first threshold, there is insufficient available capacity of the resource represented by the resource descriptor for hosting a virtual machine that consumes the resource. When the total-capacity-two-spare-capacity ratio is greater than a second threshold value, as determined in step 2812*e*, the value in the local variable factor is multiplied by 5, in step 2812*f*, to ensure that a relatively large hosting fee is quoted for hosting requests for virtual machines that consume the resource represented by the resource descriptor, since the resource is in short supply within the resource provider. When the total-capacity-two-spare-capacity ratio is greater than a third threshold, as determined in step 2012*g*, then, in step 2012*h*, the local variable factor is multiplied by 2 to ensure that a reasonable price is quoted for hosting virtual machines that consume the resource. In step 2012*i*, the cost per unit of time that the resource provider needs to charge for consumption of the resource is computed as the cost value stored in the descriptor, which represents the actual power, maintenance, and amortization costs of the resource to the resource provider, plus the margin desired by the resource provider, with the sum multiplied by the value stored in the local variable factor. In step 2012*j*, the cost and other data associated with the resource described by the currently considered resource descriptor are entered into the resource table T. When there are more resource descriptors in the resource-descriptor list r, as determined in step 2012*k*, the next resource descriptor in the resource-descriptor list r is accessed, in step 2812*l*, in preparation for a next iteration of the for-loop of steps 2012*a*-2812*l*. Otherwise, the resource table T has been fully initialized and the fee-estimation-basis routine returns. The values stored in the cost field of resource table T represent the prices per unit time for each of the computational resources used for fee estimation. These prices are computed, as described above, by parameter values input by a system administrator or other employee of the organization that manages the data center in which the local cloud-exchange instance executes.

FIG. 28E provides a control-flow diagram for the fee-basis routine called in step 2802*h* of FIG. 28A. In step 2814*a*, the fee-basis routine re-initializes the resource-descriptor list r and the resource table T. Then, in step 2814*b*, the fee-basis routine calls the fee-estimation-basis routine, discussed above with reference to FIG. 28D, in order to again collect and store the information that serves as a basis for fee calculation. Thus, the fee-basis information can be updated by a system administrator or by other data-center personnel. The fee-basis information is generally computed from information that needs to be provided manually, although, in certain implementations, some or all of the information can be obtained from configuration files or recomputed using scripts following an initial initialization.

FIG. 28F provides a control-flow diagram for the event handler "bid request," called in step 2802*f* of FIG. 28A. In step 2816*a*, the bid-request handler receives the bid request. In step 2816*b*, the bid-request handler initializes a bid response message for transmission of a bid to the cloud-exchange engine. In the outer for-loop of steps 2816*c*-2816*j*, a fee is computed for each type of requested bid. For example, a resource consumer may request both a fixed-fee bid as well as an estimated-fee bid for hosting one or more virtual machines. In the inner for-loop of steps 2816*d*-2816*i*, a fee is computed for each VM for which hosting services are requested in the received bid request. A fee is computed by generating an initial fee, in a call to an initial-fee-calculation routine, in step 2816*e*, then computing an uplift fee for additional requested services that is added to the initial fee via a call to an uplift-fee routine, in step 2816*f*, and then computing a migration fee that is added to the uplifted fee via a call to a migration-fee routine in step 2816*g*. The final fee, along with an indication of the bid type, is placed into the bid-response message, in step 2816*h*. In certain implementations, when the bid request requests hosting of multiple of VMs, the fees for each VM may be accumulated by summing, with a single accumulated fee placed into the bid-response message. Following execution of the nested for-loops of steps 2816*c*-2816*j*, the bid-response message is transmitted to the cloud-exchange engine in step 2816*k*.

FIG. 28G provides a control-flow diagram for the initial-fee-calculation routine called in step 2816 de-of FIG. 28F. In step 2818*a*, the initial-fee-calculation routine receives the bid request and an indication of the pricing mode to use for the fee calculation. A local cloud-exchange instance within a resource provider may select the fee-calculation mode based on input from a system administrator or other data-center employee. Alternatively, the fee-calculation mode may be obtained from a global variable, from a configuration file, or from another source of parameter values within the resource provider. When the fee-calculation model is the fixed-fee model (2710 in FIG. 27), as determined in step 2818*b*, the initial-fee-calculation routine, in step 2818*c*, multiplies a fixed fee per time unit by the lease duration specified in the bid request, in common time units, to compute a fixed fee for hosting the one or more virtual machines. Otherwise, when the pricing model is either a fixed-fee or estimated-fee pricing mode based on the VM class (2711 and 2715 in FIG. 27), as determined in step 2818*d*, the initial-fee-calculation routine calls a class-based-fee routine in step 2818*d* to compute the initial hosting fee. Otherwise, when the pricing model is either a fixed-fee based on VM configuration or an estimated-fee based on the VM configuration (2712 and 2716 in FIG. 27), as determined in step 2818*f*, a configuration-based-fee routine is called, in step 2818*g*, to compute the initial hosting fee. Otherwise, when the pricing model is based on a resource-consumption class (2713 and 2717 in FIG. 27), as determined in step 2818*h*, a consumption-class-based-fee routine is called, in step 2818*i*, to compute the initial hosting fee. Otherwise, the pricing model is based on resource consumption for each resource (2714 and 2718 in FIG. 27), and a consumption-based-fee routine is called, in step 2818*j*, to compute the initial hosting-fee estimate.

FIG. 28*h* provides a control-flow diagram for the class-based-fee routine called in step 2818*e* of FIG. 28G. In step 2820*a*, the local variable cval is set to 0. In the for-loop of steps 2820*b*- 2820*e*, each configuration-parameter value p included in the bid request is considered. In step 2020*c*, parameters max and weight are looked up for the configuration parameter and, in step 2020*d*, a value obtained by dividing the configuration-parameter value p by the value max and then multiplying the result by the value weight is added to the value stored in local variable cval. The parameters max and weight may be supplied to local cloud-exchange instances by the cloud-exchange system, or may be set by a data-canter administrator or by other data-center personnel. Following termination of the for-loop of steps 2020*b*- 2020*e*, the local variable cval stores a weighted sum of ratios of requested resources to maximum requestable resources. When this value is greater than a first threshold, as determined in step 2820*f*, a high fee is selected for the bid, in step 2820*g*. Otherwise, when the value stored in local variable cval is greater than a second threshold, as determined in step 2820*h*, a medium fee is selected for the fee, in step 2820*i*. Otherwise, a low fee is selected for the fee in step 2820*j*. Finally, in step 2820*k*, the lease duration included in the bid request and the selected fee are used to compute a fee for hosting the one or more virtual machines.

FIG. 28I provides a control-flow diagram for the configuration-based-fee routine called in step 2818*g* of FIG. 28G. In step 2822*a*, the local variable cval is set to 0. In the for-loop of steps 2822*b*-2822*f*, each configuration parameter for the one or more virtual machines included in the bid request is considered. For each configuration parameter, a price or fee is looked up in the resource table T, in step 2022*c*, the fee obtained from the resource table T is used, along with the indication of the units obtained from resource table T and the lease duration, to compute a fee for the resource in step 2822*d*, and the fee for the resource is added to the value stored in local variable cval in step 2822*e*. Finally, in step 2822*g*, the accumulated fee stored in local variable cval is multiplied by a discount value to compute the final hosting fee. The discount value reflects the fact that, in general, fewer computational resources than the maximum computational resources specified by the configuration parameters are often used by a virtual machine during execution.

FIG. 28J provides a control-flow diagram for a resource-consumption routine that computes estimated consumptions for each of the computational resources for execution of one or more virtual machines included in the bid request. In step 2824*a*, the resource-consumption routine receives the bid request. When the bid request includes resource-consumption information, such as a resource-consumption personality, as determined in step 2824*b*, then, in step 2824*c*, the resource-consumption information is extracted from the bid request for use in resource-consumption estimation. When the VM is of a known configuration and includes, for example, one or more well-known and well-characterized applications, as determined in step 2824*d*, and when there is local resource-consumption data for the one or more VMs, as determined in step 2824*e*, the local resource-consumption data is accessed in step 2824*f*. When there is a crowd-sourced resource-consumption information available for the one or more virtual machines, as determined in step 2824*g*, the crowd-sourced resource-consumption information is accessed in step 2824*h*. Finally, in the for-loop of steps 2824*i*-2824*k*, an estimate-resource-consumption routine is called for each different type of computational resource.

FIG. 28K provides a control-flow diagram for the estimate-resource-consumption routine called in step 2824*j* of FIG. 28J. In step 2826*a*, the estimate-resource-consumption routine receives the bid request. When no information has been extracted from the bid request or otherwise obtained for the one or more VMs, as determined in step 2826*b*, default information that is generally applicable to VMs is used in step 2826*c*. Otherwise, in step 2826*d*, a weighted average of the resource-consumption values obtained from the various different sources, by the resource-consumption routine in steps 2824*c*, 2024*f*, and 2024*h*, is computed in step 2026*d*. When the lease time requested in the bid request is less than the time over which the resource-consumption information was compiled, as determined in step 2826*e*, the consumption estimate for the resource is obtained by averaging or by statistical analysis in step 2826*f*. When the requested lease time is greater than the time over which the resource-consumption information was compiled, as determined in step 2826*g*, then, in step 2826*h*, the consumption for the resource is extrapolated from the data and/or obtained by a statistical analysis. Finally, in step 2826*i*, the estimated consumption for the resource is entered into the consumption field of the entry for the resource in the resource table T.

FIG. 28L provides a control-flow diagram for the resource-consumption-class-fee routine called in step 2818*g* of FIG. 28*g*. In step 2830*a*, the resource-consumption-class-fee routine receives the bid request. In step 2830*b*, the resource-consumption-class-fee routine calls the resource-consumption routine discussed above with reference to FIG. 28J. In step 2830*c*, the resource-consumption-class-fee routine computes a weighted and normalized sum s of the resource-consumption values stored in the resource table T by the resource-consumption routine. When the value in the local variable s is greater than a first threshold, as determined in step 2830*d*, the fee is selected to be a high fee in step 2830*d*. Otherwise, when the value stored in the local variable s is greater than a second threshold, as determined in step 2830*f*, a medium fee is selected in step 2830*g*. Otherwise, a low fee is selected in step 2830*h*. Finally, in step 2830*i*, the lease duration in the bid request and the computed fee per unit of time are used to compute a hosting fee that is returned by the resource-consumption-class-fee routine.

FIG. 28M provides a control-flow diagram for the resource-consumption-fee routine called in step 2818*j* of FIG. 28G. In step 2832*a*, the resource-consumption-fee routine receives the bid request. In step 2832*b*, the resource-consumption-fee routine calls the resource-consumption routine discussed above with reference to FIG. 28J. In step 2832*c*, the local variable fee is set to 0. Then, in the for-loop of steps 2832*d*-2032*g*, a fee is computed for each resource and accumulated in the local variable fee. In step 2832*e*, the consumption value for the resource is obtained from the resource table T as well as the cost per resource unit s. The lease duration is obtained from the bid request. In step 2032*f*, the cost s, consumption c, and lease duration T are multiplied together and added to the local fee-accumulation variable fee. When the for-loop of steps 2832*d*-2832*g* completes, the local variable fee contains the estimated fee based on resource consumption for hosting.

FIG. 28N provides a control-flow diagram for the uplift-fee routine called in step 2816*f* of FIG. 28F. In step 2834*a*, the uplift-fee routine receives the initial fee and the bid request. In step 2834*b*, the local variable add is set to the value 0. In the for-loop of steps 2834*c*-2834*j*, each additional or optional service requested from the resource provider in the bid request is considered. In step 2834*d*, a pricing mode for the service is accessed. This pricing mode may be determined by a system administrator or by other personnel and maintained by the local cloud-exchange instance. Alternatively, the pricing mode may be obtained from a configuration file or may be obtained from the cloud-exchange system. When the pricing mode is a percentage over the initial fee, as determined in step 2834*d*, the percentage price increase is multiplied by the initial fee and added to the value stored in the local variable add, in step 2834*f*. Otherwise, when the pricing mode is static, as determined in step 2834*g*, the price for the service is added to the contents of the local variable add, in step 2834*h*. Otherwise, a mixed pricing Mode is used to compute both a percentage added portion and a static portion, in step 2834*i*, which is added to the contents of the local variable add. When the for-loop of steps 2034*c*-2834*j* terminates, the local variable add contains the uplift fee for the optional requested services. This is added to the initial fee, in step 2834*k*, to produce a total fee.

FIG. 28O provides a control-flow diagram for the migration-fee routine called in step 2816*g* of FIG. 28F. In the currently described implementation, the migration fee is a generic fee that encompasses either of VM migration, transfer of VM data, or building a VM by the resource provider, depending on the type of VM transfer requested in the bid request. In step 2836A, the migration-fee routine receives the current fee and the bid request. In step 2836*b*, the migration-fee routine determines the type of migration requested in the bid request and sets the local variable fee to the value 0. Then, in the for-loop of steps 2836*c*-2836*g*, the migration-fee routine computes a migration fee for each type of resource involved in migration. In step 2836*d*, the migration-fee routine determines a cost per unit for the resource from the resource table T. In step 2836*d*, the migration-fee routine determines the number of units of the resource needed for the migration. Finally, in step 2836*f*, the current fee is incremented by a fee for the currently considered resource used in the migration process that is computed by multiplying the cost per unit times the number of units needed.

As with all fee calculations, the particular calculation may vary, depending on the units in which resource consumption and cost are expressed and the basis for the fee. For example, the time needed for a migration can be estimated from the available network and storage bandwidths and then used to compute a fee for a particular resource from price per time unit data.

Although the present invention has been described in terms of particular embodiments, it is not intended that the invention be limited to these embodiments. Modifications within the spirit of the invention will be apparent to those skilled in the art. For example, many different design and implementation parameters can be varied to produce alternative implementations, including choice of operating system, the hardware platforms and virtualization layers that are controlled by the distributed service-based application, modular organization, control structures, data structures, and other such parameters. Particular implementations may use different types of resource consumption data, pricing modes, and pricing calculations.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. An automated resource-exchange system comprising:
multiple resource-provider computing facilities that each
includes multiple computers, each having one or more processors and one or more memories, and
includes a local cloud-exchange instance;
multiple resource-consumer computing facilities that each
includes multiple computers, each having one or more processors and one or more memories, includes a local cloud-exchange instance, and
transmits a bid request for hosting a computational-resources-consuming; entity, the bid request including
one or more constraints,
configuration parameters that include specifications of multiple computational resources for hosting the one or more computational-resources-consuming entities, and
a search evaluation expression; and
a cloud-exchange system that
is implemented on one or more physical computers, each including one or more processors and one or more memories,
includes a cloud-exchange engine,
is configured to receive hosting requests from the resource-consumer computing facilities and receives hosting requests from the resource-consumer computing facilities,
is configured to determine a set of one or more candidate resource-provider computing facilities for each received hosting request and determines a set of one or more candidate resource-provider computing facilities for each received hosting request;
is configured to determine a hosting fee for each candidate resource-provider computing facility for each received hosting request and determines a hosting fee for each candidate resource-provider computing facility for each received hosting request; and
is configured to use the determined hosting fees to select one or more resource-provider computing facilities for each received hosting request and uses the determined hosting fees to select one or more resource-provider computing facilities for each received hosting request.

2. The automated resource-exchange system of claim 1 wherein the configuration parameters that include specifications of multiple computational resources for hosting the one or more computational-resources-consuming entities include configuration parameters for computational resources selected from among:
memory:
CPU bandwidth;
networking bandwidth;
data-storage-access bandwidth; and
data storage.

3. The automated resource-exchange system of claim 1, wherein the hosting fee is one of:
a fixed fee for hosting one or more computational-resources-consuming entities; and
an estimated fee for hosting one or more computational-resources-consuming entities.

4. The automated resource-exchange system of claim 1 wherein an estimated hosting fee is determined according to one of multiple pricing modes.

5. The automated resource-exchange system of claim 4 wherein the multiple pricing modes include:
a fixed-fee pricing mode;
a class-based pricing mode;
a configuration-based pricing mode;
a resource-consumption-class-based pricing mode; and
an estimated resource-consumption-class-based pricing mode.

6. The automated resource-exchange system of claim 5 wherein the estimated fee for hosting a computational-resources-consuming entity is determined according to the fixed-fee pricing mode by:
multiplying a fixed-fee price per unit of time for hosting a computational-resources-consuming entity by a hosting duration, in units of time.

7. The automated resource-exchange system of claim 5 wherein the estimated fee for hosting a computational-resources-consuming entity is determined according to the class-based pricing mode by:
assigning the computational-resources-consuming entity to a computational-resources-consuming-entity class based on configuration-parameter values specified in a buy policy associated with a bid request transmitted to the cloud-exchange engine by a resource-consumer computing facility; and
multiplying a fixed-fee price per unit of time for hosting a computational-resources-consuming entity belonging to the computational-resources-consuming entity class by a hosting duration, in units of time.

8. The automated resource-exchange system of claim 5 wherein the estimated fee for hosting a computational-resources-consuming entity is determined according to the configuration-based pricing mode by:
initializing a variable fee;
for each computational resource for which a configuration parameter value is specified in a buy policy associated with a bid request transmitted to the cloud-exchange engine by a resource-consumer computing facility,
multiplying a fee price per unit of time for the computational resource by a hosting duration, in units of time to generate a computational-resource fee, and
adding the computational-resource fee to the contents of the variable fee.

9. The automated resource-exchange system of claim 5 wherein the estimated hosting fee is determined according to the resource-consumption-class-based pricing mode by:
for each of multiple computational resources to be provided by the resource-provider computational facility for hosting the computational-resources-consuming entity,
estimating consumption by the computational-resources-consuming entity of the computational resource over a hosting period;
assigning the computational-resources-consuming entity to a computational-resources-consuming-entity class based on the estimates of computational-resource consumption; and
multiplying a fixed-fee price per unit of time for hosting a computational-resources-consuming entity belonging to the computational-resources-consuming-entity class by a hosting duration, in units of time.

10. The automated resource-exchange system of claim 5 wherein the estimated fee for hosting a computational-resources-consuming entity is determined according to the estimated resource-consumption-class-based pricing mode by:
initializing a variable fee: and for each of multiple computational resources to be provided by the resource-provider computational facility for hosting the computational-resources-consuming entity,
estimating consumption by the computational-resources-consuming entity of the computational resource over a hosting period,
multiplying a fee price per unit of time for the estimated computational-resource consumption by a hosting duration, in units of time, to generate a computational-resource fee, and
adding the computational-resource fee to the contents of the variable fee.

11. The automated resource-exchange system of claim 4 wherein one or more additional fees are added to the estimated hosting fee to generate a final hosting fee for entry into a bid-response message.

12. The automated resource-exchange system of claim 11 wherein an additional uplift fee is added to the estimated hosting fee for one or more additional requested services, the uplift fee for each additional service selected from among:
- a fixed fee for the additional service;
- a percentage uplift over the initial hosting fee for the additional service; and
- a fixed fee and a percentage uplift over the initial hosting fee for the additional service.

13. The automated resource-exchange system of claim 11 wherein an additional migration fee is added to the estimated hosting fee for migrating a computational-resources-consuming entity to the resource-provider computing facility, the migration fee computed by:
- initializing a variable fee;
- for each computational resource used in migrating the computational-resources-consuming entity to the resource-provider computing facility,
  - estimating consumption of the computational resource during migration,
  - multiplying a fee price per unit of time for the estimated computational-resource consumption, in units of time, to generate a computational-resource fee, and
  - adding the computational-resource fee to the contents of the variable fee.

14. A method that automatically computes a hosting-fee within an automated resource-exchange system having multiple resource-provider computing facilities, multiple resource-consumer computing facilities, and a cloud-exchange system, the method comprising:
- receiving, by the cloud-exchange engine from a resource-consumer computing facility, a bid request for hosting one or more computational-resources-consuming entities within a resource-provider computing; facility, the bid request including
  - one or more constraints,
  - configuration parameters that include specifications of multiple computational resources for hosting the one or more computational-resources-consuming entities, and
  - a search evaluation expression; and
- determining, by the cloud-exchange engine, a set of one or more candidate resource-provider computing facilities for the received hosting request;
- determining, by the cloud-exchange engine, a hosting fee for each candidate resource-provider computing facility for each received hosting request; and
- using, by the cloud-exchange engine, the determined hosting fees to select one or more resource-provider computing facilities for each received hosting request.

15. The method of claim 14 a hosting fee is one of:
- a fixed fee for hosting one or more computational-resources-consuming entities; and
- an estimated fee for hosting one or more computational-resources-consuming entities.

16. The method of claim 14 wherein an estimated hosting fee is determined according to one of multiple pricing modes, the pricing modes including:
- a fixed-fee pricing mode;
- a class-based pricing mode;
- a configuration-based pricing mode;
- a resource-consumption-class-based pricing mode; and
- an estimated resource-consumption-class-based pricing mode.

17. The method of claim 16 wherein an additional uplift fee is added to the hosting fee for one or more additional requested services, the uplift fee for each additional service selected from among:
- a fixed fee for the additional service;
- a percentage uplift over the estimated hosting fee for the additional service; and
- a fixed fee and a percentage uplift over the estimated hosting fee for the additional service.

18. The method of claim 16 wherein an additional migration fee is added to the hosting fee for migrating a computational-resources-consuming entity to the resource-provider computing facility, the migration fee computed by:
- initializing a variable fee;
- for each computational resource used in migrating the computational-resources-consuming entity to the resource-provider computing facility,
  - estimating consumption of the computational resource during migration,
  - multiplying a fee price per unit of time for the estimated computational-resource consumption, in units of time, to generate a computational-resource fee, and
  - adding the computational-resource fee to the contents of the variable fee.

19. A physical data-storage device encoded with computer instructions that, when executed by processors with an automated resource-exchange system comprising resource-provider computing facilities, resource-consumer computing facilities, and a cloud-exchange engine configured to control the automated resource-exchange system to automatically compute a hosting-fee by:
- receiving, by the cloud-exchange engine from a resource-consumer computing facility, a bid request for hosting one or more computational-resources-consuming entities within a resource-provider computing facility, the bid request including
  - one or more constraints,
  - configuration parameters that include specifications of multiple
  - computational resources for hosting the one or more computational-resources-consuming entities, and
  - a search evaluation expression; and
- determining, by the cloud-exchange engine, a set of one or more candidate resource-provider computing facilities for the received hosting request;
- determining, by the cloud-exchange engine, a hosting fee for each candidate resource-provider computing facility for each received hosting request; and
- using, by the cloud-exchange engine, the determined hosting fees to select one or more resource-provider computing facilities for each received hosting request.

* * * * *